(12) United States Patent
Ueno et al.

(10) Patent No.: US 11,212,653 B2
(45) Date of Patent: Dec. 28, 2021

(54) TERMINAL DEVICE, ROADSIDE DEVICE, COMMUNICATIONS SYSTEM, AND COMMUNICATIONS METHOD

(71) Applicant: PANASONIC CORPORATION, Osaka (JP)

(72) Inventors: Tsuyoshi Ueno, Kanagawa (JP); Hiroaki Sudo, Kanagawa (JP); Kazumasa Gomyo, Kanagawa (JP); Satoshi Tanaka, Kochi (JP); Shintaro Muramatsu, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 28 days.

(21) Appl. No.: 16/642,677

(22) PCT Filed: Jul. 13, 2018

(86) PCT No.: PCT/JP2018/026523
§ 371 (c)(1),
(2) Date: Feb. 27, 2020

(87) PCT Pub. No.: WO2019/044208
PCT Pub. Date: Mar. 7, 2019

(65) Prior Publication Data
US 2020/0275243 A1 Aug. 27, 2020

(30) Foreign Application Priority Data
Aug. 29, 2017 (JP) .............................. JP2017-164180
Mar. 15, 2018 (WO) .................. PCT/JP2018/010185

(51) Int. Cl.
*H04W 4/40* (2018.01)
*H04W 28/08* (2009.01)
(Continued)

(52) U.S. Cl.
CPC ......... *H04W 4/40* (2018.02); *H04W 28/0226* (2013.01); *H04W 28/0875* (2020.05); *H04W 28/0958* (2020.05); *H04W 64/006* (2013.01)

(58) Field of Classification Search
CPC .... H04W 4/40; H04W 4/027; H04W 28/0226
See application file for complete search history.

(56) References Cited

U.S. PATENT DOCUMENTS

2013/0301451 A1 11/2013 Siomina et al.
2016/0200334 A1 7/2016 Hilleary
(Continued)

FOREIGN PATENT DOCUMENTS

CN 102622872 8/2012
JP 11-120488 4/1999
(Continued)

OTHER PUBLICATIONS

Yasuhisa et al, Translation of JP 2009-9281, obtained from Global Dossier (Year: 2009).*
(Continued)

*Primary Examiner* — Robert C Scheibel
(74) *Attorney, Agent, or Firm* — Greenblum & Bernstein, P.L.C.

(57) ABSTRACT

A terminal device includes: a pedestrian-to-vehicle communication device configured to communicate with an in-vehicle terminal by using a first communication method, in which direct communication is performed as pedestrian-to-vehicle communication; a wireless LAN communication device configured to communicate with the in-vehicle terminal by using a second communication method, in which indirect communication is performed via a roadside device disposed on or near a road; and a controller configured to determine whether or not the terminal device is in a risky state based on state information indicating a state of the (Continued)

(A-1)

(B-1)

(A-2)

(B-2)

terminal device, and select either one of the first communication method, in which direct communication is used and the second communication method, in which indirect communication is used, based on a result of the determination.

9 Claims, 32 Drawing Sheets

(51) Int. Cl.
*H04W 28/02* (2009.01)
*H04W 64/00* (2009.01)

(56) References Cited

U.S. PATENT DOCUMENTS

| | | | |
|---|---|---|---|
| 2017/0018187 A1* | 1/2017 | Kim | G08G 1/166 |
| 2017/0092126 A1 | 3/2017 | Oshida et al. | |
| 2017/0171690 A1 | 6/2017 | Kim et al. | |
| 2019/0053008 A1* | 2/2019 | He | H04W 4/40 |
| 2020/0170059 A1* | 5/2020 | Belleschi | H04W 16/14 |

FOREIGN PATENT DOCUMENTS

| | | |
|---|---|---|
| JP | 2002-245595 | 8/2002 |
| JP | 2009-009281 | 1/2009 |
| JP | 2015-125669 | 7/2015 |
| JP | 2017-068335 | 4/2017 |
| JP | 2017-068741 | 4/2017 |
| WO | 2017/135036 | 8/2017 |

OTHER PUBLICATIONS

Sudo et al, Translation of JP 2017-68741, obtained from Global Dossier (Year: 2017).*

Office Action issued by the Taiwan Intellectual Property Office (TIPO) for Taiwanese Patent Appl. No. 107125481, dated Nov. 20, 2020.

Office Action from China National Intellectual Property Administration (CNIPA) in Chinese Patent Application No. 201880070547.5, dated Sep. 27, 2021.

* cited by examiner

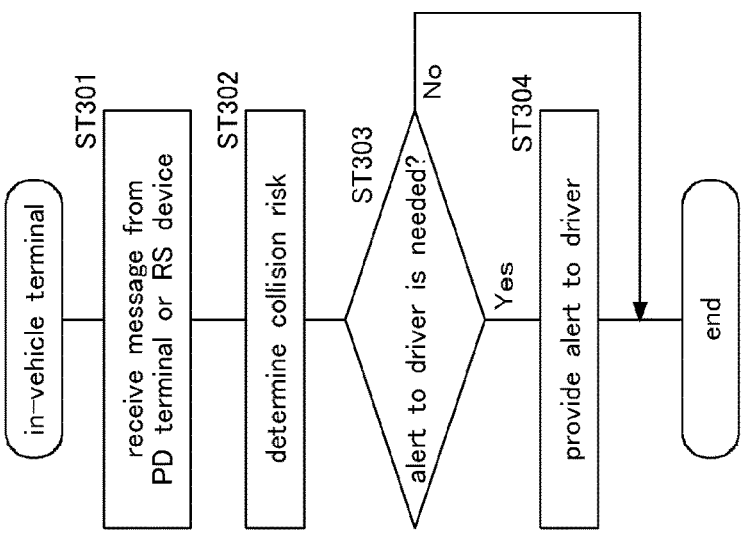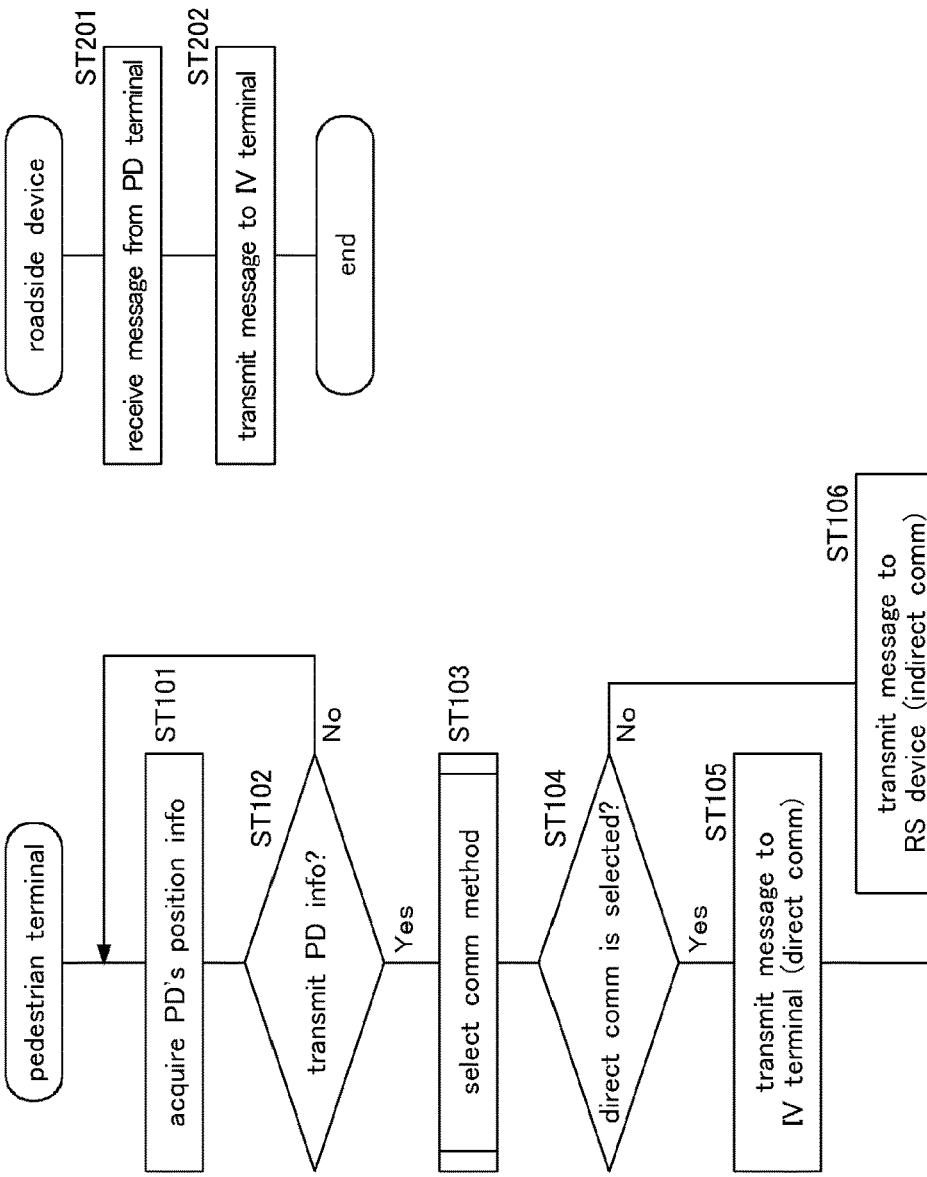
Fig. 6

Fig.9
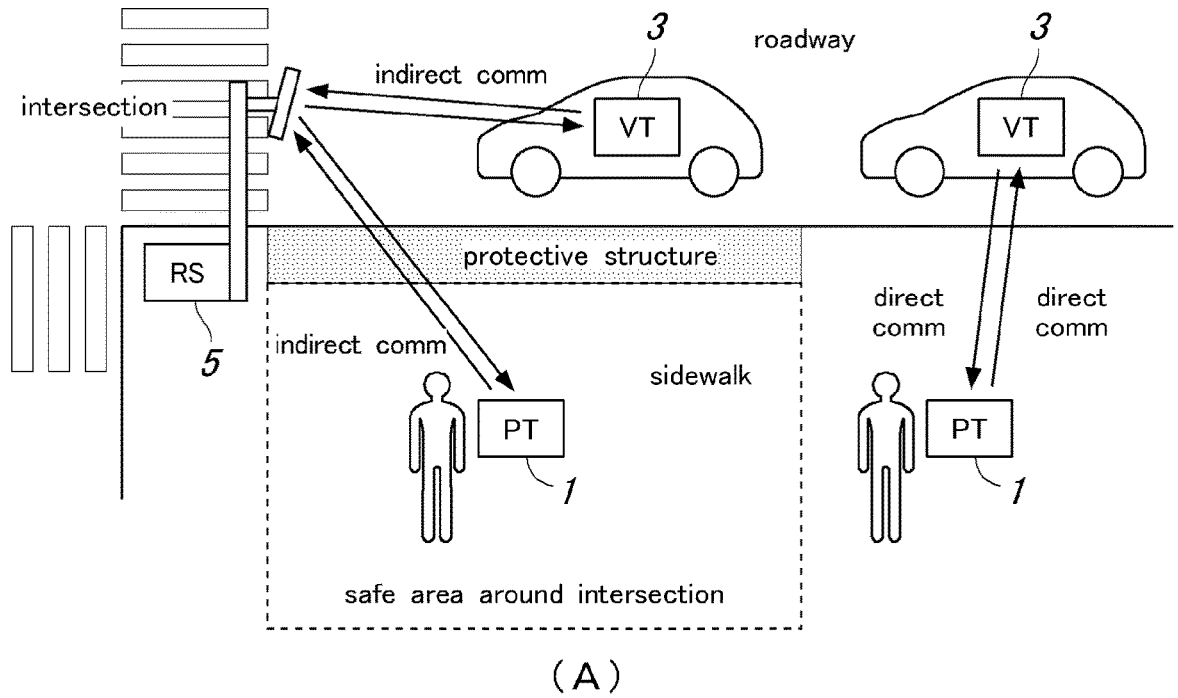
(A)
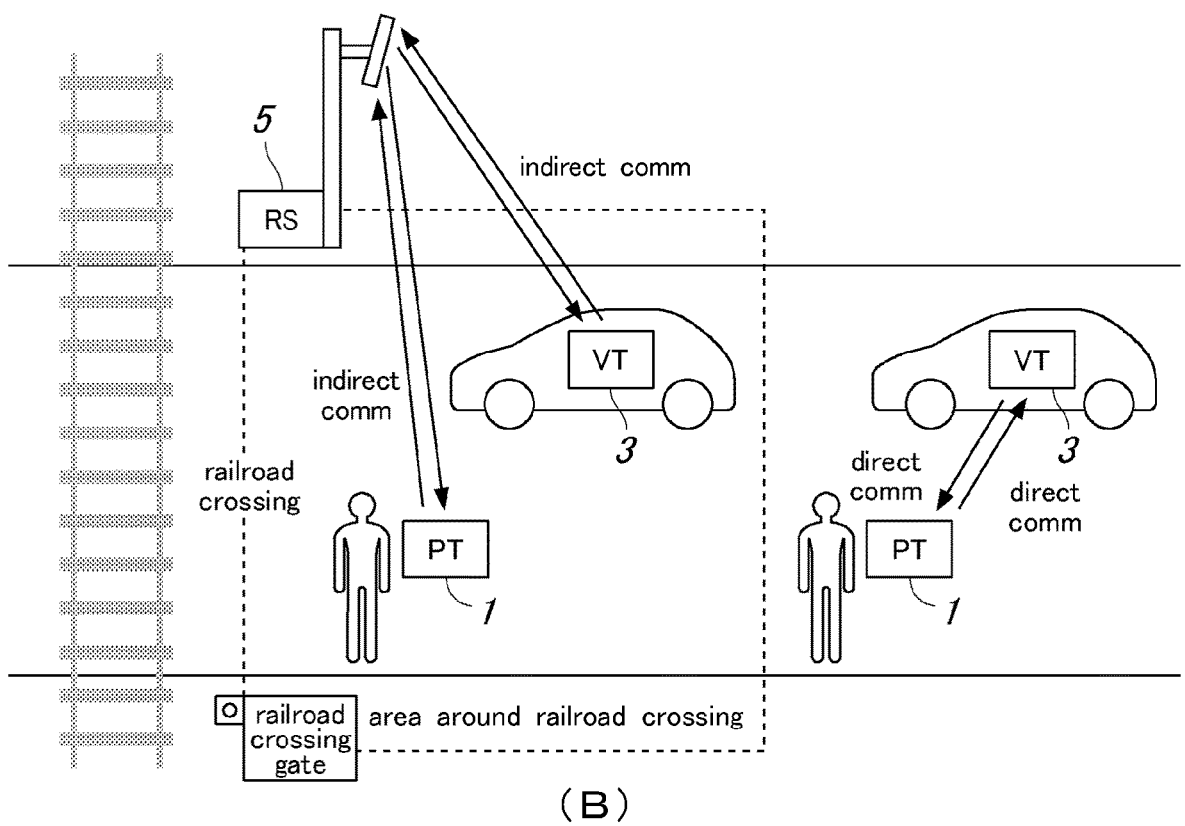
(B)

Fig.12
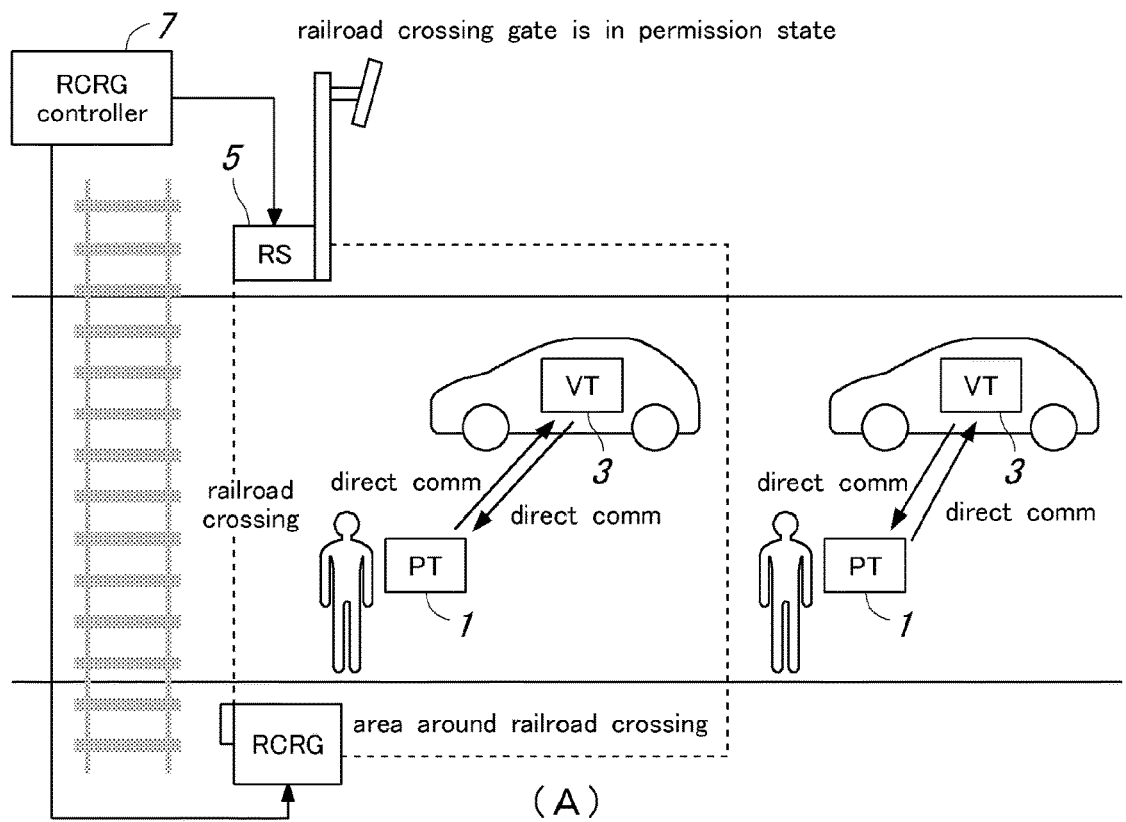
(A)
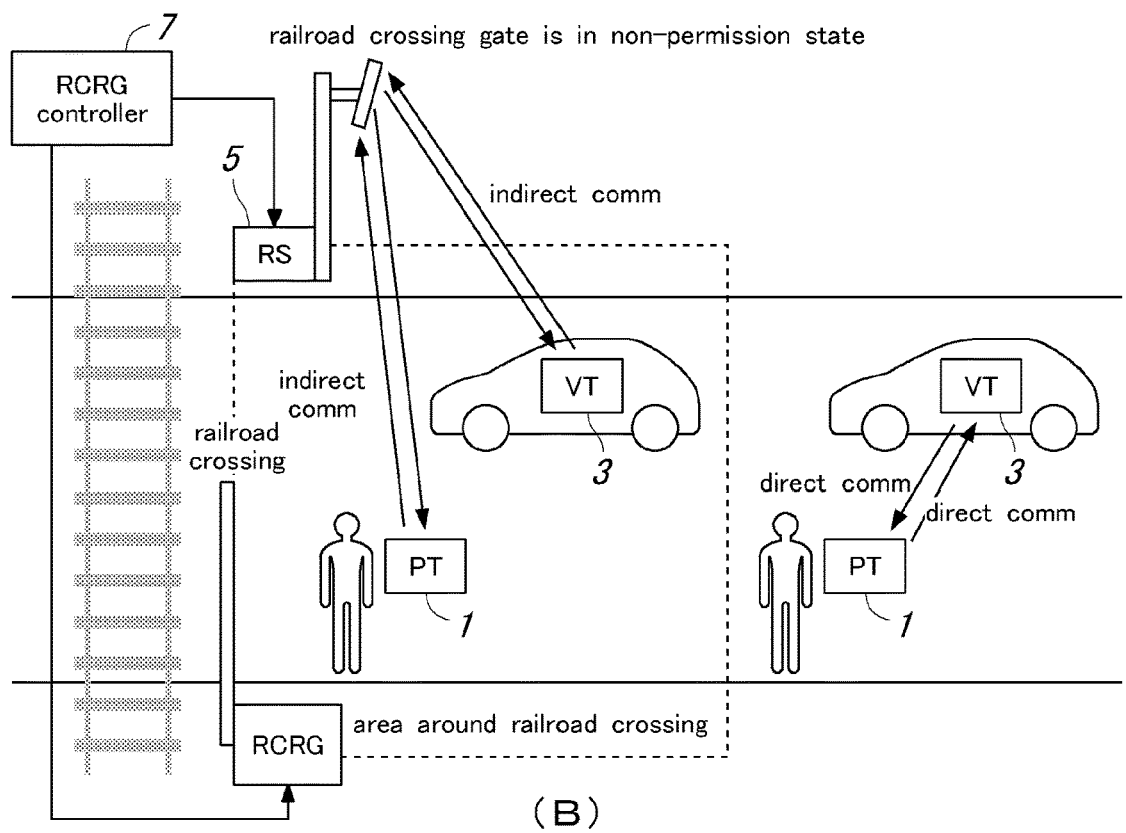
(B)

Fig.14
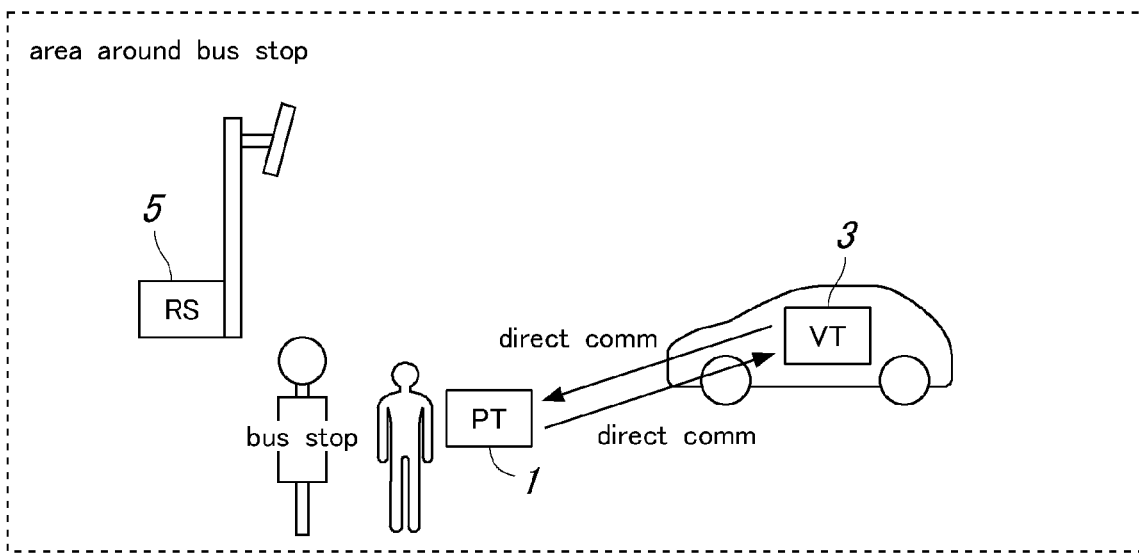
(A)
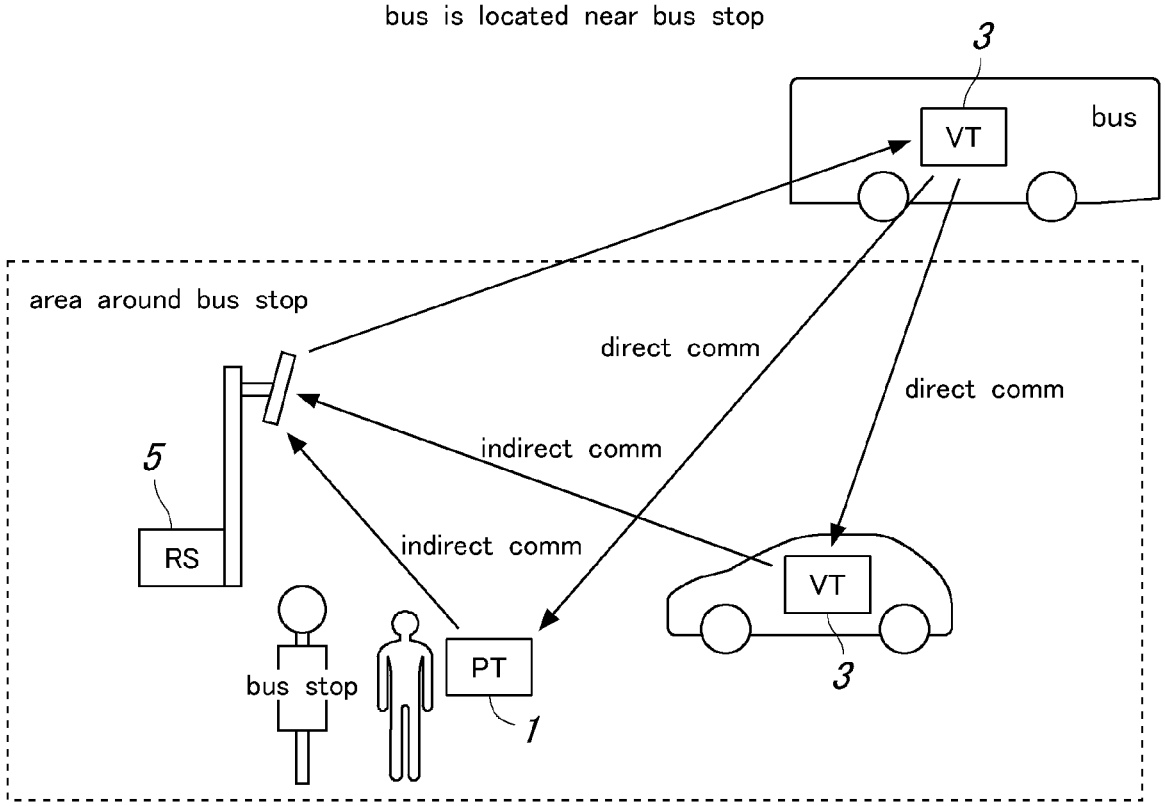
(B)

Fig.20
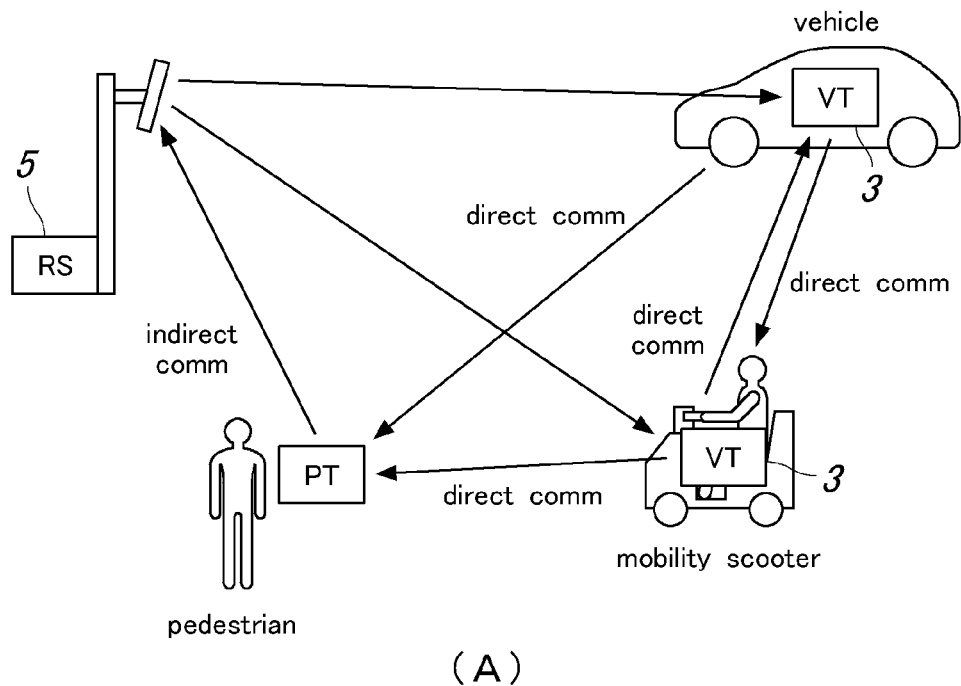
(A)
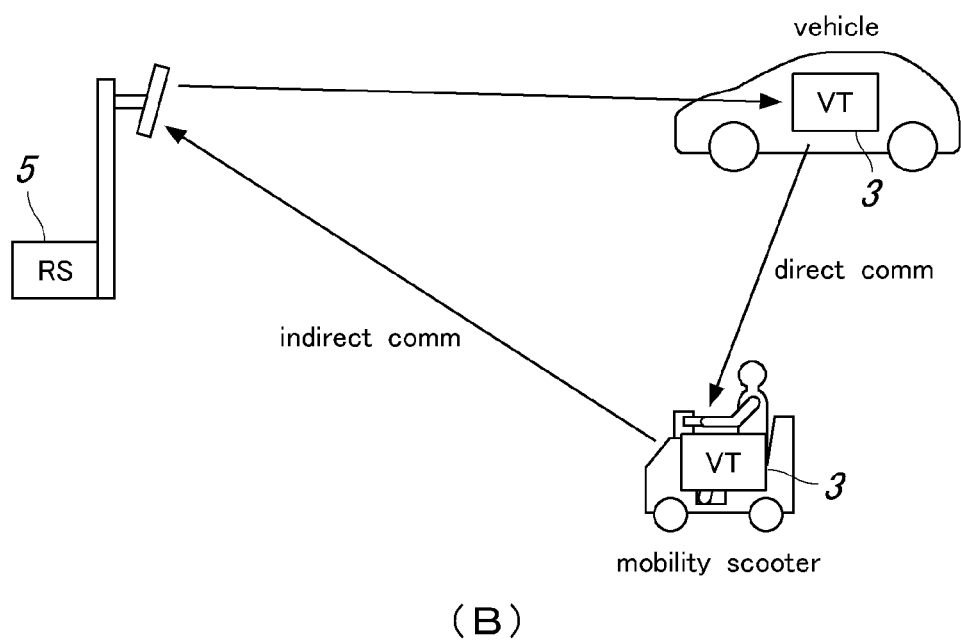
(B)

Fig.21 priority table

| terminal attribute | | priority |
|---|---|---|
| pedestrian | | 3 priority: low |
| low-speed VEH | bicycle mobility scooter | 2 priority: middle |
| high-speed VEH | car motorcycle | 1 priority: high |

*Fig.25* message transmitted from PD terminal

| common area | | | free area (extended area) | |
|---|---|---|---|---|
| PD-ID | position info | ... | specific person info (1bit) | ... |
| #b | LON z, LAT v | ... | 1 | ... |

Fig.28 message transmitted from IV terminal

| common area | | | free area (extended area) | |
|---|---|---|---|---|
| VEH-ID | position info | ... | specific VEH info (1bit) | ... |
| #a | LON z, LAT v | ... | 1 | ... |

Fig.30 message transmitted from IV terminal

| common area | | | free area (extended area) | | |
|---|---|---|---|---|---|
| VEH-ID | position info | ... | specific VEH info (1bit) | emergency VEH Info (1bit) | ... |
| #a | LON z, LAT v | ... | 1 | 1 | ... |

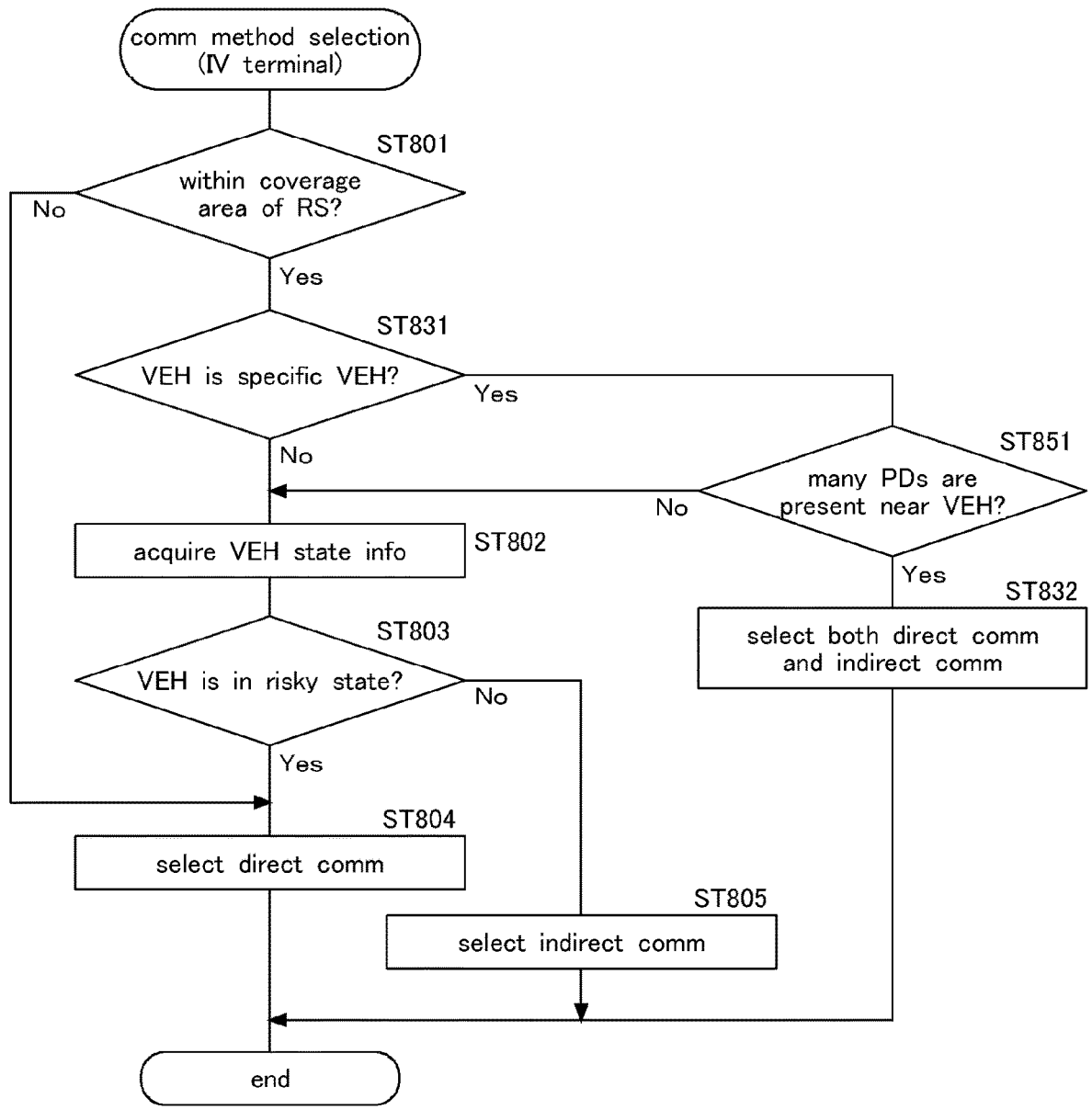

TERMINAL DEVICE, ROADSIDE DEVICE, COMMUNICATIONS SYSTEM, AND COMMUNICATIONS METHOD

TECHNICAL FIELD

The present invention relates to a terminal device for transmitting a message including the terminal device's position information to a different terminal device through pedestrian-to-vehicle communication, a roadside device disposed on or near a road for communicating with terminal devices, a communications system comprising: a terminal device and a roadside device, and a communications method by which a terminal device transmits a message to a different terminal device through pedestrian-to-vehicle communication.

BACKGROUND ART

In recent years, studies have been in progress for the practical and widespread use of safe driving assistance wireless systems utilizing ITS (Intelligent Transport System). In such safe driving assistance wireless systems, in-vehicle terminal devices mounted in vehicles perform vehicle-to-vehicle communication with each other and the in-vehicle terminal devices and roadside devices disposed on or near roads perform roadside-to-vehicle communication with each other, whereby the in-vehicle terminals transmit messages, the messages including vehicles' position information and other information, to each other so as to provide necessary alerts to drivers in order to prevent accidents.

In addition, in recent years, pedestrian-to-vehicle communication technologies have been presented in which a pedestrian terminal device carried by a pedestrian communicates directly with in-vehicle terminal devices in order to prevent pedestrian accidents. In this pedestrian-to-vehicle communication, direct communication between a pedestrian terminal device and an in-vehicle terminal device enables alerts to be timely provided to both the pedestrian and the vehicle drivers, which is expected to significantly prevent traffic accidents involving pedestrians.

When such a pedestrian-to-vehicle communication is performed in a place where many pedestrians and vehicles tend to be present such as at an intersection in a downtown area, congestion in pedestrian-to-vehicle communications is likely to occur due to increased pedestrian-to-vehicle communication traffic. Since such congestion in pedestrian-to-vehicle communications is required to be avoided as much as possible, there is a need to reduce pedestrian-to-vehicle communication traffic.

Prior art technologies concerning reduction in pedestrian-to-vehicle communication traffic include a communication system in which an in-vehicle terminal device is capable of establishing first communication (V2X communication: road-vehicle communication and pedestrian-to-vehicle communication) with a roadside device and pedestrian-carried terminal devices, and the roadside device is capable of establishing second communication such as wireless LAN communication with pedestrian-carried terminal devices and establishing the first communication (road-vehicle communication) with in-vehicle terminal devices (See Patent Document 1).

PRIOR ART DOCUMENT (S)

Patent Document(S)

Patent Document 1: JP2017-068335A

SUMMARY OF THE INVENTION

Task to be Accomplished by the Invention

In cases of a pedestrian-to-vehicle communication system is configured to perform a second communication which is different from pedestrian-to-vehicle communication, the system can prevent occurrence of congestion in pedestrian-to-vehicle communications even when the number of concurrently connected terminal devices is increased. However, when such a communication system is configured such that indirect communication is used to transmit messages between pedestrian-carried terminal devices and in-vehicle terminals device via a roadside device, it takes some time to transmit a message between a pedestrian-carried terminal device and an in-vehicle terminal device. Thus, when a pedestrian or vehicle carrying a terminal device is in a risky state, direct communication (pedestrian-to-vehicle communication) is preferably used in order to ensure that the presence of the pedestrian and/or vehicle is quickly notified to nearby pedestrians and vehicles.

Moreover, when a communication quality level of pedestrian-to-vehicle communication is decreased and/or packet collision frequently occurs due to increased pedestrian-to-vehicle communication traffic, packet retransmission frequently occurs due to packet errors caused by communication failures. In such cases, it sometimes takes longer time to transfer messages when using direct communication (pedestrian-to-vehicle communication), which normally enables faster transfer of messages, than when using indirect communication. In other cases, when a pedestrian is a person who needs to be supervised such as dementia patient and/or a vehicle is an emergency vehicle such as an ambulance or a fire truck, the presence of such a pedestrian and/or a vehicle needs to be notified to nearby pedestrians and vehicle drivers as quickly as possible. Thus, when a message to be notified is of particularly high emergency, it is preferable to use both direct and indirect communication as communication methods in order to transmit messages.

The present invention has been made in view of the problem of the prior art, and a primary object of the present invention is to provide a terminal device, a roadside device, a communications system, and a communications method which can select a proper one or both of two communication methods used for communication; that is, communication methods using pedestrian-to-vehicle communication (direct communication) and indirect communication via a roadside device, to thereby ensure that the presence of a pedestrian and/or a vehicle is quickly notified to nearby pedestrians and vehicle drivers while preventing congestion in pedestrian-to-vehicle communications.

Means to Accomplish the Task

An aspect of the present invention provides a terminal device for transmitting a message including the terminal device's position information to a different terminal device through pedestrian-to-vehicle communication, the terminal device comprising: a first communication device configured to communicate with the different terminal device by using a first communication method which is a direct communication method, in which direct communication is performed as the pedestrian-to-vehicle communication; a second communication device configured to communicate with the different terminal device by using a second communication method which is an indirect communication method, in which indirect communication is performed via a roadside device disposed on or near a road; and; and a controller configured to select either one or both of the direct communication and the indirect communication based on device information, the device information including state information indicating a state of the terminal device and/or attribute information indicating an attribute of the terminal device, and to transmit the message to the different terminal device by using one or both of the direct communication method and the indirect communication method selected by the controller.

Another aspect of the present invention provides a roadside device disposed on or near a road for communicating with terminal devices, comprising: a communication device configured to relay a message transmitted between the terminal devices, wherein the message includes a terminal device's position information; and a controller configured to collect device information including state information indicating a state of the terminal device and/or attribute information indicating an attribute of the terminal device, to select either one or both of a direct communication method, in which direct communication is performed between the terminal devices, and an indirect communication method, in which indirect communication is performed between the terminal devices via the roadside device, based on the device information, and to transmit a message including information indicating either one or both of the direct communication and the indirect communication selected by the controller from the communication device to the terminal devices.

Yet another aspect of the present invention provides a communication system a communications system comprising: a terminal device configured to transmit a message including the terminal device's position information to a different terminal device through pedestrian-to-vehicle communication; and a roadside device disposed on or near a road and configured to communicate with terminal devices, wherein the terminal device comprises: a first communication device configured to communicate with the different terminal device by using a first communication method which is a direct communication method, in which direct communication is performed as the pedestrian-to-vehicle communication; a second communication device configured to communicate with the different terminal device by using a second communication method which is an indirect communication method, in which indirect communication is performed via the roadside device; and a controller configured to select either one or both of the direct communication and the indirect communication based on device information, the device information including state information indicating a state of the terminal device and/or attribute information indicating attribute of the terminal device, and to transmit the message to the different terminal device by using the selected one or both of the direct communication method and the indirect communication method.

Yet another aspect of the present invention provides a communications method by which a terminal device transmits a message to a different terminal device through pedestrian-to-vehicle communication, the message including the terminal device's position information, the method comprising: selecting either one or both of a first communication method which is a direct communication method, in which direct communication is performed as the pedestrian-to-vehicle communication, and a second communication method which is an indirect communication method, in which indirect communication is performed via a roadside device disposed on or near a road; and transmitting the message to the different terminal device by using either one or both of the direct communication method and the indirect communication method selected in the previous step.

Effect of the Invention

A configuration according to the present invention can select either one or both of a direct communication method and an indirect communication method as a communication method used for communication between terminal devices based on device information, to thereby ensure that the presence of a pedestrian and/or a vehicle is quickly notified to nearby pedestrians and vehicle drivers while preventing congestion in pedestrian-to-vehicle communications.

BRIEF DESCRIPTION OF THE DRAWINGS

FIG. 6 is a flowchart showing operation procedures of operations performed by a pedestrian terminal 1, an in-vehicle terminal 3, and a roadside device 5 when the pedestrian terminal 1 transmits a message according to the first embodiment of the present invention;

FIG. 9 is an explanatory view showing situations where messages are transmitted between a pedestrian terminal 1 and an in-vehicle terminal 3 according to a second embodiment of the present invention;

FIG. 12 is an explanatory view showing situations where messages are transmitted between a pedestrian terminal 1 and an in-vehicle terminal 3 according to a third embodiment of the present invention;

Figure 13:
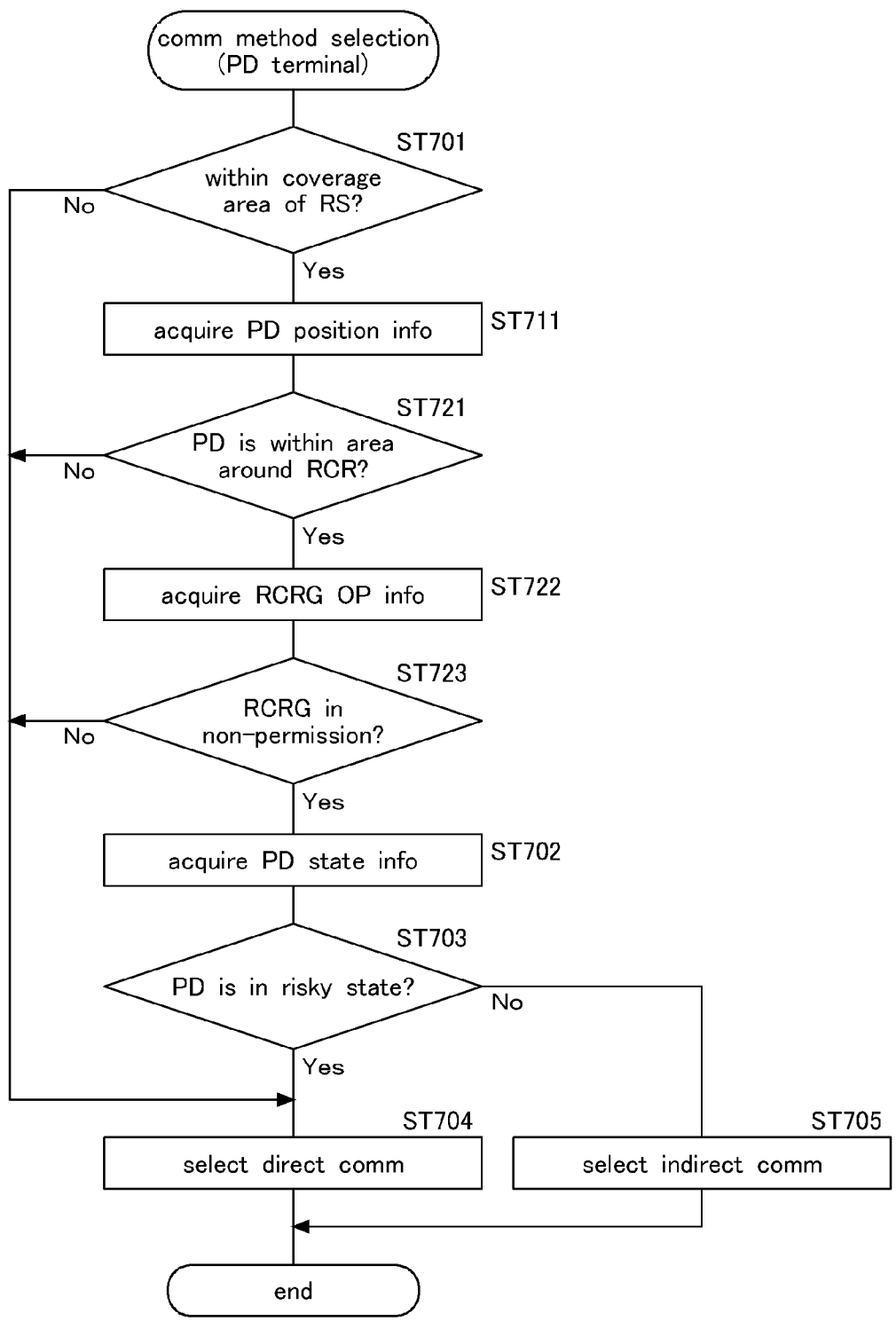
Figure 15:
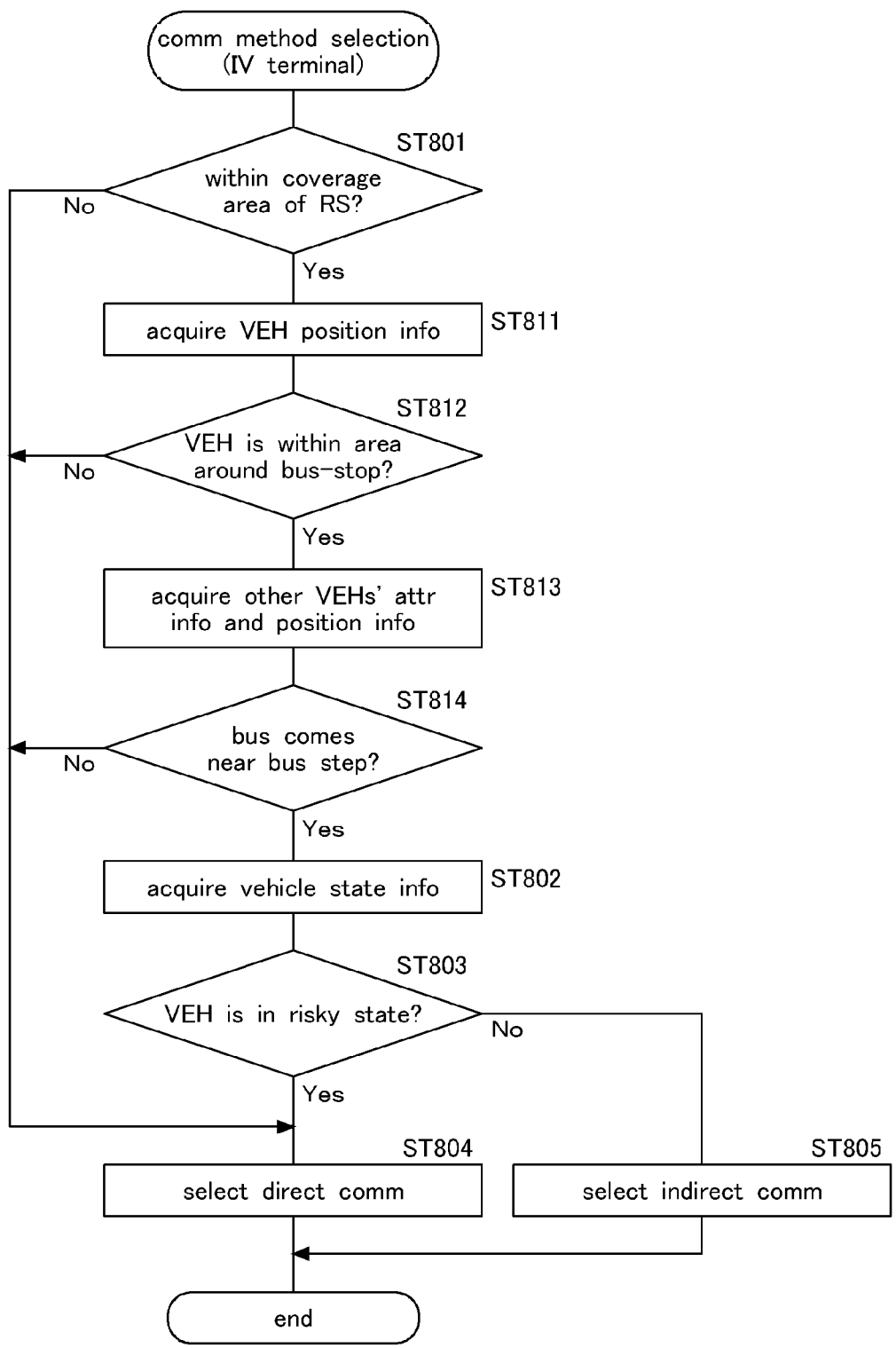
Figure 16:
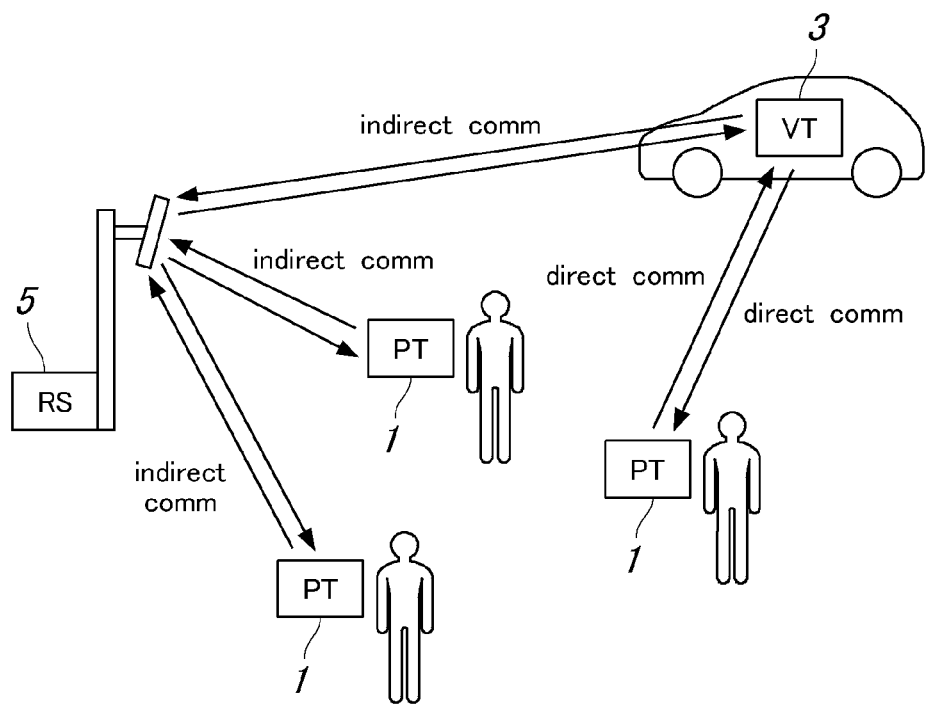
Figure 17:
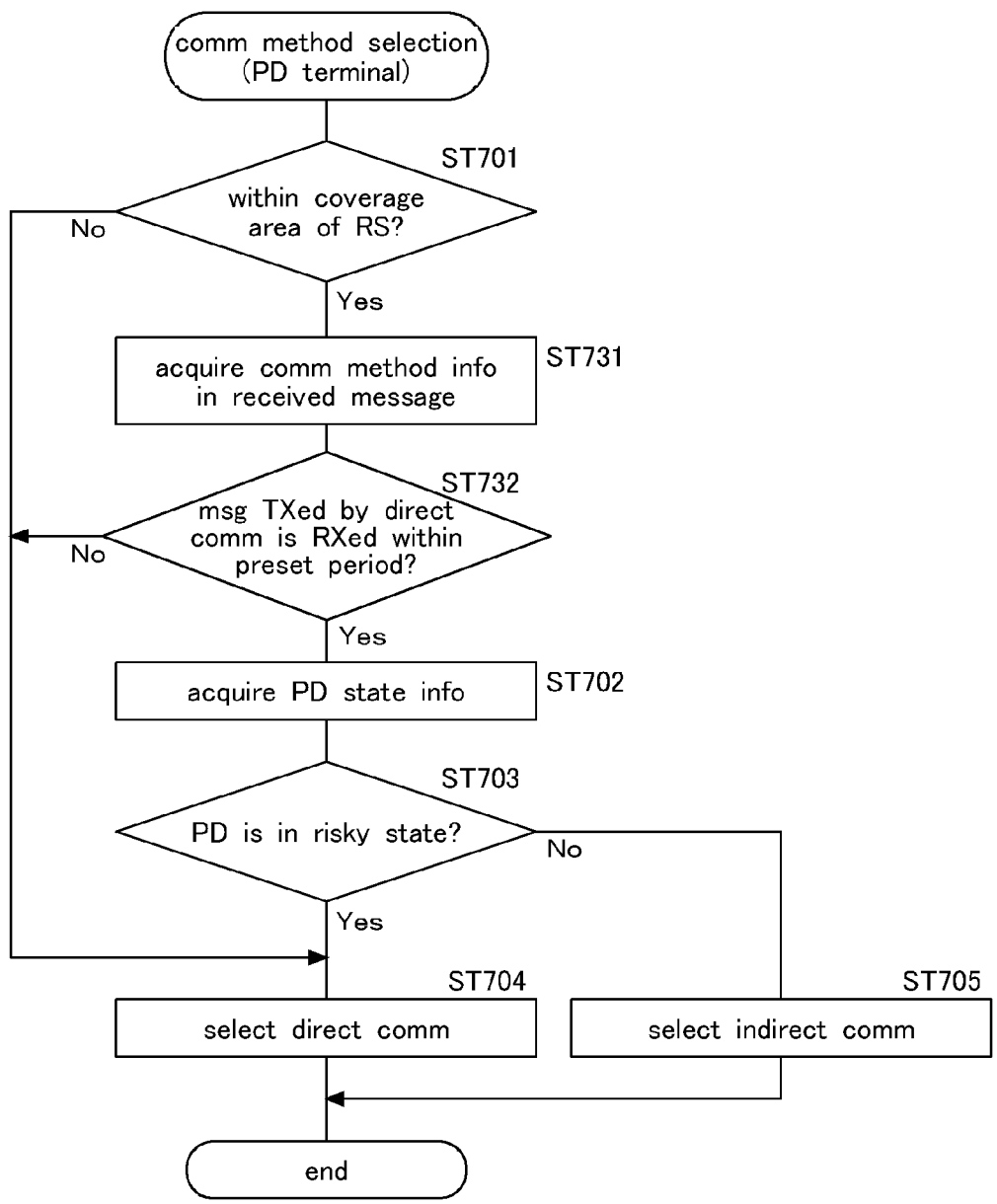
Figure 18:
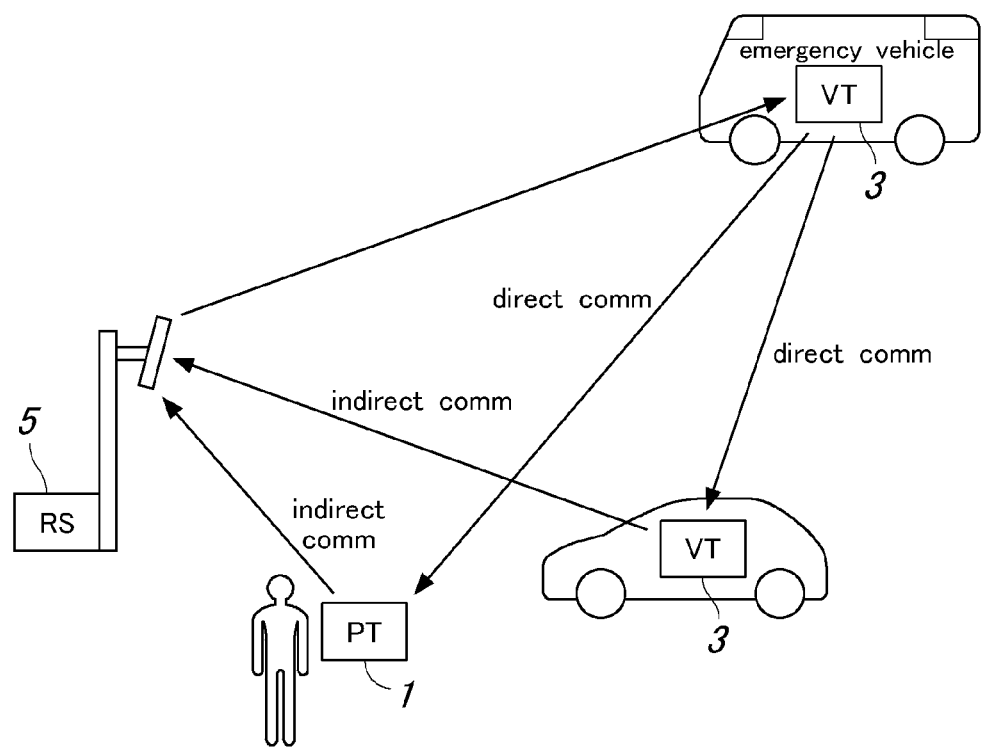
Figure 19:
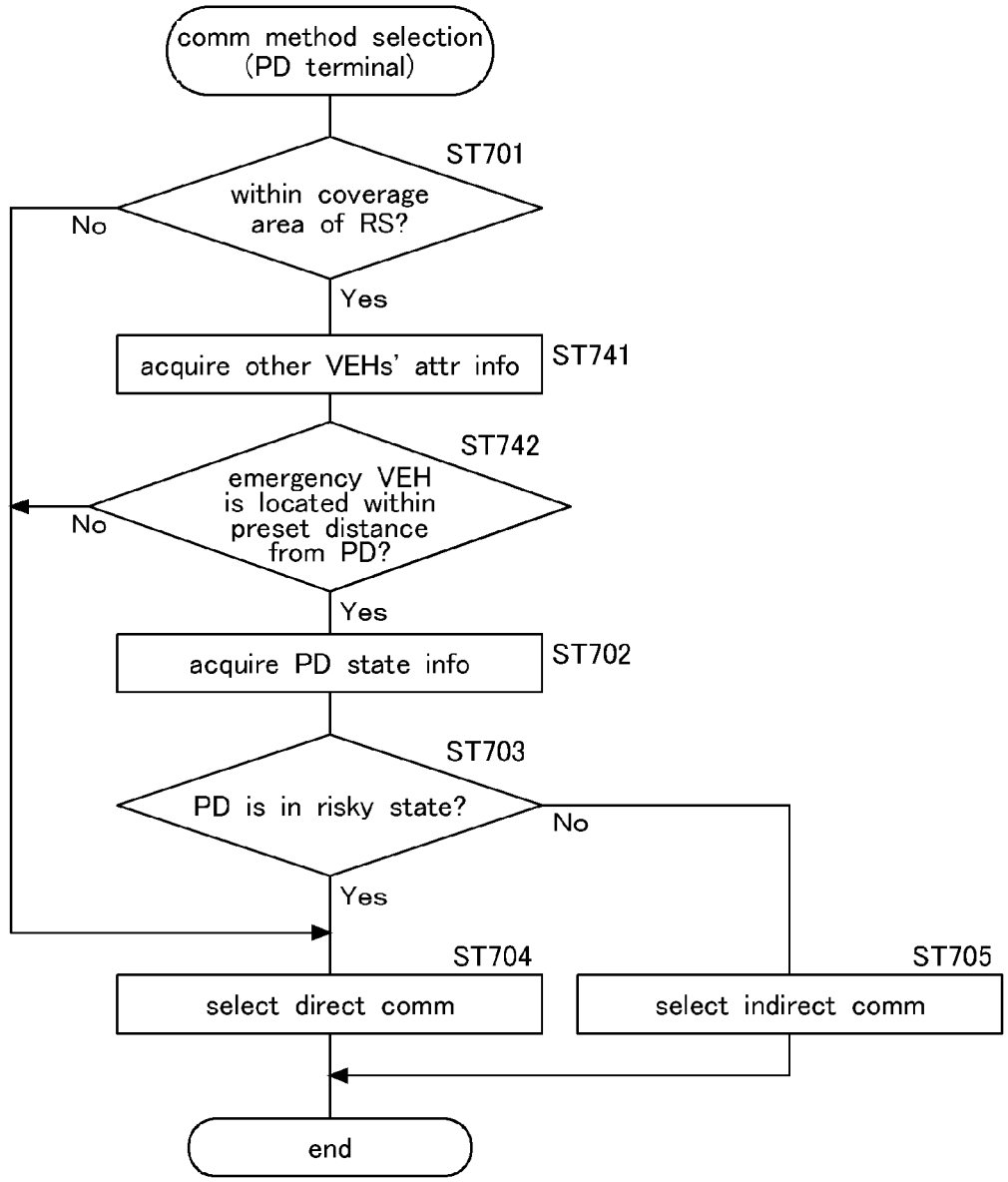
Figure 22:
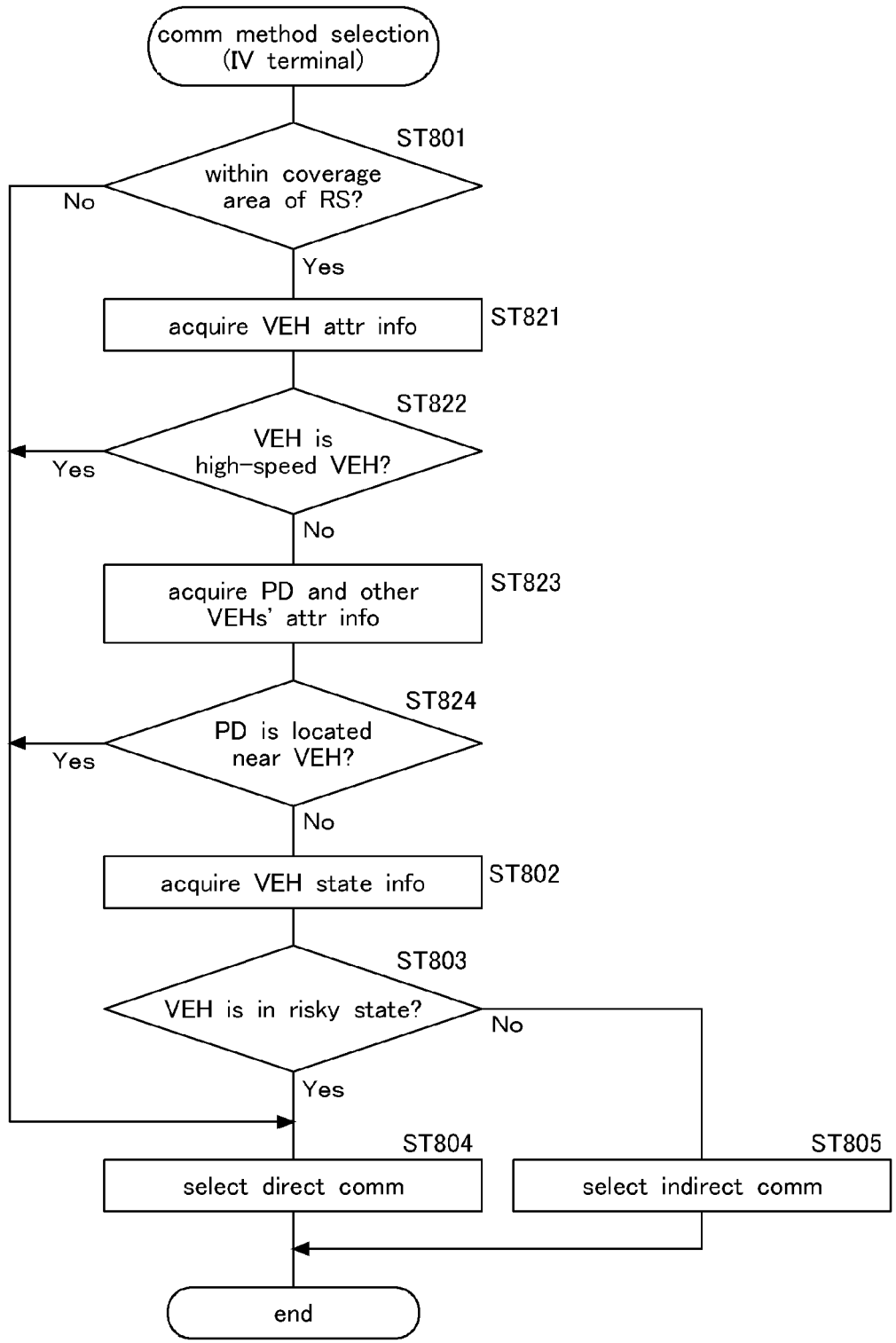
Figure 23:
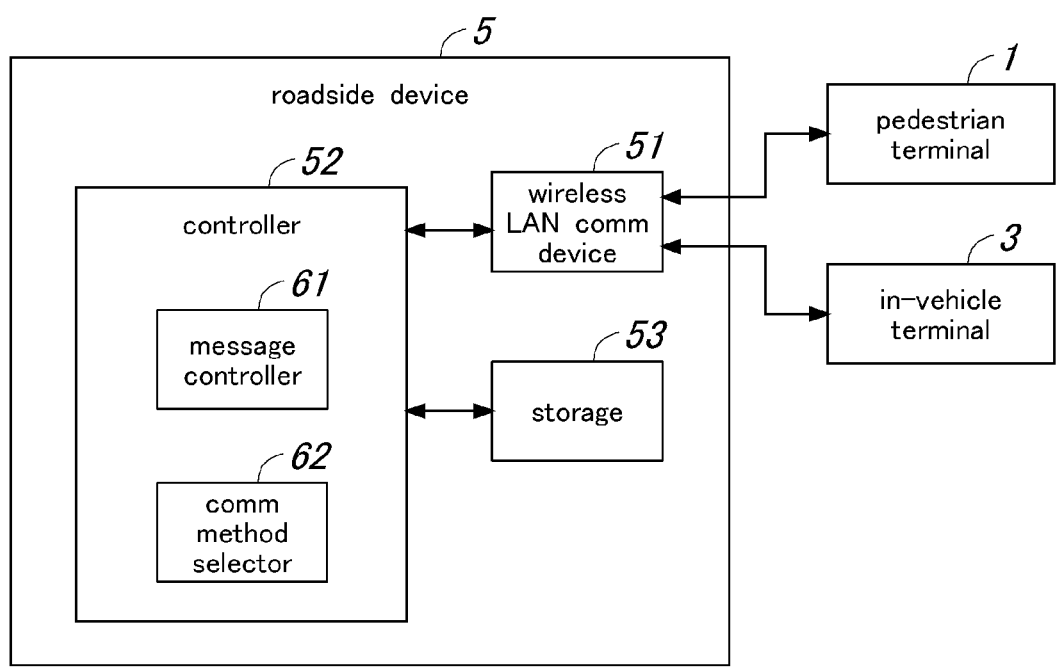
Figure 24:
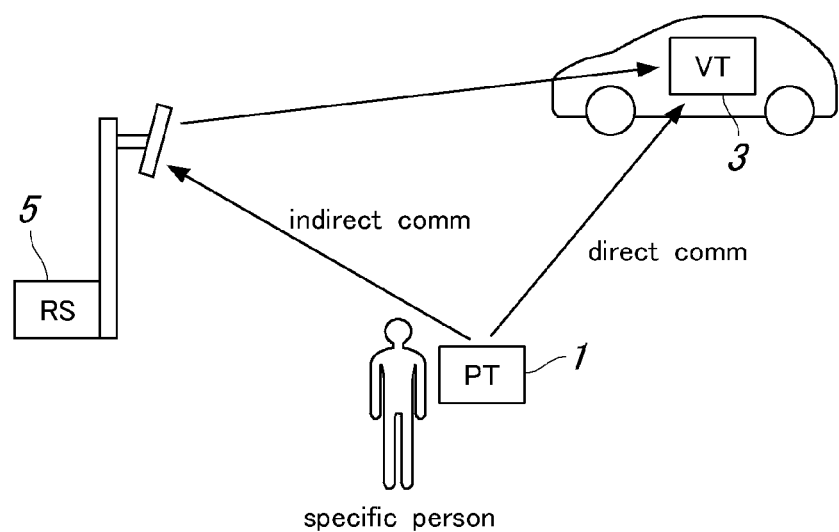
Figure 26:
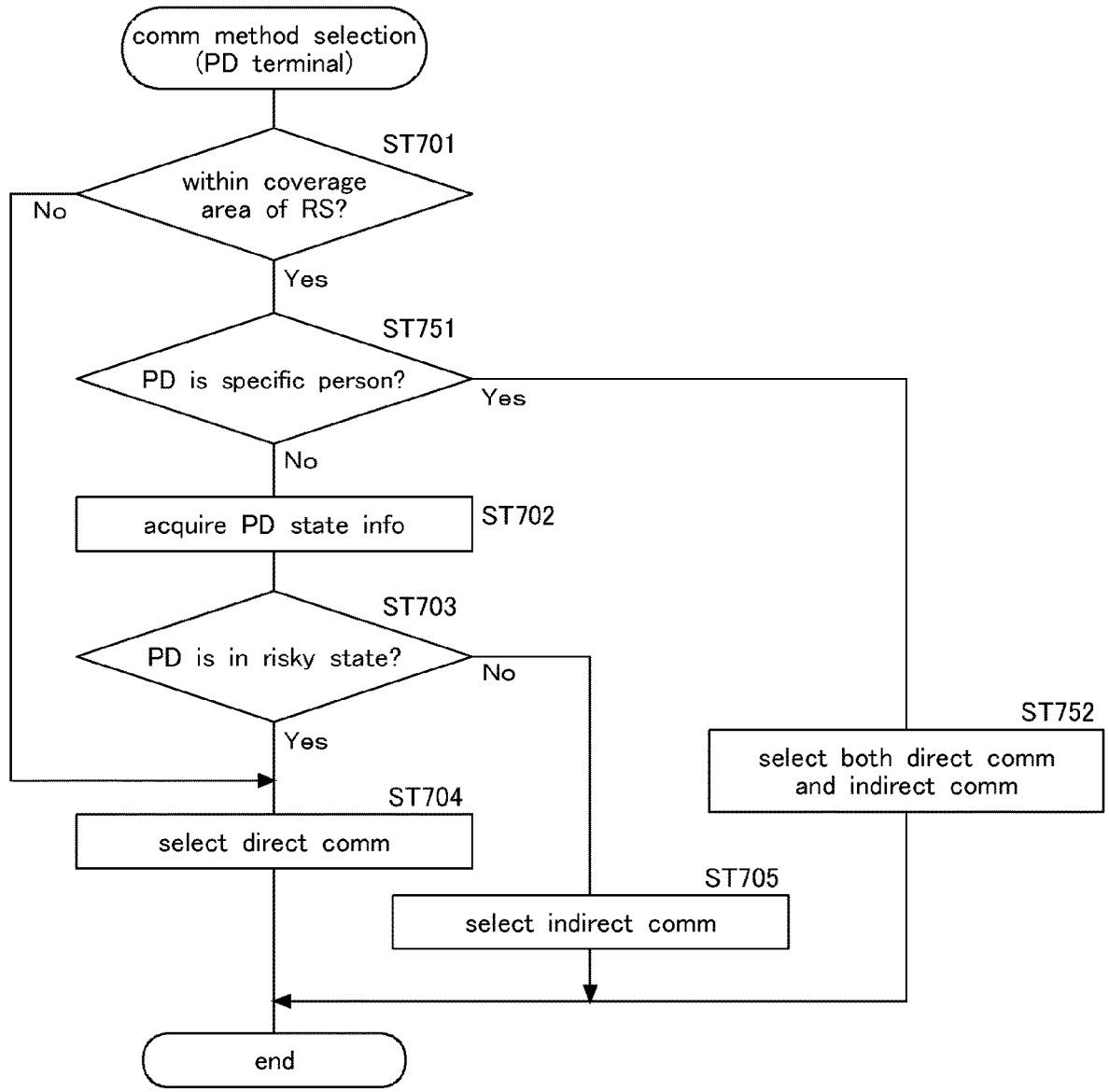
Figure 27:
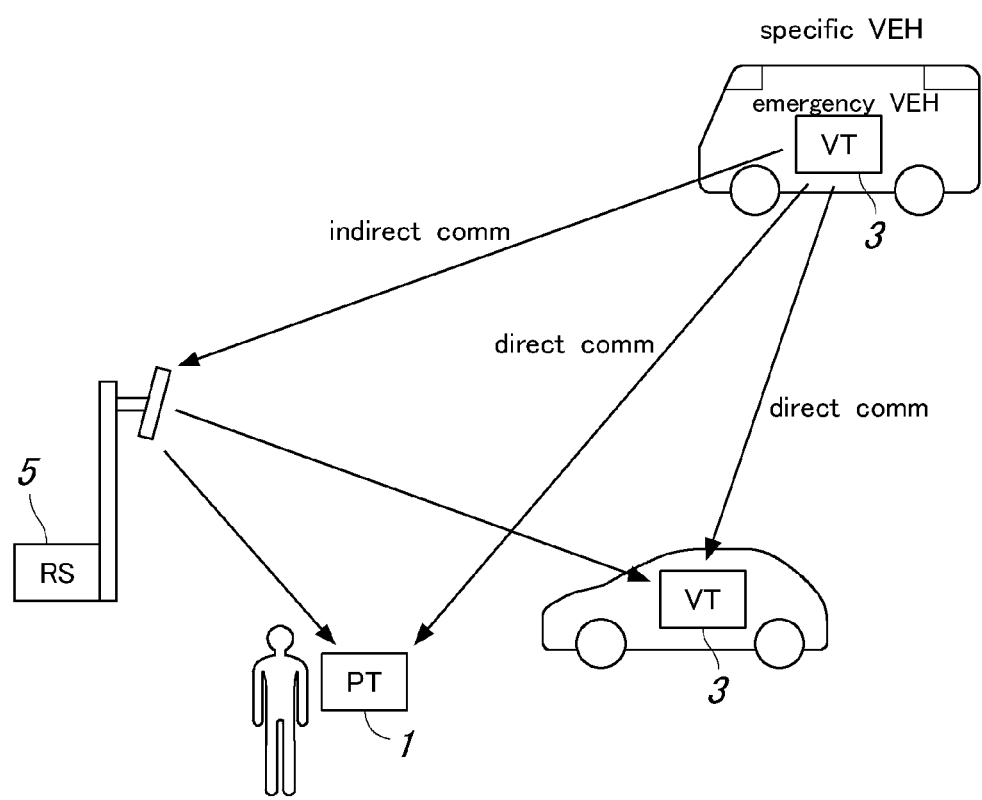
Figure 29:
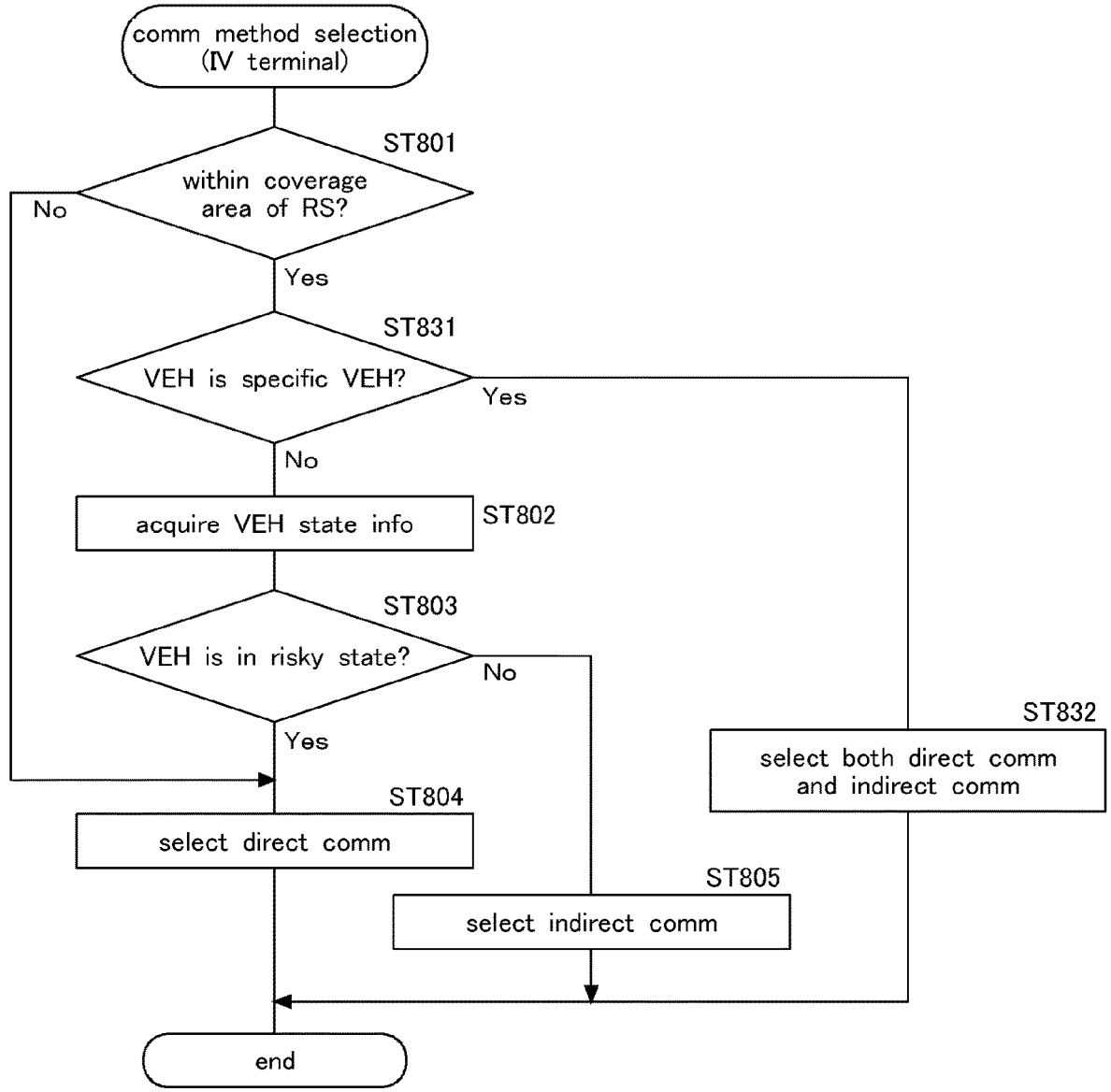
Figure 31:
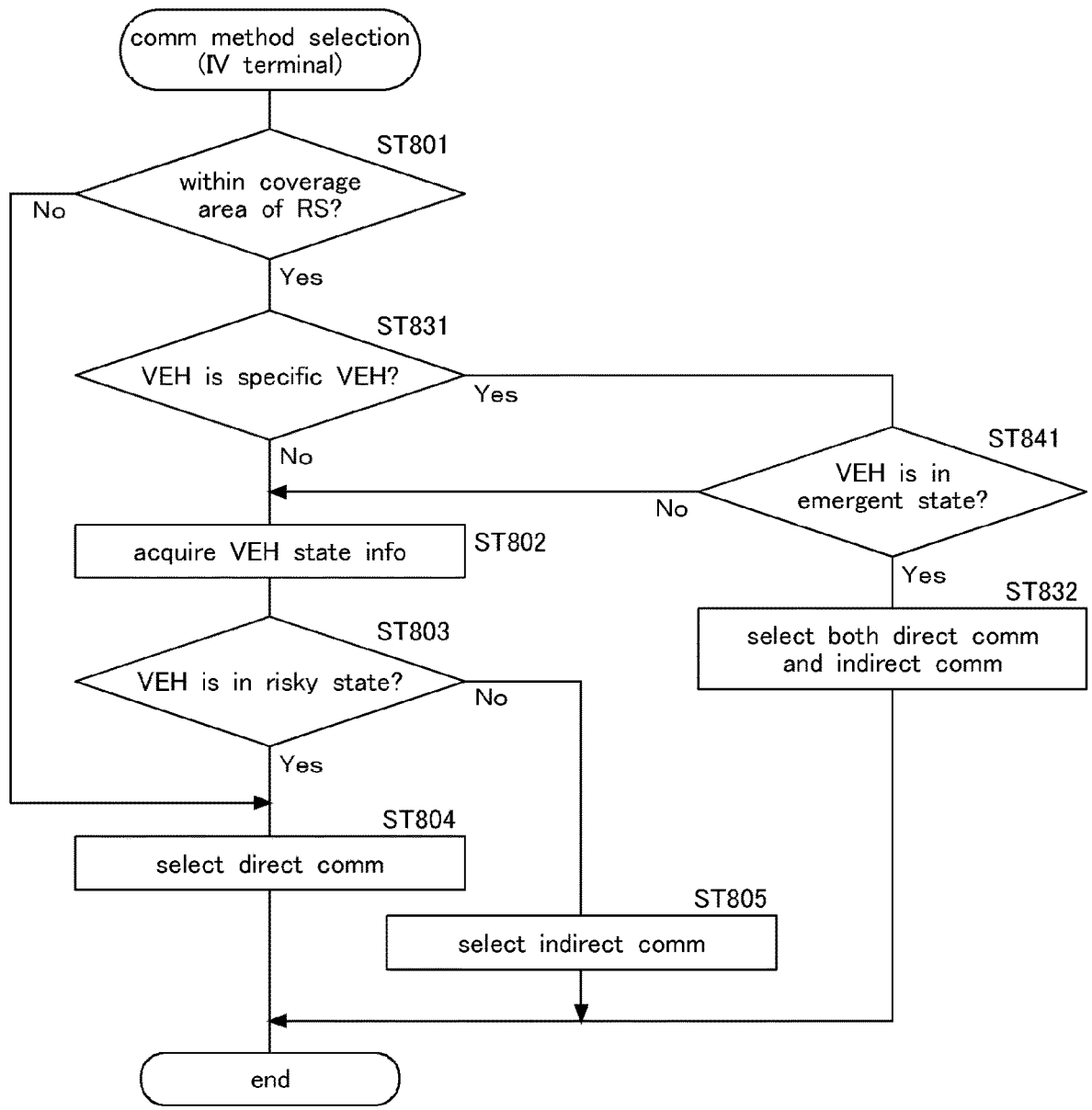

FIG. 13 is a flowchart showing an operation procedure of communication method selection operations performed by a pedestrian terminal 1 according to the third embodiment of the present invention;

FIG. 14 is an explanatory view showing situations where messages are transmitted between a pedestrian terminal 1 and an in-vehicle terminal 3 according to a fourth embodiment of the present invention;

FIG. 15 is a flowchart showing an operation procedure of communication method selection operations performed by an in-vehicle terminal 3 according to the fourth embodiment of the present invention;

FIG. 16 is an explanatory view showing situations where messages are transmitted between pedestrian terminals 1 and an in-vehicle terminal 3 according to a fifth embodiment of the present invention;

FIG. 17 is a flowchart showing an operation procedure of communication method selection operations performed by a pedestrian terminal 1 according to the fifth embodiment of the present invention;

FIG. 18 is an explanatory view showing a situation where messages are transmitted between a pedestrian terminal 1 and in-vehicle terminals 3 according to a sixth embodiment of the present invention;

FIG. 19 is a flowchart showing an operation procedure of communication method selection operations performed by a pedestrian terminal 1 according to the sixth embodiment of the present invention;

FIG. 20 is an explanatory view showing situations where messages are transmitted between a pedestrian terminal 1 and in-vehicle terminals 3 according to a seventh embodiment of the present invention;

FIG. 21 is an explanatory diagram showing an example of registered data in a priority table according to the seventh embodiment of the present invention;

FIG. 22 is a flowchart showing an operation procedure of communication method selection operations performed by an in-vehicle terminal 3 according to the seventh embodiment of the present invention;

FIG. 23 is a block diagram showing a schematic configuration of a roadside device 5 according to an eighth embodiment of the present invention;

FIG. 24 is an explanatory view showing situations where messages are transmitted between a pedestrian terminal 1 and an in-vehicle terminal 3 according to a ninth embodiment of the present invention;

FIG. 25 is an explanatory view showing contents of a message transmitted from a pedestrian terminal 1 according to the ninth embodiment of the present invention;

FIG. 26 is a flowchart showing an operation procedure of communication method selection operations performed by a pedestrian terminal 1 according to the ninth embodiment of the present invention;

FIG. 27 is an explanatory view showing situations where messages are transmitted between a pedestrian terminal 1 and in-vehicle terminals 3 according to a tenth embodiment of the present invention;

FIG. 28 is an explanatory view showing contents of a message transmitted from an in-vehicle terminal 3 according to the tenth embodiment of the present invention;

FIG. 29 is a flowchart showing an operation procedure of communication method selection operations performed by an in-vehicle terminal 3 according to the tenth embodiment of the present invention;

FIG. 30 is an explanatory view showing contents of a message transmitted from an in-vehicle terminal 3 according to an eleventh embodiment of the present invention;

FIG. 31 is a flowchart showing an operation procedure of communication method selection operations performed by an in-vehicle terminal 3 according to the eleventh embodiment of the present invention; and FIG. 32 is a flowchart showing an operation procedure of communication method selection operations performed by an in-vehicle terminal 3 according to a twelfth embodiment of the present invention.

DESCRIPTION OF THE PREFERRED EMBODIMENT(S)

A first aspect of the present invention made to achieve the above-described object is a terminal device for transmitting a message including the terminal device's position information to a different terminal device through pedestrian-to-vehicle communication, the terminal device comprising: a first communication device configured to communicate with the different terminal device by using a first communication method which is a direct communication method, in which direct communication is performed as the pedestrian-to-vehicle communication; a second communication device configured to communicate with the different terminal device by using a second communication method which is an indirect communication method, in which indirect communication is performed via a roadside device disposed on or near a road; and a controller configured to select either one or both of the direct communication and the indirect communication based on device information, the device information including state information indicating a state of the terminal device and/or attribute information indicating an attribute of the terminal device, and to transmit the message to the different terminal device by using one or both of the direct communication method and the indirect communication method selected by the controller.

This configuration can select either one or both of the direct communication method and the indirect communication method based on device information, thereby making it possible to ensure that the presence of a pedestrian and/or a vehicle is quickly notified to nearby pedestrians and vehicle drivers while preventing congestion in pedestrian-to-vehicle communications.

A second aspect of the present invention is the terminal device of the first aspect, wherein the controller is configured to determine whether or not the terminal device is in a risky state based on the state information included in the device information, and select either one of the direct communication method and the indirect communication method based on a result of the determination.

This configuration can switch the direct communication method and the indirect communication method as appropriate based on a state of pedestrian or vehicle, thereby making it possible to ensure that the presence of a terminal device (a pedestrian or a vehicle) which is in a risky state is quickly notified to nearby pedestrians and vehicle drivers while preventing congestion in pedestrian-to-vehicle communications.

A third aspect of the present invention is the terminal device of the second aspect, wherein the controller is configured such that, when detecting a user of the terminal device taking a predetermined risky action, the controller determines that the terminal device is in the risky state based on the state information.

This configuration can ensure that the presence of a pedestrian who takes a risky action is quickly notified to nearby pedestrians and vehicle drivers.

A fourth aspect of the present invention is the terminal device of the second aspect, wherein the controller is configured such that, when detecting a vehicle carrying the terminal device exhibits a predetermined risky driving behavior, the controller determines that the terminal device is in the risky state based on the state information.

This configuration can ensure that the presence of a vehicle which exhibits a risky driving behavior is quickly notified to nearby pedestrians and vehicle drivers.

A fifth aspect of the present invention is the terminal device of the second aspect, wherein the controller is configured such that, when detecting the terminal device being located within a predetermined risky area, the controller determines that the terminal device is in the risky state based on the state information.

This configuration can ensure that the presence of a pedestrian who is located within a risky area is quickly notified to nearby pedestrians and vehicle drivers.

A sixth aspect of the present invention is the terminal device of the second aspect, wherein the controller is configured such that, when detecting that the terminal device is moving at a speed greater than a predetermined speed value, the controller determines that the terminal device is in the risky state based on the state information.

This configuration can ensure that the presence of a terminal device (a pedestrian or a vehicle) which is moving at a high speed is quickly notified to nearby pedestrians and vehicle drivers.

A seventh aspect of the present invention is the terminal device of the first aspect, wherein the controller is configured to determine whether or not the terminal device is located within a specific area based on the position information and map information, and select either one or both of the first communication method and the second communication method based on a result of the determination.

This configuration can prevent congestion in pedestrian-to-vehicle communications (direct communications) even when a number of terminal devices are located within a specific area.

An eighth aspect of the present invention is the terminal device of the seventh aspect, wherein the controller is configured to determine whether or not the terminal device is located within the specific area, wherein the specific area is selected from a group consisting of an area around an intersection under a predetermined condition, an area around a railroad crossing, and an area around a stop for a specific type vehicle.

A degree of risk is low in an area around an intersection which meets a predetermined condition (e.g. being in a sidewalk separated from a roadway by a structure or being in an area around a railroad crossing where vehicles temporarily stop an travel slowly at the railroad crossing). Thus, this configuration makes it possible to avoid reduction in safety even if a terminal device performs indirect communication with another terminal device located within such a specific area with a low risk. Moreover, since, in an area around a stop for a specific type vehicle, this configuration enables a roadside device to receive information from a terminal device in the area by indirect communication and determine whether or not a user of the terminal device is getting on a bus based on the received information, it is possible to avoid misrecognizing a person who is getting on a bus as a risky person running into or crossing a road.

A ninth aspect of the present invention is the terminal device of the seventh aspect, wherein the controller is configured such that, when being located within an area around a railroad crossing as the specific area, the controller determines whether or not a railroad crossing gate is in a non-passage state based on information on the railroad crossing gate's operation acquired from a railroad crossing gate controller, and select either one or both of the first communication method and the second communication method based on a result of the determination.

A degree of risk is low in an area around a railroad crossing when a railroad crossing gate is in a non-passage state as vehicles temporarily stop and travel slowly at the railroad crossing. Thus, this configuration makes it possible to avoid reduction in safety even if a terminal device performs indirect communication with another terminal device located within such an area around a railroad crossing with a low risk.

A tenth aspect of the present invention is the terminal device of the seventh aspect, wherein the controller is configured such that, when being located within the specific area which is an area around a stop for a specific type vehicle, the controller determines whether or not a different vehicle which is the specific type vehicle and carries the different terminal device comes within a predetermined distance from the stop based on the map information, attribute information indicating an attribute of the different vehicle and the different vehicle's position information included in a message received from the different terminal device, and select either one or both of the first communication method and the second communication method based on a result of the determination.

This configuration can ensure that pedestrians and vehicle drivers located around a stop for a specific type vehicle are quickly notified that such a specific type vehicle comes close to the stop by selecting the direct communication method as a communication method used for communication.

An eleventh aspect of the present invention is the terminal device of the first aspect, wherein the controller is configured to determine whether or not the different terminal device which is already performing the direct communication is located near the terminal device based on communication method information included in a message received from the different terminal device, and select either one or both of the first communication method and the second communication method based on a result of the determination.

This configuration can prevent congestion in pedestrian-to-vehicle communications (direct communications) by prioritizing direct communication which has started earlier by a terminal device so as to restrict direct communications by other terminal devices.

A twelfth aspect of the present invention is the terminal device of the first aspect, wherein the controller is configured to determine whether or not a different vehicle which is a specific type vehicle and carries the different terminal device located within a predetermined distance from the terminal device based on attribute information indicating an attribute of the different vehicle and the different vehicles position information included in a message received from the different terminal device, and select either one of the direct communication method and the indirect communication method based on a result of the determination.

This configuration can prevent congestion in pedestrian-to-vehicle communications (direct communications) and ensure that the presence of a specific type vehicle (such as an emergency vehicle) is quickly notified to nearby pedestrians and vehicle drivers by prioritizing direct communications performed by a terminal in the specific type vehicle so as to restrict direct communications performed by other terminal devices.

A thirteenth aspect of the present invention is the terminal device of the first aspect, wherein the controller is configured to determine a device type of the different terminal device located near the terminal device based on attribute information indicating an attribute of the different terminal device included in a message received from the different terminal device, and select either one of the direct communication method and the indirect communication method based on a degree of priority of the device type of the different terminal device.

This configuration can prevent congestion in pedestrian-to-vehicle communications (direct communications) and ensure that the presence of a terminal derive with a high priority is quickly notified to nearby pedestrians and vehicle drivers by prioritizing direct communication by the terminal with a high priority so as to restrict direct communications by other terminal devices.

A fourteenth aspect of the present invention is the terminal device of the first aspect, wherein the controller is configured to determine whether or not a user of the terminal device is a specific person based on the attribute information included in the device information, and wherein the controller is configured such that, when the user is the specific person, the controller selects both of the direct communication method and the indirect communication method.

This configuration allows a terminal device to transmit a message by using both the direct communication method and the indirect communication method when a user of the terminal device is a specific person, making is possible to ensure that the presence of such a specific person is quickly notified to nearby pedestrians and vehicles.

A fifteenth aspect of the present invention is the terminal device of the first aspect, wherein the controller is configured to determine whether or not a vehicle carrying the terminal device is a specific type vehicle based on the attribute information included in the device information, and wherein the controller is configured such that, when the vehicle carrying the terminal device is the specific type vehicle, the controller selects both of the direct communication method and the indirect communication method.

This configuration allows an in-vehicle terminal device to transmit a message by using both the direct communication method and the indirect communication method when a vehicle carrying the in-vehicle terminal device is a specific type vehicle, making it possible to ensure that the presence of such a specific type vehicle (in particular, an emergency vehicle) is quickly notified to nearby pedestrians and vehicles.

A sixteenth aspect of the present invention is the terminal device of the first aspect, wherein the controller is configured to determine whether or not a vehicle carrying the terminal device is a specific type vehicle and is in a state of high urgency based on the attribute information included in the device information, and wherein the controller is configured such that, when the vehicle is the specific type vehicle and is in the state of high urgency, the controller selects both of the direct communication method and the indirect communication method.

This configuration can further prevent congestion in pedestrian-to-vehicle communications by allowing the use of both the direct communication method and the indirect communication method only when a notification is of high emergency.

A seventeenth aspect of the present invention is the terminal device of the first aspect, wherein the controller is configured to determine whether or not a vehicle carrying the terminal device is a specific type vehicle and multiple pedestrians are present near the vehicle based on the attribute information included in the device information, and wherein the controller is configured such that, when the vehicle is the specific type vehicle and the multiple pedestrians are present near the vehicle, the controller selects both of the direct communication method and the indirect communication method.

This configuration can further prevent congestion in pedestrian-to-vehicle communications by allowing the use of both the direct communication method and the indirect communication method only when there are many nearby pedestrians.

An eighteenth aspect of the present invention is a roadside device disposed on or near a road for communicating with terminal devices, comprising: a communication device configured to relay a message transmitted between the terminal devices, wherein the message includes a terminal device's position information; and a controller configured to collect device information including state information indicating a state of the terminal device and/or attribute information indicating an attribute of the terminal device, to select either one or both of a direct communication method, in which direct communication is performed between the terminal devices, and an indirect communication method, in which indirect communication is performed between the terminal devices via the roadside device, based on the device information, and to transmit a message including information indicating either one or both of the direct communication and the indirect communication selected by the controller from the communication device to the terminal devices.

In this configuration, since a roadside device can select either one or both of the direct communication method and the indirect communication method based on device information in the same manner as the first aspect of the present invention, it is possible to ensure that the presence of a pedestrian and/or a vehicle is quickly notified to nearby pedestrians and vehicle drivers while preventing congestion in pedestrian-to-vehicle communications.

A nineteenth aspect of the present invention is a roadside device disposed on or near a road for communicating with terminal devices, comprising: a first communication device configured to relay a message transmitted between the terminal devices by using a first communication method, in which roadside-to-vehicle communication is performed, wherein the message includes a terminal device's position information; a second communication device configured to relay a message transmitted between the terminal devices by using a second communication method which is different from the first communication method, wherein the message includes a terminal device's position information; and a controller configured such that, when the roadside device receives a message transmitted from a terminal device, the message including the terminal device's position information, the controller selects either one of the first communication device and the second communication device based on a device type of the terminal device to be used to relay the message, and relay the message including the position information to a different terminal device.

In this configuration, since a roadside device can switch the direct communication method and the indirect communication method as appropriate based on whether a type of the terminal device is a pedestrian terminal or an in-vehicle terminal, it is possible to ensure that the roadside device can quickly notify nearby pedestrians and vehicle drivers by using multiple communication methods of the presence of such a pedestrian or a vehicle while preventing congestion in pedestrian-to-vehicle communications.

A twentieth aspect of the present invention is a communications system comprising: a terminal device configured to transmit a message including the terminal device's position information to a different terminal device through pedestrian-to-vehicle communication; and a roadside device disposed on or near a road and configured to communicate with terminal devices, wherein the terminal device comprises: a first communication device configured to communicate with the different terminal device by using a first communication method which is a direct communication method, in which direct communication is performed as the pedestrian-to-vehicle communication; a second communication device configured to communicate with the different terminal device by using a second communication method which is an indirect communication method, in which indirect communication is performed via the roadside device; and a controller configured to select either one or both of the direct communication and the indirect communication based on device information, the device information including state information indicating a state of the terminal device and/or attribute information indicating attribute of the terminal device, and to transmit the message to the different terminal device by using the selected one or both of the direct communication method and the indirect communication method.

In this configuration, since a communication system can select either one or both of the direct communication method and the indirect communication method based on device information in the same manner as the first aspect of the present invention, it is possible to ensure that the presence of a pedestrian and/or a vehicle is quickly notified to nearby pedestrians and vehicle drivers while preventing congestion in pedestrian-to-vehicle communications.

A twenty first aspect of the present invention is a communications method by which a terminal device transmits a message to a different terminal device through pedestrian-to-vehicle communication, the message including the terminal device's position information, the method comprising: selecting either one or both of a first communication method which is a direct communication method, in which direct communication is performed as the pedestrian-to-vehicle communication, and a second communication method which is an indirect communication method, in which indirect communication is performed via a roadside device disposed on or near a road; and transmitting the message to the different terminal device by using either one or both of the direct communication method and the indirect communication method selected in the previous step.

This configuration can select either one or both of the direct communication method and the indirect communication method based on device information in the same manner as the first aspect of the present invention, making it possible to ensure that the presence of a pedestrian and/or a vehicle is quickly notified to nearby pedestrians and vehicle drivers while preventing congestion in pedestrian-to-vehicle communications.

A twenty second aspect of the present invention is a communications method by which a roadside device disposed on or near a road communicates with terminal devices, the method comprising: relaying a message transmitted between the terminal devices, wherein the message includes a terminal device's position information; selecting either one or both of a direct communication method, in which direct communication is performed between the terminal devices, and an indirect communication method, in which indirect communication is performed between the terminal devices via the roadside device based on device information including state information indicating a state of the terminal device and/or attribute information indicating an attribute of the terminal device; and transmitting a message including information indicating either one or both of the direct communication and the indirect communication selected in the previous step.

This configuration can select either one or both of the direct communication method and the indirect communication method based on device information in the same manner as the first aspect of the present invention, making it possible to ensure that the presence of a pedestrian and/or a vehicle is quickly notified to nearby pedestrians and vehicle drivers while preventing congestion in pedestrian-to-vehicle communications.

A twenty third aspect of the present invention is a communications method by which a roadside device disposed on or near a road relays a message transmitted between terminal devices, wherein, when the roadside device receives a message transmitted from a terminal device, the message including the terminal device's position information, the roadside device selects either one of a first communication method, in which roadside-to-vehicle communication is performed, and a second communication method which is different from the first communication method, based on a device type of the terminal device, and relays the message including the position information to a different terminal device.

This configuration can select either one or both of the direct communication method and the indirect communication method based on device information in the same manner as the first aspect of the present invention, making it possible to ensure that the presence of a pedestrian and/or a vehicle is quickly notified to nearby pedestrians and vehicle drivers while preventing congestion in pedestrian-to-vehicle communications.

Embodiments of the present invention will be described below with reference to the drawings.

First Embodiment

Figure 1:
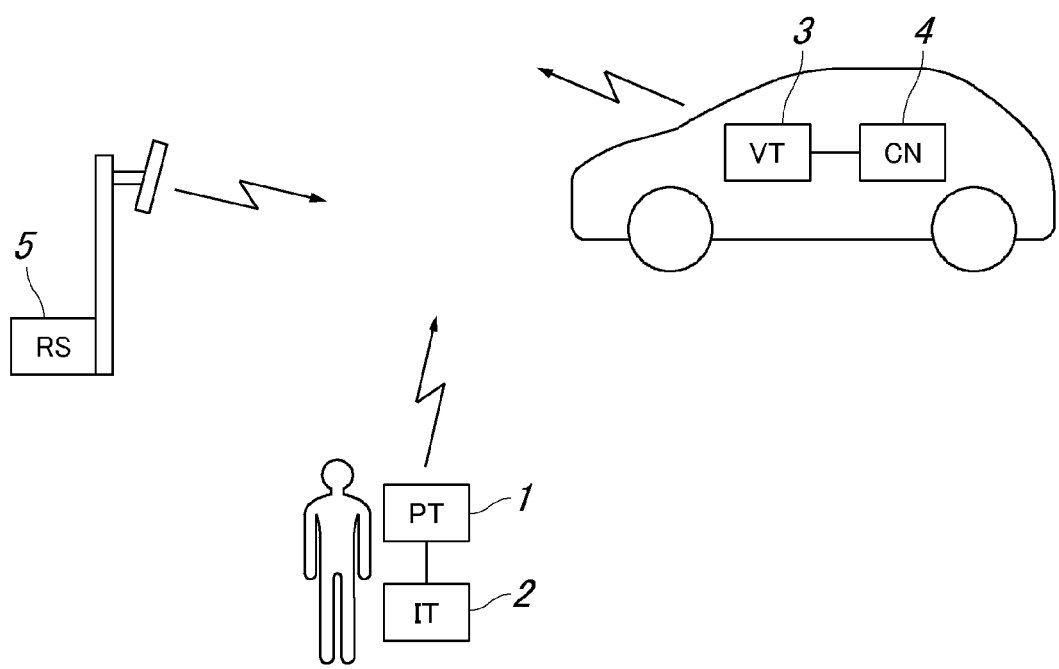
FIG. 1 is a diagram showing a general configuration of a communication system according to a first embodiment of the present invention.

FIG. 1 is a diagram showing a general configuration of a communication system according to a first embodiment of the present invention.

The communication system includes a pedestrian terminal 1 (terminal device) and a mobile information terminal 2 carried by a pedestrian, an in-vehicle terminal 3 (terminal device), a car navigation device 4, and a roadside device 5 (roadside device), where the in-vehicle terminal 3 and the car navigation device 4 are both mounted in a vehicle, a pedestrian-to-vehicle communication is performed between the pedestrian terminal 1 and the in-vehicle terminal 3, and wireless LAN communication such as WiFi (Registered Trademark) communication is performed between the pedestrian terminal 1 and the in-vehicle terminal 3 via the roadside device 5.

In pedestrian-to-vehicle communication, a message, which includes required information such as position information, is transmitted between the pedestrian terminal 1 and the in-vehicle terminal 3. Such messages are transmitted through pedestrian-to-vehicle communication using a frequency band adopted in safe driving assistance wireless systems utilizing an ITS (Intelligent Transport System), such as 700 MHz band or 5.8 GHz band.

In wireless LAN communication, the roadside device 5 serves as a base station device (access point), and the pedestrian terminal 1 and the in-vehicle terminal 3 serve as extension devices, and the roadside device 5 relays messages transmitted between the pedestrian terminal 1 and the in-vehicle terminal 3. The format and contents of a message are common to both pedestrian-to-vehicle communication and the wireless LAN communication.

The pedestrian terminal 1 is connected to the mobile information terminal 2. The mobile information terminal 2 may be a smartphone, a mobile phone, a tablet terminal, a wearable terminal, or other types of terminals. When the pedestrian terminal 1 determines that an alert needs to be provided to the in-vehicle terminal 3 by transmitting a message thereto, the pedestrian terminal 1 provides an alerting instruction to the mobile information terminal 2, which, upon receiving the alerting instruction from the pedestrian terminal 1, generates an alert output (e.g. voice output or vibration) to a user of the terminal.

The in-vehicle terminal 3 is connected to the car navigation device 4. The car navigation device 4 provides route guidance to the driver. When the in-vehicle terminal 3 determines that an alert needs to be provided by communicating a message with the pedestrian terminal 1, the in-vehicle terminal 3 provides an alerting instruction to the car navigation device 4, which, upon receiving the alerting instruction from the in-vehicle terminal 3, generates an alert output (e.g. voice output or vibration) to an occupant in the vehicle.

In some cases, the pedestrian terminal 1 may be built in the mobile information terminal 2, and the in-vehicle terminal 3 may be built in the car navigation device 4.

The pedestrian terminal 1 itself may generate an alert output. Similarly, the in-vehicle terminal 3 itself may generate an alert output. The in-vehicle terminal 3 may be configured to communicate with the mobile information terminal 2 carried by the driver, and cause the mobile information terminal 2 to generate an alert output to the driver.

The roadside device 5 is disposed at a place where a lot of pedestrians and/or vehicles are present (such as an area near a traffic light at an intersection) and thus congestion is likely to occur in pedestrian-to-vehicle communication between pedestrian terminals 1 and in-vehicle terminals 3.

Figure 2:
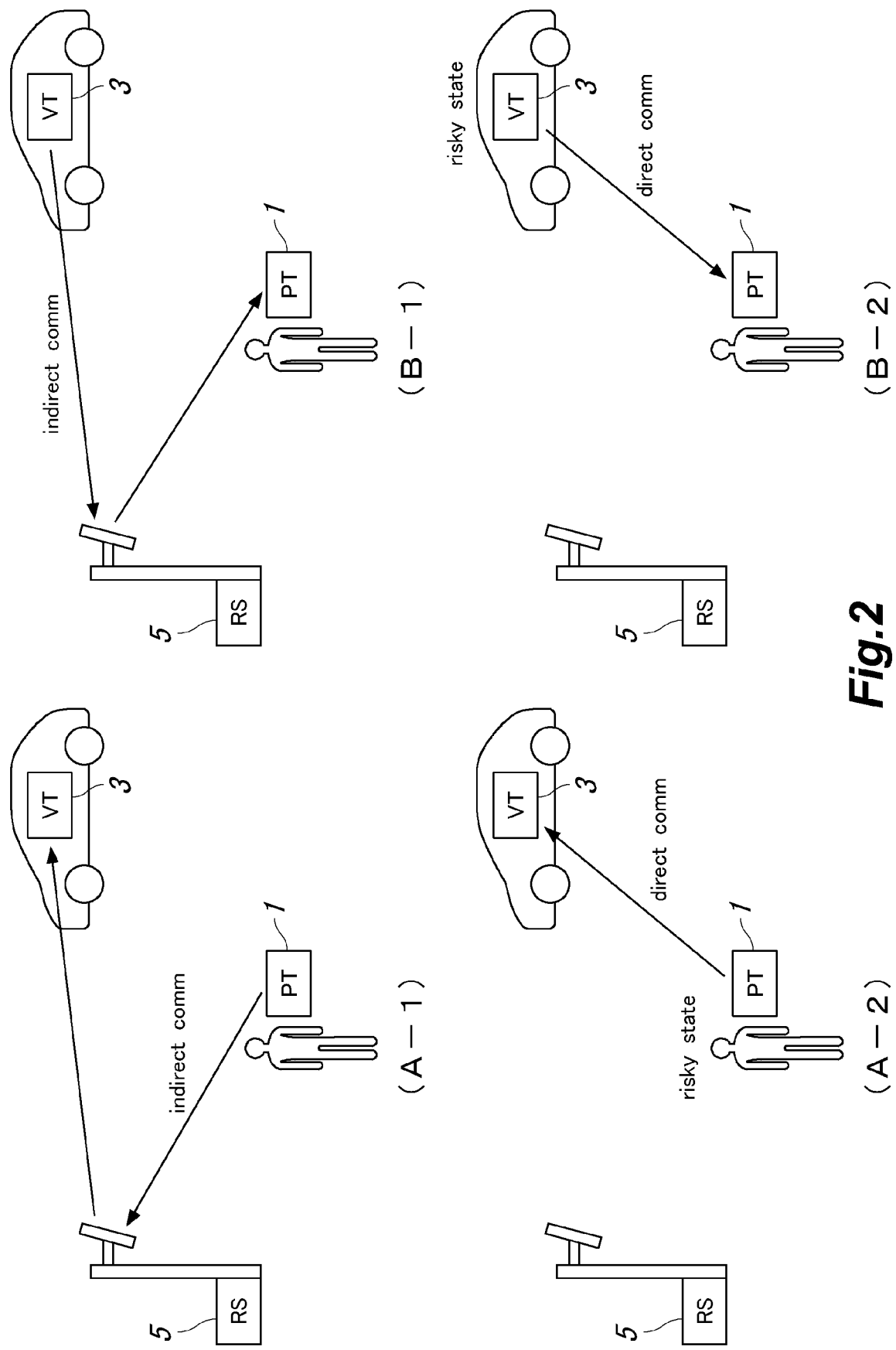
FIG. 2 is an explanatory view showing situations where messages are transmitted between a pedestrian terminal 1 and an in-vehicle terminal 3 according to the first embodiment of the present invention.

Next, situations where messages are transmitted between a pedestrian terminal 1 and an in-vehicle terminal 3 according to the first embodiment of the present invention will be described. FIG. 2 is an explanatory view showing situations where messages are transmitted between a pedestrian terminal 1 and an in-vehicle terminal 3.

In the present embodiment, the pedestrian terminal 1 and the in-vehicle terminal 3 can select either of a direct communication method and an indirect communication method as a communication method used for transmitting a message. In the direct communication method, messages are directly transmitted between the pedestrian terminal 1 and the in-vehicle terminal 3 through pedestrian-to-vehicle communication. In the indirect communication method, messages are transmitted between the pedestrian terminal 1 and the in-vehicle terminal 3 via the roadside device 5 by using wireless LAN communication In ITSs, messages are transmitted periodically at predetermined intervals (for example, 100 ms), and the timing of message transmission is common to both the direct communication method and the indirect communication method.

When the pedestrian terminal 1 or the in-vehicle terminal 3 is located outside a communication coverage area of the roadside device 5, the direct communication method is selected as a communication method used for communication because indirect communication via the roadside device 5 is not possible. When the pedestrian terminal 1 or the in-vehicle terminal 3 re-enters the communication coverage area of the roadside device 5 and the indirect communication becomes possible, the communication method used for communication is switched from the direct communication method to the indirect communication method.

In the present embodiment, the pedestrian terminal 1 selects a communication method used for communication (the direct communication method or the indirect communication method) based on device information regarding a state of the pedestrian. In this particular embodiment, the pedestrian terminal 1 determines whether or not the pedestrian is in a risky state, and selects a communication method used for communication based on a result of the determination.

Specifically, as shown FIG. 2A-1, when the pedestrian is not in a risky state, the pedestrian terminal 1 selects the indirect communication method, and a message is transmitted from the pedestrian terminal 1 to the in-vehicle terminal 3 via the roadside device 5 by using wireless LAN communication. Meanwhile, as shown in FIG. 2A-2, when the pedestrian is in a risky state, the pedestrian terminal 1 switches the communication method from the indirect communication method to the direct communication method, and a message is transmitted from the pedestrian terminal 1 directly to the in-vehicle terminal 3 through pedestrian-to-vehicle communication.

In the present embodiment, the pedestrian terminal 1 determines that the pedestrian is in a risky state when detecting a risky action taken by the pedestrian, such as the pedestrian's running into or falling down in a road.

In the present embodiment, when the pedestrian enters a risky area, the pedestrian terminal 1 determines that the pedestrian is in a risky state. The risky area is any area which is likely to involve a high risk, is preset in map information. Examples of risky areas include an area in a sidewalk where there is no protective structure separating the sidewalk from a road, and an area near a dangerous intersection where accidents frequently occur.

In the present embodiment, the pedestrian terminal 1 determines that the pedestrians is in a risky state when the pedestrian who carries the pedestrian terminal 1 moves at a speed equal to or higher than a predetermined speed value (the upper limit of the speed considered as normal walking speed), such as when the pedestrian carrying the pedestrian terminal 1 rides on a bicycle or a motorcycle.

In the present embodiment, the pedestrian terminal 1 determines that the pedestrians is in a risky state when the pedestrian is a person who is likely to take a risky action, such as a child, an aged person, or a dementia patient.

Also, in the present embodiment, the in-vehicle terminal 3 selects a communication method used for communication (the direct communication method or the indirect communication method) based on a state of the vehicle. In this particular embodiment, the in-vehicle terminal 3 determines whether or not the vehicle is in a risky state, and selects a communication method used for communication based on a result of the determination.

Specifically, as shown FIG. 2B-1, when the vehicle is not in a risky state, the in-vehicle terminal 3 selects the indirect communication method, and a message is transmitted from the in-vehicle terminal 3 to the pedestrian terminal 1 via the roadside device 5 by using wireless LAN communication. Meanwhile, as shown in FIG. 2B-2, when the vehicle is in a risky state, the in-vehicle terminal 3 switches the communication method from the indirect communication method to the direct communication method, and a message is transmitted from the in-vehicle terminal 3 directly to the pedestrian terminal 1 through pedestrian-to-vehicle communication.

In the present embodiment, the in-vehicle terminal 3 determines that the vehicle is in a risky state when the vehicle moves at a speed equal to or higher than a predetermined speed value (the upper limit of the speed considered as vehicle's normal traveling speed).

In the present embodiment, the in-vehicle terminal 3 determines that the vehicle is in a risky state when the vehicle exhibits a risky driving behavior such as sudden acceleration, sudden turning, or meandering.

Figure 3:
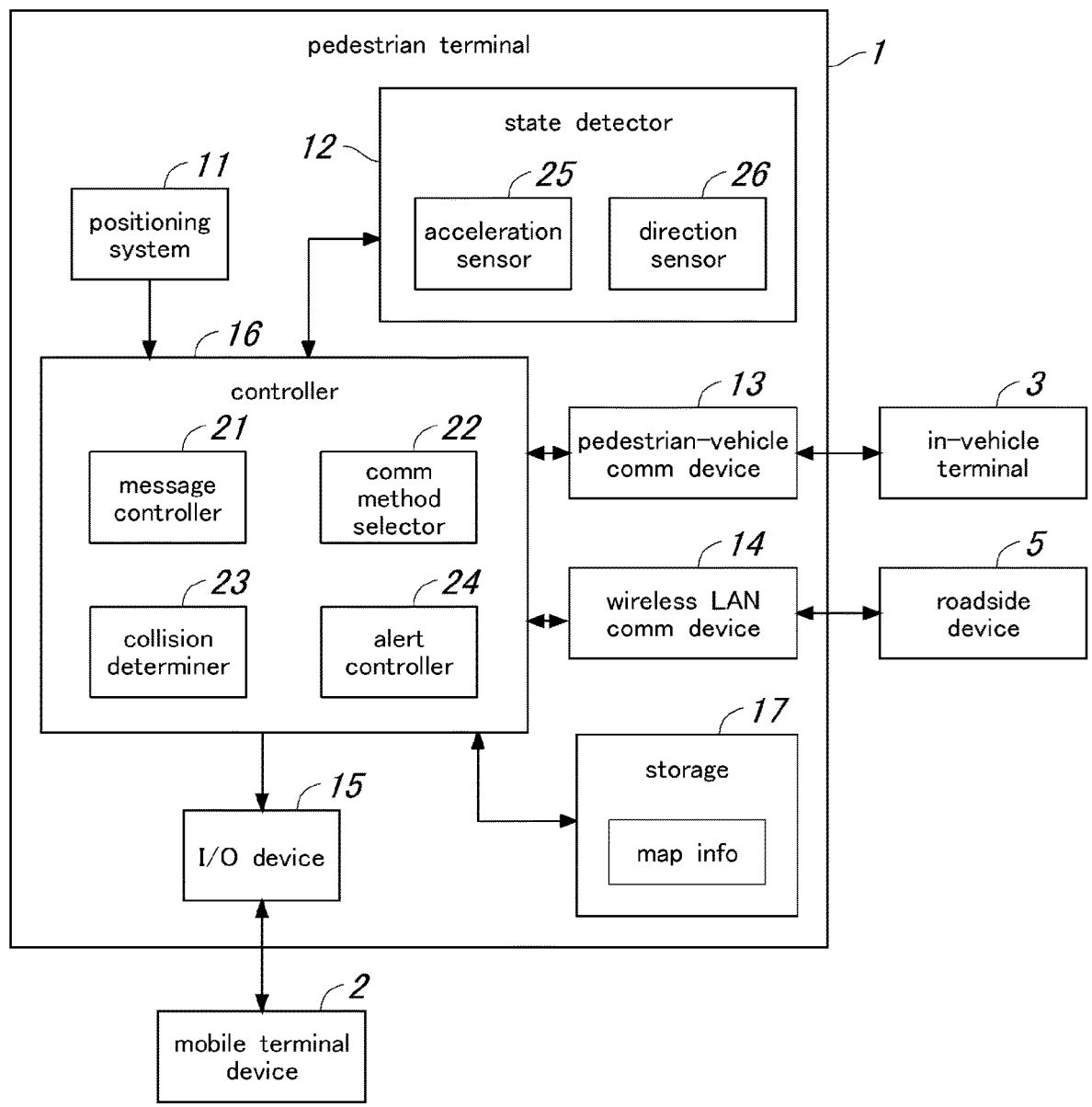
FIG. 3 is a block diagram showing a schematic configuration of a pedestrian terminal 1 according to the first embodiment of the present invention.

Next, a pedestrian terminal 1 according to the first embodiment of the present invention will be described. FIG. 3 is a block diagram showing a schematic configuration of the pedestrian terminal 1.

The pedestrian terminal 1 includes a positioning system 11 (position information acquirer), a state detector 12, a pedestrian-to-vehicle communication device 13 (first communication device), a wireless LAN communication device 14 (second communication device), an I/O device 15, a controller 16, and a storage 17.

The positioning system 11 measures the position of the pedestrian terminal itself by using a satellite positioning system such as GPS (Global Positioning System), QZSS (Quasi-Zenith Satellite System), or GLONASS (Global Navigation Satellite System) to acquire the pedestrian terminal device's position information. The position information or information on the position of the pedestrian terminal may be acquired using the positioning function of the mobile information terminal 2.

The state detector 12 detects a state of the pedestrian terminal (or pedestrian who carries the pedestrian terminal), and includes an acceleration sensor 25 and a direction sensor 26.

The pedestrian-to-vehicle communication device 13 transmits and receives messages to/from the in-vehicle terminal 3 through pedestrian-to-vehicle communication. In this case, pedestrian-to-vehicle communication is performed as wireless communication using a frequency band adopted in a safe driving assistance wireless system utilizing an ITS.

The wireless LAN communication device 14 transmits and receives messages to/from in-vehicle terminals 3 via a roadside device 5 by using wireless LAN communication such as WiFi (Registered Trademark) communication.

The I/O device 15 exchanges information with the mobile information terminal 2. The mobile information terminal 2 provides an alert to the pedestrian based on the information provided from the I/O device 15.

The storage 17 stores map information, programs executed by the controller 16, and other information. In some cases, the pedestrian terminal may be configured to acquire the map information from the mobile information terminal 2.

The controller 16 includes a message controller 21, a communication method selector 22, a collision determiner 23, and an alert controller 24. The controller 16 is comprised primarily of a processor, and each functional unit of the controller 16 is implemented by causing the processor to execute a program stored in the storage 17.

The message controller 21 controls transmission of messages including pedestrian information (terminal ID and position information, and/or other information). The message controller 21 transmits a message from the pedestrian-to-vehicle communication device 13 or the wireless LAN communication device 14 according to a result of the communication method selection performed by the communication method selector 22.

The communication method selector 22 selects a communication method (the direct communication method or the indirect communication method) used for transmitting a message to an in-vehicle terminal 3.

The communication method selector 22 first determines, based on a beacon signal broadcasted by the roadside device 5, whether or not the pedestrian terminal is located within the communication coverage area of the roadside device 5; that is, whether or not indirect communication is possible. When the pedestrian terminal is not located within the communication coverage area of the roadside device 5, the communication method selector 22 selects the direct communication method.

When the pedestrian terminal is located within the communication coverage area of the roadside device 5, the communication method selector 22 acquires state information such as a result of detection from the state detector 12 where the state information indicates whether or not the pedestrian terminal (or pedestrian) is in a risky state, determines whether or not the pedestrian terminal (or pedestrian) is in a risky state based on the state information, and selects a communication method based on a result of the determination. Specifically, when the pedestrian terminal is in a risky state, the communication method selector 22 selects the direct communication method, and, when the pedestrian terminal is not in a risky state, the communication method selector 22 selects the indirect communication method.

In the present embodiment, the pedestrian terminal 1 determines, based on a result of detection provided by the state detector 12, that the pedestrian is in a risky state when detecting a risky action taken by the pedestrian such as the pedestrian's running into or falling down in a road. More specifically, when a detection result of the acceleration sensor 25 indicates that the pedestrian has suddenly started running (sudden acceleration) or a detection result of the direction sensor 26 indicates that the pedestrian has suddenly changed direction (sudden turning), the communication method selector 22 determines that the pedestrian is running into a road. When a detection result of the acceleration sensor 25 indicates a sudden downward movement, the communication method selector 22 determines that the pedestrian is falling down.

In the present embodiment, the communication method selector 22 determines that the pedestrian is in a risky state when the pedestrian is located within a predetermined risky area based on position information and map information, where the position information indicates the current position of the pedestrian acquired by the positioning system 11 and the map information is stored in the storage 17.

In the present embodiment, the communication method selector 22 determines that the pedestrian is in a risky state when the pedestrian moves at a speed equal to or higher than a predetermined speed value (the upper limit of the speed considered as normal walking speed), where the moving speed is determined based on the change in the position obtained from the position information acquired by the positioning system 11.

In the present embodiment, the communication method selector 22 determines that the pedestrians is in a risky state when the pedestrian is a person who is likely to take a risky action (e.g. a child, an aged person, or a dementia patient) based on attribute information indicating an attribute of the pedestrian. Information indicating whether or not a pedestrian is likely to take a risky action may be preset as the pedestrian's attribute information and stored in the storage 17.

Moreover, the collision determiner 23 determines whether or not the pedestrian has a collision risk that a vehicle will collide with the pedestrian based on the pedestrian's position information indicating the position of the pedestrian acquired by the positioning system 11 and the vehicle's position information indicating the position of the vehicle included in a message received from the in-vehicle terminal 3.

The alert controller 24 provides an alert to the pedestrian based on a result of determination by the collision determiner 23. In the present embodiment, the alert controller 24 provides an alerting instruction to the mobile information terminal 2 via the I/O device 15, and upon receiving the alerting instruction, the mobile information terminal 2 generates an alert output (e.g. voice output or vibration) to the pedestrian.

Figure 4:
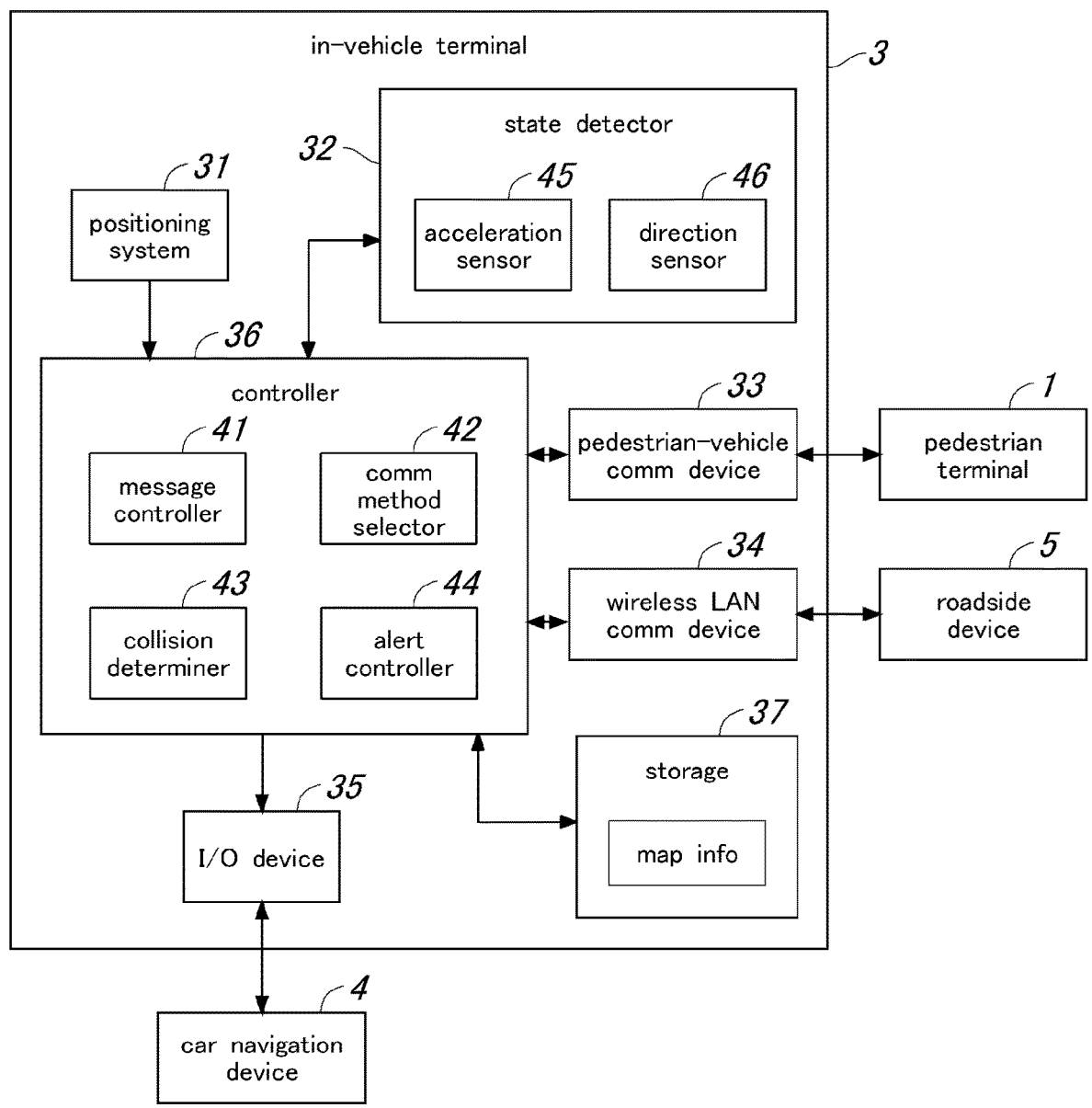
FIG. 4 is a block diagram showing a schematic configuration of an in-vehicle terminal 3 according to the first embodiment of the present invention.

Next, a schematic configuration of an in-vehicle terminal 3 according to the first embodiment of the present invention will be described. FIG. 4 is a block diagram showing a schematic configuration of the in-vehicle terminal 3.

The in-vehicle terminal 3 includes a positioning system 31 (position information acquirer), a pedestrian-to-vehicle communication device 33 (first communication device), a wireless LAN communication device 34 (second communication device), an I/O device 35, a controller 36, and a storage 37.

The positioning system 31 measures the current position of the pedestrian terminal itself by using a satellite positioning system such as GPS (Global Positioning System), QZSS (Quasi-Zenith Satellite System), or GLONASS (Global Navigation Satellite System) to acquire the in-vehicle terminal's position information. The position information or information on the position of the in-vehicle terminal may be acquired using the positioning function of the car navigation device 4.

The state detector 32 detects a state of the in-vehicle terminal (or vehicle carrying the in-vehicle terminal), and includes an acceleration sensor 45 and a direction sensor 46.

The pedestrian-to-vehicle communication device 33 transmits and receives messages to/from the pedestrian terminal 1 through pedestrian-to-vehicle communication. In this case, pedestrian-to-vehicle communication is performed as wireless communication using a frequency band adopted in a safe driving assistance wireless system utilizing an ITS.

The wireless LAN communication device 34 transmits and receives messages to/from pedestrian terminals 1 via a roadside device 5 by wireless LAN communication such as WiFi (Registered Trademark) communication.

The I/O device 35 exchanges information with the car navigation device 4. The car navigation device 4 provides an alert to the driver based on the information provided from the I/O device 35.

The storage 37 stores map information, programs executed by the controller 36, and other information. In some cases, the in-vehicle terminal may be configured to acquire the map information from the car navigation device 4.

The controller 36 includes a message controller 41, a communication method selector 42, a collision determiner 43, and an alert controller 44. The controller 36 is comprised primarily of a processor, and each functional unit of the controller 36 is implemented by causing the processor to execute a program stored in the storage 37.

The message controller 41 controls transmission of messages including vehicle information (terminal ID and position information, and/or other information). The message controller 41 transmits a message from the pedestrian-to-vehicle communication device 33 or the wireless LAN communication device 34 according to a result of the communication method selection performed by the communication method selector 42.

The communication method selector 42 selects a communication method (the direct communication method or the indirect communication method) used for transmitting a message to a pedestrian terminal 1.

The communication method selector 42 first determines, based on a beacon signal broadcasted by the roadside device 5, whether or not the in-vehicle terminal is located within the communication coverage area of the roadside device 5; that is, whether or not indirect communication is possible. When the in-vehicle terminal is not located within the communication coverage area of the roadside device 5, the communication method selector 42 selects the direct communication method.

When the in-vehicle terminal is located within the communication coverage area of the roadside device 5, the communication method selector 42 acquires state information such as a result of detection from the state detector 32 where the state information indicates whether or not the in-vehicle terminal (or vehicle) is in a risky state, determines whether or not the in-vehicle terminal (or vehicle) is in a risky state based on the state information, and selects a communication method based on a result of the determination. Specifically, when the in-vehicle terminal is in a risky state, the communication method selector 42 selects the direct communication method, and, when the pedestrian terminal is not in a risky state, the communication method selector 42 selects the indirect communication method.

In the present embodiment, the communication method selector 42 determines that the vehicle is in a risky state when the vehicle moves at a speed equal to or higher than a predetermined speed value (the upper limit of the speed considered as normal traveling speed), where the moving speed is determined based on the change in the position obtained from the position information acquired by the positioning system 31.

In the present embodiment, the in-vehicle terminal 3 determines, based on a result of detection provided by the state detector 32, that the vehicle is in a risky state when detecting a risky driving behavior such as the vehicle's sudden acceleration, sudden turning (sudden change in the direction), or meandering. More specifically, the state detector 32 detects a risky driving behavior of the vehicle when a detection result of the acceleration sensor 45 indicates that the vehicle has made acceleration or a detection result of the direction sensor 46 indicates that the vehicle has made a sudden turning or meandering.

The collision determiner 43 determines whether or not the vehicle has a collision risk that the vehicle will collide with a pedestrian based on the vehicle's position information indicating the position of the vehicle acquired by the positioning system 31 and the pedestrian's position information indicating the position of the pedestrian included in a message received from the pedestrian terminal 1.

The alert controller 44 provides an alert to the driver of the vehicle based on a result of determination by the collision determiner 43. In the present embodiment, the alert controller 44 provides an alerting instruction to the car navigation device 4 via the I/O device 35, and upon receiving the alerting instruction, the car navigation device 4 generates an alert output (e.g. voice output or vibration) to the driver.

Figure 5:
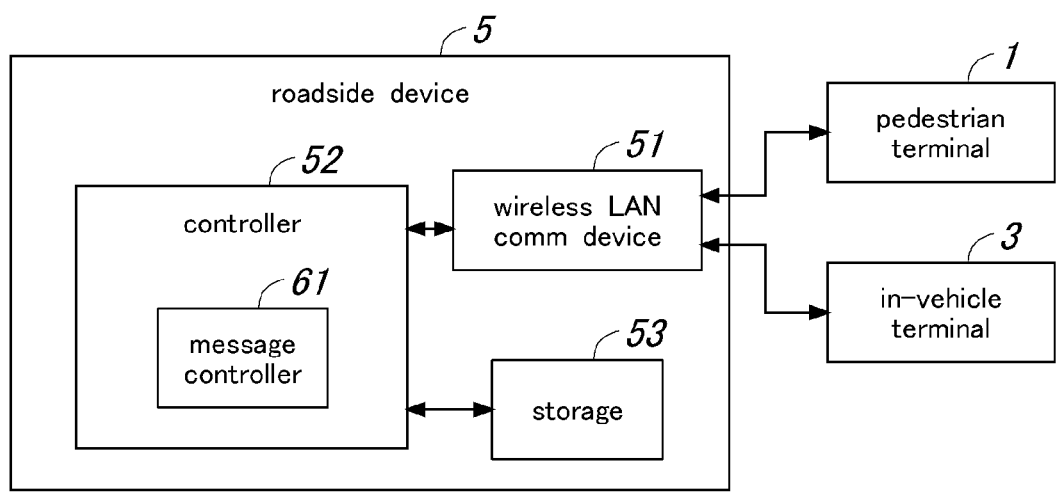
FIG. 5 is a block diagram showing a schematic configuration of a roadside device 5 according to the first embodiment of the present invention.

Next, a schematic configuration of a roadside device 5 according to the first embodiment of the present invention will be described. FIG. 5 is a block diagram showing a schematic configuration of the roadside device 5.

The roadside device 5 includes a wireless LAN communication device 51, a controller 52, and a storage 53.

The wireless LAN communication device 51 transmits and receives messages to/from pedestrian terminals 1 and/or in-vehicle terminals 3 by wireless LAN communication such as WiFi (Registered Trademark) communication, and broadcasts received messages to pedestrian terminals 1 and/or in-vehicle terminals 3.

The storage 53 stores programs executed by the controller 52, and other information.

The controller 52 includes a message controller 61. The controller 52 is comprised primarily of a processor, and the message controller 61 is implemented by causing the processor to execute a program stored in the storage 53.

When the wireless LAN communication device 51 receives messages from pedestrian terminals 1 and/or in-vehicle terminals 3, the message controller 61 transmits the received messages to the pedestrian terminals 1 and/or the in-vehicle terminals 3 from the wireless LAN communication device 51.

The roadside device 5 may be configured to transmit a message each time the roadside device 5 receives a message from the pedestrian terminal 1 or the in-vehicle terminal 3. However, the roadside device 5 may be configured to receive multiple messages and then transmit the multiple received messages at one time. Specifically, the roadside device 5 may package pedestrian information and the vehicle information included in each of the received multiple messages into a single message and transmits the single message.

In other cases, the roadside device 5 may be configured to transmit multiple messages in a different order from the order of the reception of the messages. For example, the roadside device 5 may be configured to, each time receiving a message, calculate the distance from its transmission source (pedestrian terminal 1 or in-vehicle terminal 3) to the roadside device 5, and then transmits messages in order of distance from the shortest to the longest. In other embodiments, the roadside device 5 may be configured such that priorities are preset to different types of terminals (pedestrian terminal 1 and in-vehicle terminal 3), and the roadside device 5 transmits received messages in order of priority. In some embodiments, the roadside device 5 may be configured to, upon receiving a message, determine whether or not the position of its transmission source has changed based on the position information included in the message, and not to transmit a message if the position of its transmission source has not changed.

Next, operation procedures of operations performed when the pedestrian terminal 1 transmits a message according to the first embodiment of the present invention will be described. FIG. 6 is a flowchart showing operation procedures of operations performed by a pedestrian terminal 1 (PD terminal 1), an in-vehicle terminal 3 (IV terminal), and a roadside device 5.

In the pedestrian terminal 1, first, the positioning system 11 acquires position information indicating the pedestrian terminal itself (pedestrian) (ST101). Then, the message controller 21 determines whether or not the pedestrian terminal is in a state in which the pedestrian terminal is to transmit pedestrian information; specifically, whether or not the pedestrian is in a safe zone such as indoor location based on the pedestrian's position information (ST102).

If the pedestrian terminal is in a state in which the pedestrian terminal is to transmit pedestrian information (Yes in ST102), then the communication method selector 22 selects a communication method (the direct communication method or the indirect communication method) used for transmitting a message (ST103).

When the communication method selector 22 selects the direct communication method as a communication method used for communication (Yes in ST104), the message controller 21 transmits a message including pedestrian information from the pedestrian-to-vehicle communication device 13 to the in-vehicle terminal 3 (IV terminal). (ST105). If the communication method selector 22 selects the indirect communication method as a communication method used for communication (No in ST104), the message controller 21 transmits a message including pedestrian information from the wireless LAN communication device 14 to the roadside device 5 (ST106).

In the roadside device 5, when the message controller 61 receives a message transmitted from the pedestrian terminal 1 at the wireless LAN communication device 51 (ST201), the message controller 61 transmit the message from the wireless LAN communication device 51 to the in-vehicle terminal 3 (ST202).

In the in-vehicle terminal 3, when the pedestrian-to-vehicle communication device 33 receives a message transmitted from the pedestrian terminal 1 or when the wireless LAN communication device 34 receives a message transmitted by the roadside device 5 (ST301), the collision determiner 43 performs collision determination; that is, determines whether or not the vehicle has a collision risk that the vehicle will collide with a pedestrian based on the pedestrian's position information and other information included in the message (ST302).

Then, the alert controller 44 determines whether or not providing an alert to the driver is necessary based on a result of the determination by the collision determiner 43 (ST303). If providing an alert to the driver is necessary (Yes in ST303), the alert controller 44 provides an alert to the driver (ST304).

Figure 7:
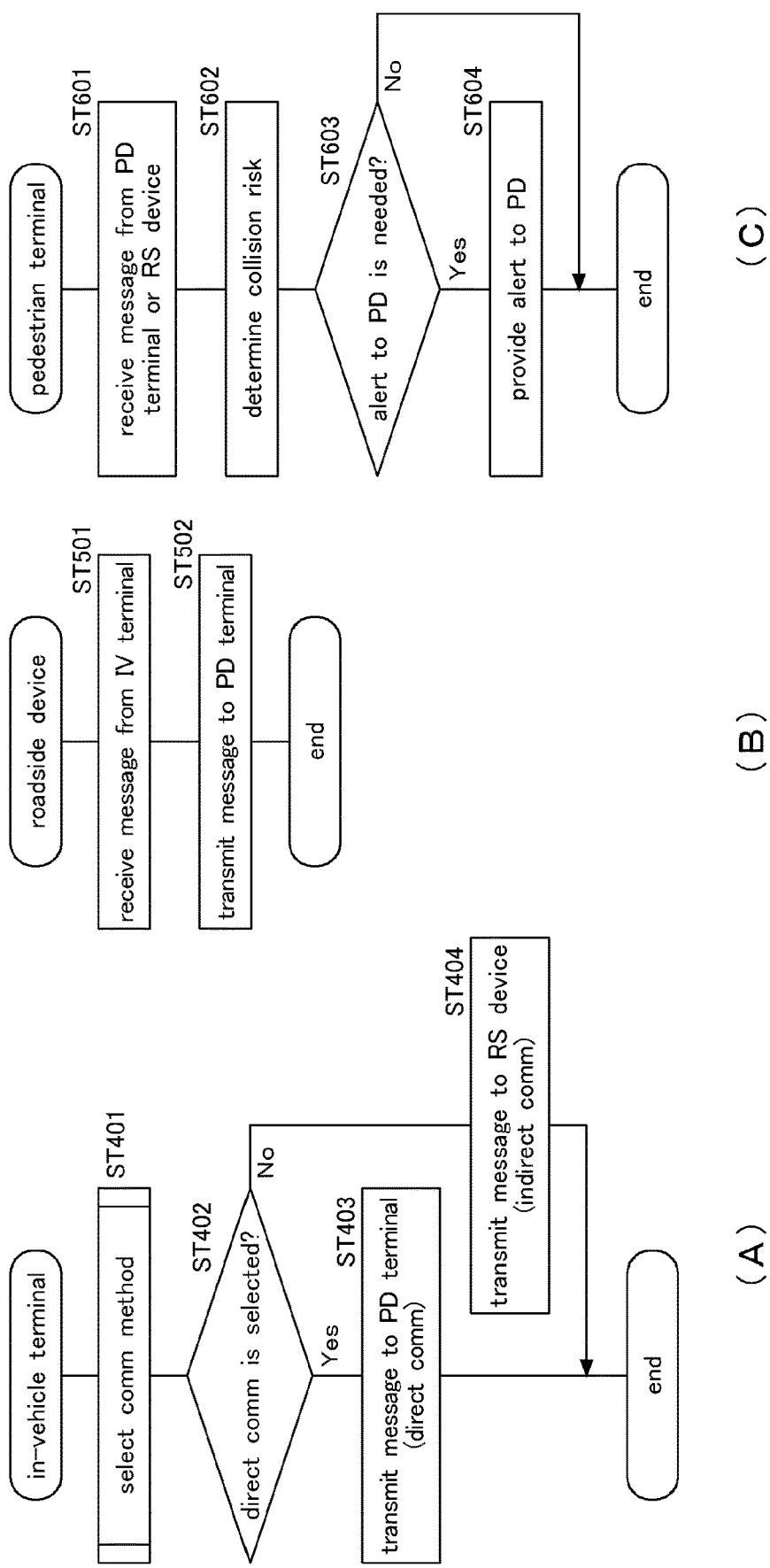
FIG. 7 is a flowchart showing operation procedures of operations performed by a pedestrian terminal 1, an in-vehicle terminal 3, and a roadside device 5 when the in-vehicle terminal 3 transmits a message according to the first embodiment of the present invention.

Next, operation procedures of operations performed when the in-vehicle terminal 3 transmits a message according to the first embodiment of the present invention will be described. FIG. 7 is a flowchart showing operation procedures of operations performed by a pedestrian terminal 1, an in-vehicle terminal 3, and a roadside device 5.

In the in-vehicle terminal 3, when the engine of a vehicle is started, the communication method selector 42 selects a communication method (the direct communication method or the indirect communication method) used for transmitting a message (ST401).

If the communication method selector 42 selects the direct communication method as a communication method used for communication (Yes in ST402), the message controller 41 transmits a message including vehicle information from the pedestrian-to-vehicle communication device 33 to a pedestrian terminal 1 (ST403). If the communication method selector 42 selects the indirect communication method as a communication method used for communication (No in ST402), the message controller 41 transmits a message including vehicle information from the wireless LAN communication device 34 to a roadside device 5 (ST404).

In the roadside device 5, when the message controller 61 receives a message transmitted from an in-vehicle terminal 3 at the wireless LAN communication device 51 (ST501), the message controller 61 transmit the message from the wireless LAN communication device 51 to a pedestrian terminal 1 (ST502).

In the pedestrian terminal 1, when the pedestrian-to-vehicle communication device 13 receives a message transmitted from an in-vehicle terminal 3 or when the wireless LAN communication device 14 receives a message transmitted by a roadside device 5 (ST601), the collision determiner 23 performs collision determination; that is, determines whether or not the pedestrian has a collision risk that a vehicle will collide with the pedestrian based on the vehicle's position information and other information included in the message (ST602).

Then, the alert controller 44 determines whether or not providing an alert to the pedestrian is necessary based on a result of the determination by the collision determiner 23 (ST603). If providing an alert to the pedestrian is necessary (Yes in ST603), the alert controller 44 provides an alert to the pedestrian (ST604).

Figure 8:
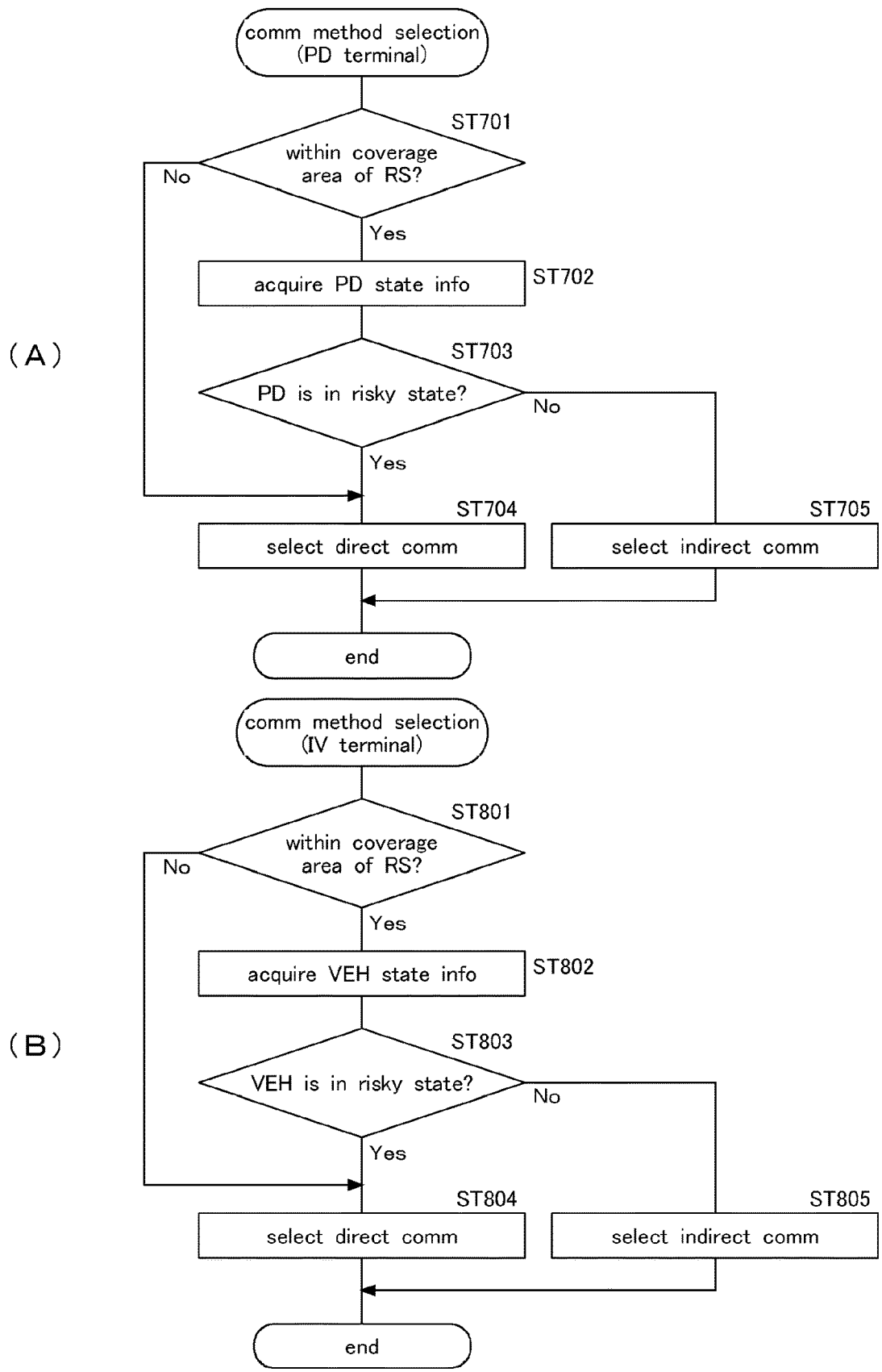
FIG. 8 is a flowchart showing operation procedures of communication method selection operations performed by a pedestrian terminal 1 and an in-vehicle terminal 3 according to the first embodiment of the present invention.

Next, communication method selection operations performed by a pedestrian terminal 1 and an in-vehicle terminal 3 according to the first embodiment of the present invention will be described. FIG. 8 is a flowchart showing operation procedures of the communication method selection operations performed by the pedestrian terminal 1 (ST103 in FIG. 6) and those performed by the in-vehicle terminal 3 (ST403 in FIG. 7).

As shown in FIG. 8A, the communication method selector 22 of the pedestrian terminal 1, first, determines whether or not the pedestrian terminal 1 is located within a communication coverage area of a roadside device 5 based on whether or not the wireless LAN communication device 14 has received a beacon signal transmitted by the roadside device 5 (ST701). If the pedestrian terminal 1 is not located within the communication coverage area of the roadside device 5 (No in ST701), the communication method selector 22 selects the direct communication method (ST704).

If the pedestrian terminal 1 is located within the communication coverage area of the roadside device 5 (Yes in ST701), the communication method selector 22 then acquires state information indicating a state of the pedestrian terminal 1 (pedestrian) from the state detector 12 or other sources (ST702). Then, the communication method selector 22 determines whether or not the pedestrian is in a risky state based on the pedestrian's state information (ST703).

When a detection result of the acceleration sensor 25 of the pedestrian terminal 1 indicates that the pedestrian has suddenly started running (sudden acceleration) or a detection result of the direction sensor 26 indicates that the pedestrian has suddenly changed direction (sudden turning), the communication method selector 22 determines that the pedestrian is in a risky state. When a detection result of the acceleration sensor 25 indicates a sudden downward movement, the communication method selector 22 determines that the pedestrian is in a risky state. If the pedestrian is in a risky state (Yes in ST703), the communication method selector 22 selects the direct communication method (ST704). If the pedestrian terminal is not in a risky state (No in ST703), the communication method selector 22 selects the indirect communication method (ST705).

As shown in FIG. 8B, the communication method selector 42 of the in-vehicle terminal 3, first, determines whether or not the in-vehicle terminal 3 is located within a communication coverage area of a roadside device 5 based on whether or not the wireless LAN communication device 34 receives a beacon signal transmitted by the roadside device 5 (ST801). If the in-vehicle terminal 3 is not located within the communication coverage area of the roadside device 5 (No in ST801), the communication method selector 42 selects the direct communication method (ST804).

If the in-vehicle terminal 3 is located within the communication coverage area of the roadside device 5 (Yes in ST801), the communication method selector 42 then acquires state information indicating a state of the in-vehicle terminal 3 (vehicle) from the state detector 32 or other sources (ST802). Then, the communication method selector 42 determines whether or not the vehicle is in a risky state based on the vehicles state information (ST803).

When a detection result of the acceleration sensor 45 of the in-vehicle terminal 3 indicates that the vehicle has made acceleration or a detection result of the direction sensor 46 indicates that the vehicle has made a sudden turning or meandering, the communication method selector 42 determines that the vehicle is in a risky state. If the vehicle is in a risky state (Yes in ST803), the communication method selector 42 selects the direct communication method (ST804). If the vehicle is not in a risky state (No in ST803), the communication method selector 22 selects the indirect communication method (ST805).

Second Embodiment

Figure 10:
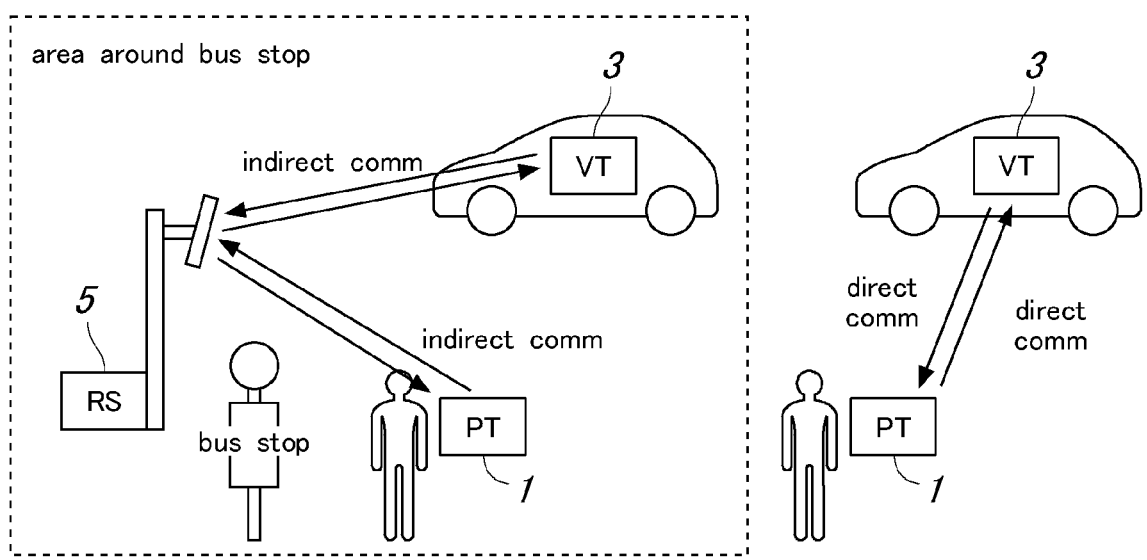
FIG. 10 is an explanatory view showing situations where messages are transmitted between a pedestrian terminal 1 and an in-vehicle terminal 3 according to the second embodiment of the present invention.

Next, a second embodiment of the present invention will be described. Except for what will be discussed here, this embodiment is the same as the above-described embodiment. FIGS. 9 and 10 are explanatory views showing situations where a message is transmitted between a pedestrian terminal 1 and an in-vehicle terminal 3 according to the second embodiment of the present invention.

In the first embodiment of the present invention, the pedestrian or in-vehicle terminal determines whether or not the pedestrian or vehicle is in a risky state, and selects a communication method used for communication (the direct communication method or the indirect communication method) based on a result of the determination. However, in the present embodiment, the pedestrian or in-vehicle terminal not only determines whether or not the pedestrian or vehicle is in a risky state, but also determines whether or not the pedestrian or vehicle is located within a specific area, and selects a communication method used for communication (the direct communication method or the indirect communication method) based on results of the determinations. Specifically, when the pedestrian or vehicle is not located within a specific area where a degree of risk is low, the pedestrian or in-vehicle terminal selects the direct communication method, and when the pedestrian or vehicle enters the specific area, the pedestrian or in-vehicle terminal changes the communication method used for communication from the direct communication method to the indirect communication method.

This configuration can prevent congestion in pedestrian-to-vehicle communications (direct communications) even when a number of pedestrian terminals 1 and/or in-vehicle terminals 3 are located within a specific area.

In the present embodiment, a specific area is defined as an area where a degree of risk is relatively low. For example, as shown in FIG. 9A, in a road where a sidewalk and a roadway are separated by a protective structure such as a guardrail or a tree planting zone, a degree of risk is low even located at an intersection. Thus, in the present embodiment, a specific area is defined as an area around an intersection which meets a predetermined condition and thus in which a degree of risk is low, and when a pedestrian or vehicle enters such an area around an intersection, the pedestrian or in-vehicle terminal changes the communication method used for communication from the direct communication method to the indirect communication method.

Also, in an area around a railroad crossing, vehicles travel slowly as they temporarily stop at the railroad crossing. Thus, a degree of risk is low in such an area. In this view, in the present invention, as shown in FIG. 9B, a specific area is defined as an area around a railroad crossing, and when a pedestrian or vehicle enters such an area around a railroad crossing, the pedestrian or in-vehicle terminal changes the communication method used for communication from the direct communication method to the indirect communication method.

In other cases, in an area around a bus stop, there is concern that a person who is getting on a bus is misrecognized as a risky person who is running into or crossing a road. In this view, in the present embodiment, a person who is getting on a bus transmits information indicating that situation to a roadside device 5 disposed near a bus stop, and the roadside device 5 disposed near the bus stop recognizes who are getting on a bus, and transmits pedestrian information indicating only persons who are likely to running into or crossing a road to nearby pedestrian, eliminating information on persons who are getting on a bus from the pedestrian information. Accordingly, since the pedestrian or in-vehicle terminal is configured to select the indirect transmission method via the roadside device 5 in an area near a bus stop, it is possible to avoid misrecognizing a person who is getting on a bus as a risky person who is running into or crossing a road. In this view, in the present embodiment, as shown in FIG. 10, a specific area is defined as an area around a bus stop, and when a pedestrian or vehicle enters such an area around a bus stop, the pedestrian or in-vehicle terminal changes the communication method used for communication from the direct communication method to the indirect communication method. In some cases, the roadside device 5 may be configured to provide an alert to a car parked near a bus stop. In this configuration, it is possible to avoid a problem that a bus coming to the bus stop becomes unable to stop there.

Figure 11:
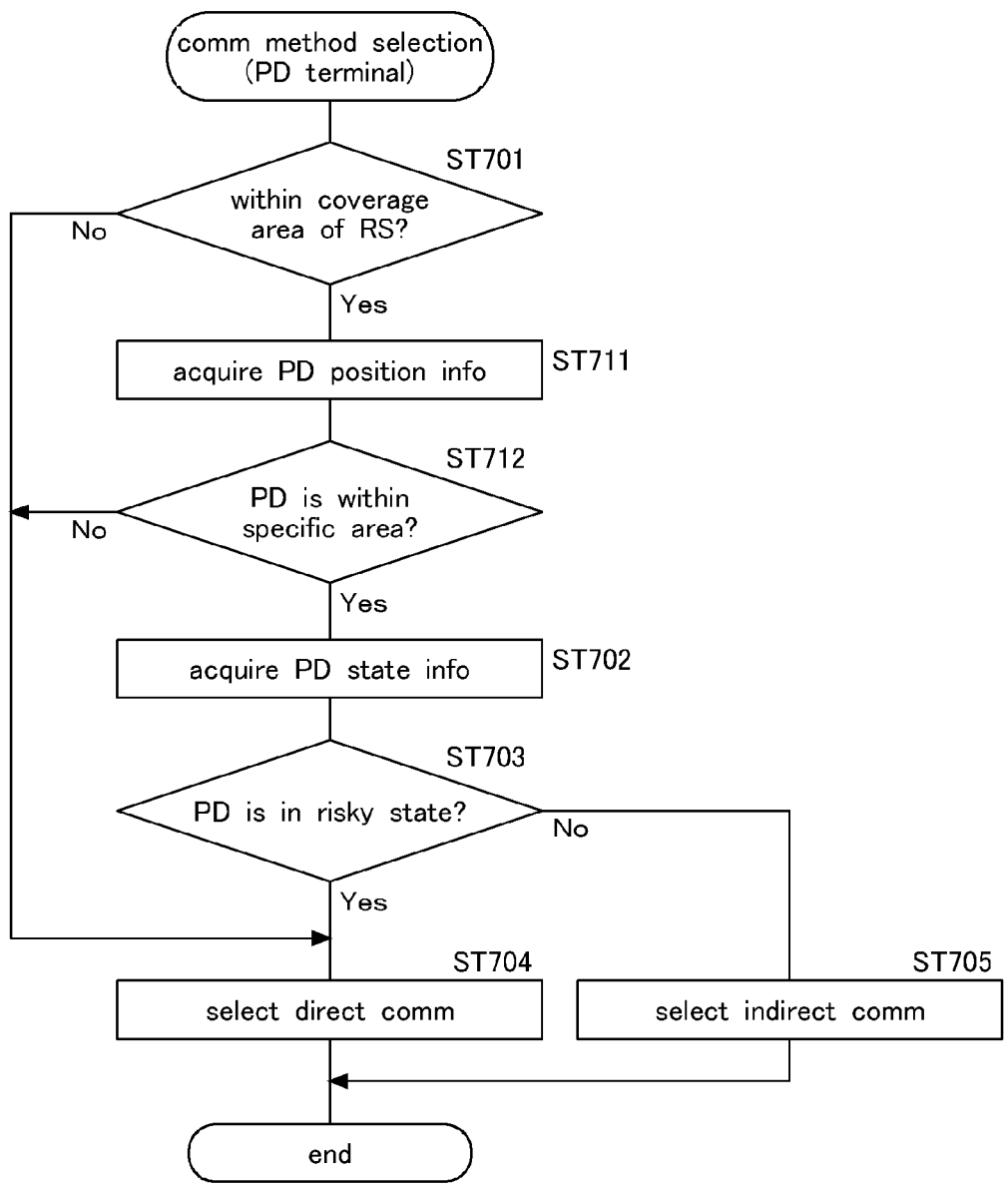
FIG. 11 is a flowchart showing an operation procedure of communication method selection operations performed by a pedestrian terminal 1 according to the second embodiment of the present invention.

Next, communication method selection operations performed by a pedestrian terminal 1 (ST103 in FIG. 6) according to the second embodiment of the present invention will be described. FIG. 11 is a flowchart showing an operation procedure of communication method selection operations performed by the pedestrian terminal 1.

The communication method selector 22 of the pedestrian terminal 1, first, determines whether or not the pedestrian terminal 1 is located within a communication coverage area of a roadside device 5 based on whether or not the wireless LAN communication device 14 has received a beacon signal transmitted by the roadside device 5 (ST701). If the pedestrian terminal 1 is not located within the communication coverage area of the roadside device 5 (No in ST701), the communication method selector 22 selects the direct communication method (ST704).

If the pedestrian terminal 1 is located within the communication coverage area of the roadside device 5 (Yes in ST701), the communication method selector 22 then acquires the pedestrian's position information from the positioning system 11 (ST711). Then, the communication method selector 22 determines whether or not the pedestrian is located within a specific area based on position information and map information, where the position information indicates the current position of the pedestrian and the map information is stored in the storage 17 (ST712). If the pedestrian is not located within the specific area (No in ST712), the communication method selector 22 selects the direct communication method (ST704).

If the pedestrian is located within the specific area (Yes in ST712), the communication method selector 22 then acquires state information indicating a state of the pedestrian from the state detector 12 or other sources (ST702) in the same manner as the first embodiment. Then, the communication method selector 22 determines whether or not the pedestrian is in a risky state based on the pedestrian's state information (ST703).

If the pedestrian is in a risky state (Yes in ST703), the communication method selector 22 selects the direct communication method (ST704). If the pedestrian is not in a risky state (No in ST703), the communication method selector 22 selects the indirect communication method (ST705).

It should be noted that, although FIG. 11 only shows operations performed by the communication method selector 22 of the pedestrian terminal 1, the communication method selector 42 of the in-vehicle terminal 3 performs the same communication method selection operations as those performed by the pedestrian terminal 1.

Third Embodiment

Next, a third embodiment of the present invention will be described. Except for what will be discussed here, this embodiment is the same as the above-described embodiments. FIG. 12 is an explanatory view showing situations where messages are transmitted between a pedestrian terminal 1 and an in-vehicle terminal 3 according to the third embodiment of the present invention.

In the second embodiment of the present invention, the pedestrian or in-vehicle terminal selects the indirect communication method when the pedestrian or vehicle is located within a specific area. However, in the present embodiment, a pedestrian terminal 1 or an in-vehicle terminal 3 selects the indirect communication method as a communication method used for communication between the pedestrian terminal 1 and an in-vehicle terminal 3 both located within a specific area when the pedestrian or vehicle is located within the specific area and also a specific condition is met where a degree of risk is reduced under the specific condition. In this particular embodiment, a specific area is defined as an area around a railroad crossing and a specific condition is met when a railroad crossing gate is in a non-passage state, and thus the pedestrian or in-vehicle terminal selects a communication method used for communication based on whether or not a railroad crossing gate is in a passage state.

More specifically, as shown in FIG. 12A, the pedestrian terminal 1 or the in-vehicle terminal 3, which is even located within a specific area, selects the direct communication method when a railroad crossing gate (RCRG) is in a passage state (in which a railroad crossing bar is raised, for example). As shown in FIG. 12B, when a railroad crossing gate is in a non-passage state (in which a railroad crossing bar is lowered, for example), the pedestrian terminal 1 or the in-vehicle terminal 3, which is located within an area around a railroad crossing, changes the communication method used for communication from the direct communication method to the indirect communication method.

Since a degree of risk is low in an area around a railroad crossing when a railroad crossing gate is in a non-passage state so that vehicles temporarily stop at the railroad crossing, thereby travelling slowly, this configuration makes it possible to avoid reduction in safety even if a terminal device performs indirect communication with a terminal device located within the area around the railroad crossing.

Also, in the present embodiment, the roadside device 5 acquires railroad crossing gate's operation information from a railroad crossing gate controller 7 (RCRG controller 7), adds the acquired operation information to a message, and transmits the message to a pedestrian terminal 1 and/or an in-vehicle terminal 3, whereby the pedestrian terminal 1 and/or the in-vehicle terminal 3 acquire the railroad crossing gate's operation information.

Next, communication method selection operations performed by a pedestrian terminal 1 (ST103 in FIG. 6) according to the third embodiment of the present invention will be described. FIG. 13 is a flowchart showing an operation procedure of communication method selection operations performed by the pedestrian terminal 1.

The communication method selector 22 of the pedestrian terminal 1, first, determines whether or not the pedestrian terminal 1 is located within a communication coverage area of a roadside device 5 based on whether or not the wireless LAN communication device 14 has received a beacon signal transmitted by the roadside device 5 (ST701). If the pedestrian terminal 1 is not located within the communication coverage area of the roadside device 5 (No in ST701), the communication method selector 22 selects the direct communication method (ST704).

If the pedestrian terminal 1 is located within the communication coverage area of the roadside device 5 (Yes in ST701), the communication method selector 22 then acquires the pedestrian's position information from the positioning system 11 (ST711). Then, the communication method selector 22 determines whether or not the pedestrian is located within an area around a railroad crossing based on position information and map information, where the position information indicates the current position of the pedestrian and the map information is stored in the storage 17 (ST721). If the pedestrian is not located within the area around the railroad crossing (No in ST721), the communication method selector 22 selects the direct communication method (ST704).

If the pedestrian is located within the area around the railroad crossing (Yes in ST721), the communication method selector 22 then acquires railroad crossing gate's operation information from a railroad crossing gate controller 7 (ST722).

Next, the communication method selector 22 determines whether or not the railroad crossing gate is in a non-passage state (ST723) based on the railroad crossing gate's operation information. If the railroad crossing gate is not in the non-passage state; that is, the railroad crossing gate is in a passage state (No in ST723), the communication method selector 22 selects the direct communication method (ST704).

If the railroad crossing gate is in the non-passage state (Yes in ST723), the communication method selector 22 then acquires state information indicating a state of the pedestrian from the state detector 12 or other sources (ST702) in the same manner as the first embodiment. Then, the communication method selector 22 determines whether or not the pedestrian is in a risky state based on the pedestrian's state information (ST703).

If the pedestrian is in a risky state (Yes in ST703), the communication method selector 22 selects the direct communication method (ST704). If the pedestrian terminal is not in a risky state (No in ST703), the communication method selector 22 selects the indirect communication method (ST705).

It should be noted that, although FIG. 13 only shows operations performed by the communication method selector 22 of the pedestrian terminal 1, the communication method selector 42 of the in-vehicle terminal 3 performs the same communication method selection operations as those performed by the pedestrian terminal 1.

Fourth Embodiment

Next, a fourth embodiment of the present invention will be described. Except for what will be discussed here, this embodiment is the same as the above-described embodiments. FIG. 14 is an explanatory view showing situations where messages are transmitted between a pedestrian terminal 1 and an in-vehicle terminal 3 according to a fourth embodiment of the present invention.

In the third embodiment of the present invention, a pedestrian terminal 1 or an in-vehicle terminal 3 selects the indirect communication method as a communication method user for communication between the pedestrian terminal 1 and the in-vehicle terminal 3 located within an area around a railroad crossing where a degree of risk is low and a railroad crossing gate is in a non-passage state. However, in the present embodiment, a pedestrian terminal 1 or an in-vehicle terminal 3 selects the indirect communication method as a communication method user for communication between the pedestrian terminal 1 and the in-vehicle terminal 3 located within a specific area around a vehicle stop terminal when a specific type vehicle comes close to the vehicle stop terminal. This particular embodiment will be described as an example in which the specific type vehicle is a bus (fixed-route bus) and the vehicle stop terminal is a bus stop.

More specifically, as shown in FIG. 14A, the pedestrian terminal 1 or the in-vehicle terminal 3, which is located within an area around a bus stop, selects the direct communication method when a bus is not located within a predetermined distance from the bus stop. As shown in FIG. 14B, when a bus comes within the predetermined distance from the bus stop, the pedestrian terminal 1 or the in-vehicle terminal 3 changes the communication method used for communication from the direct communication method to the indirect communication method. Then, when the bus leaves the bus stop and becomes more distant than the predetermined distance, the pedestrian terminal 1 or the in-vehicle terminal 3 changes the communication method used for communication back to the direct communication method.

An in-vehicle terminal 3 mounted in a bus is configured to always select the direct communication method as a communication method used for transmission of messages.

This configuration can prevent congestion in direct communications and ensure that the presence of a bus coming close to a bus stop is quickly notified to pedestrians and vehicle drivers located in an area around the bus stop by prioritizing direct communications performed by an in-vehicle terminal 3 in the bus so as to restrict direct communications performed by pedestrian terminals 1 and in-vehicle terminals 3 located within the area around the bus stop. In particular, when a bus comes close to the bus stop, the configuration can notify vehicle drivers located in the area around the bus stop of the bus coming close to the bus stop so as to advise the vehicle drivers to move the vehicles out of the area around the bus stop.

Also, in the present embodiment, an in-vehicle terminal 3 in a bus may be configured to transmit a message with added attribute information indicating that the vehicle is a bus. This enables terminals located around a bus stop to recognize whether or not a vehicle coming close to the bus stop is a bus.

Next, an operation procedure of communication method selection operations (ST401 in FIG. 7) performed by an in-vehicle terminal 3 according to the fourth embodiment of the present invention will be described. FIG. 15 is a flowchart showing an operation procedure of communication method selection operations performed by the in-vehicle terminal 3.

The communication method selector 42 of the in-vehicle terminal 3 first determines whether or not the in-vehicle terminal is located within a communication coverage area of a roadside device 5 based on whether or not the wireless LAN communication device 34 receives a beacon signal transmitted by the roadside device 5 (ST801). When the in-vehicle terminal is not located within the communication coverage area of the roadside device 5 (No in ST801), the communication method selector 42 selects the direct communication method (ST804).

If the in-vehicle terminal 3 is located within the communication coverage area of the roadside device 5 (Yes in ST801), the communication method selector 42 then acquires the vehicle's position information from the positioning system 31 (ST811). Then, the communication method selector 42 determines whether or not the vehicle is located within an area around a bus stop based on position information and map information, where the position information indicates the current position of the in-vehicle and the map information is stored in the storage 37 (ST812). If the vehicle is not located within the area around the bus stop (No in ST812), the communication method selector 42 selects the direct communication method (ST804).

If the vehicle is located within the area around the bus stop (Yes in ST812), the communication method selector 42 then acquires other vehicles' attribute information and position information included in received messages (ST813). Then, the communication method selector 42 determines whether or not a bus comes within a predetermined distance from the bus stop based on the position information and map information, where the position information indicates positions of other vehicles and the map information is stored in the storage 37 (ST814). If the bus does not come within the predetermined distance from the bus stop (No in ST814), the communication method selector 42 selects the direct communication method (ST804).

If the bus comes within the predetermined distance from the bus stop (Yes in ST814), the communication method selector 42 then acquires state information indicating a state of the vehicle from the state detector 32 or other sources (ST802) in the same manner as the first embodiment. Then, the communication method selector 42 determines whether or not the vehicle is in a risky state based on the vehicle's state information (ST803).

If the vehicle is in a risky state (Yes in ST803), the communication method selector 42 selects the direct communication method (ST804). If the vehicle is not in a risky state (No in ST803), the communication method selector 42 selects the indirect communication method (ST805).

It should be noted that, although FIG. 15 only shows operations performed by the communication method selector 42 of the in-vehicle terminal 3, the communication method selector 22 of the pedestrian terminal 1 performs the same communication method selection operations as those performed by the in-vehicle terminal 3.

Although, in the present embodiment, the specific type vehicle is a bus (fixed-route bus), the specific type vehicle may be other types of passenger vehicles such as a taxi. In the case of a taxi, the vehicle stop terminal (platform) of the specific type vehicle is a taxi stand.

Also, in the present embodiment, the communication method selector determines whether or not a bus comes within a predetermined distance from a bus stop based on position information and map information regarding a map covering the bus stop. However, the communication method selector may be configured to determine whether or not a bus comes within a predetermined distance from a bus stop based on whether or not pedestrian terminals 1 and/or in-vehicle terminals 3 located within an area around the bus stop are able to receive a message transmitted from an in-vehicle terminal 3 in a bus which is coming into an area within which those terminals around the bus stop can perform pedestrian-to-vehicle communication with the in-vehicle terminal 3 in the bus.

Fifth Embodiment

Next, a fifth embodiment of the present invention will be described. Except for what will be discussed here, this embodiment is the same as the above-described embodiments. FIG. 16 is an explanatory view showing situations where messages are transmitted between pedestrian terminals 1 and an in-vehicle terminal 3 according to the fifth embodiment of the present invention.

In the first embodiment of the present invention, a pedestrian terminal determines whether or not the pedestrian is in a risky state, and selects a communication method used for communication (the direct communication method or the indirect communication method) based on a result of the determination. However, in the present embodiment, the pedestrian terminal not only determines whether or not the pedestrian is in a risky state, but also determines whether or not a different pedestrian terminal located nearby is already performing direct communication, and selects a communication method used for communication based on results of the determinations. Specifically, when the different pedestrian terminal 1 is already performing direct communication, the pedestrian terminal selects the indirect communication method, and when any different pedestrian terminal located nearby is not performing direct communication, the pedestrian terminal selects the direct communication method.

This configuration can prevent congestion in direct communications by prioritizing direct communications which has started earlier by a pedestrian terminal 1 so as to restrict direct communications by other pedestrian terminals.

Also, in the present embodiment, the pedestrian terminal 1 determines whether or not a different pedestrian terminal 1 is already performing direct communication based on a message transmitted from the different pedestrian terminal 1. When a pedestrian terminal 1 transmits a message to an in-vehicle terminal 3, the pedestrian terminal 1 broadcasts the message, which means that the message can be also received by other pedestrian terminals located nearby.

Also, a pedestrian terminal 1 may be configured such that, when performing direct communication, the pedestrian terminal 1 transmits a message with added communication method information indicating that the direct communication method is used, other pedestrian terminals 1 can recognize that the message has been transmitted by the direct communication method.

Next, an operation procedure of communication method selection operations performed by a pedestrian terminal 1 according to the fifth embodiment of the present invention will be described. FIG. 17 is a flowchart showing an operation procedure of communication method selection operations performed by the pedestrian terminal 1.

The communication method selector 22 of the pedestrian terminal 1, first, determines whether or not the pedestrian terminal 1 is located within a communication coverage area of a roadside device 5 based on whether or not a wireless LAN communication device 34 receives a beacon signal transmitted by the roadside device 5 (ST701). If the pedestrian terminal 1 is not located within the communication coverage area of the roadside device 5 (No in ST701), the communication method selector 22 selects the direct communication method (ST704).

If the pedestrian terminal 1 is located within the communication coverage area of the roadside device 5 (Yes in ST701), the communication method selector 22 then acquires communication method information included in a message received within a predetermined period of time (ST731). Then, the communication method selector 22 determines whether or not the pedestrian terminal 1 has received a message transmitted from a different pedestrian terminal by the direct communication method (ST732). If the pedestrian terminal 1 has not received any message transmitted from a different pedestrian terminal by the direct communication method (No in ST732), the communication method selector 22 selects the direct communication method (ST704).

If the pedestrian terminal 1 has received a message transmitted from a different pedestrian terminal by the direct communication method (Yes in ST732), the communication method selector 22 then acquires state information indicating a state of the pedestrian from a state detector 32 or other sources (ST702). Then, the communication method selector 22 determines whether or not the pedestrian is in a risky state based on the pedestrian's state information (ST703).

If the pedestrian is in a risky state (Yes in ST703), the communication method selector 22 selects the direct communication method (ST704). If the pedestrian terminal is not in a risky state (No in ST703), the communication method selector 22 selects the indirect communication method (ST705).

In the present embodiment, when the pedestrian terminal 1 has received a message transmitted from a different pedestrian terminal by the direct communication method within the predetermined period of time, the communication method selector selects the indirect communication method. However, the pedestrian terminal may be configured such that, after finding a different pedestrian terminal 1 performing direct communication, the pedestrian terminal continues to use the indirect communication method until a predetermined period of time elapses, and then remove restriction on direct communications, thereby changing the communication method used for communication back to the direct communication method.

Also, a pedestrian terminal 1 performing direct communication may be configured to transmit a message with added communication method instruction information including an instruction for other pedestrian terminals not to perform direct communication for a predetermined period of time so that the other pedestrian terminals 1, upon receiving the message with the communication method instruction information, will not perform direct communication for the predetermined period of time.

It should be noted that, although FIG. 17 only shows operations performed by the communication method selector 22 of the pedestrian terminal 1, the communication method selector 42 of the in-vehicle terminal 3 performs the same communication method selection operations as those performed by the pedestrian terminal 1.

Sixth Embodiment

Next, a sixth embodiment of the present invention will be described. FIG. 18 is an explanatory view showing a situation where messages are transmitted between a pedestrian terminal 1 and in-vehicle terminals 3 according to the sixth embodiment of the present invention.

In the first embodiment of the present invention, the pedestrian or in-vehicle terminal determines whether or not the pedestrian or vehicle is in a risky state, and selects a communication method used for communication (the direct communication method or the indirect communication method) based on a result of the determination. However, in the present embodiment, the pedestrian or in-vehicle terminal not only determines whether or not the pedestrian or vehicle is in a risky state, but also determines whether or not a specific type vehicle is located within a predetermined distance from the pedestrian or in-vehicle terminal, and selects a communication method used for communication based on results of the determinations. Specifically, when finding a specific type vehicle located within the predetermined distance from the pedestrian or in-vehicle terminal, the terminal changes the communication method used for communication from the direct communication method to the indirect communication method, and when the specific type vehicle moves out of the predetermined distance from the pedestrian or in-vehicle terminal, the terminal changes the communication method used for communication back to the direct communication method.

A specific type vehicle is configured to always select the direct communication method as a communication method used for transmission of messages.

This configuration can prevent congestion in direct communications and ensure that the presence of a specific type vehicle is quickly notified to pedestrians and vehicle drivers located near the specific type vehicle by prioritizing direct communications performed by an in-vehicle terminal 3 in the specific type vehicle so as to restrict direct communications performed by pedestrian terminals 1 and in-vehicle terminals 3 located near the specific type vehicle.

In this particular embodiment, the specific type vehicle is an emergency vehicle such as an ambulance or a fire truck. Also, in the present embodiment, an in-vehicle terminal 3 in an emergency vehicle is configured to always transmit messages by using the direct communication method. Moreover, an in-vehicle terminal 3 in an emergency vehicle is configured to transmit a message with added attribute information indicating that the vehicle is an emergency vehicle. This enables pedestrian terminals 1 to recognize whether or not a vehicle is an emergency vehicle. Furthermore, in the present embodiment, the pedestrian or in-vehicle terminal may be configured to calculate the distance from an emergency vehicle to the pedestrian or vehicle based on the emergency-vehicle's position information included in a message transmitted therefrom and the pedestrian's or vehicle's position information, and then determine whether or not the specific type vehicle is located within a predetermined distance from the pedestrian or vehicle. Preferably, the pedestrian terminal 1 is configured such that, when a user pedestrian is a person who is likely to take a risky action, the pedestrian terminal 1 provides alerts to the pedestrian so as to prospectively prevent the pedestrian from taking a risky action such as the pedestrian's running into a road. The predetermined distance may vary depending on a user pedestrian.

Next, communication method selection operations performed by a pedestrian terminal 1 (ST103 in FIG. 6) according to the sixth embodiment of the present invention will be described. FIG. 19 is a flowchart showing an operation procedure of communication method selection operations performed by the pedestrian terminal 1.

The communication method selector 22 of the pedestrian terminal 1, first, determines whether or not the pedestrian terminal 1 is located within a communication coverage area of a roadside device 5 based on whether or not the wireless LAN communication device 14 has received a beacon signal transmitted by the roadside device 5 (ST701). If the pedestrian terminal 1 is not located within the communication coverage area of the roadside device 5 (No in ST701), the communication method selector 22 selects the direct communication method (ST704).

If the pedestrian terminal 1 is located within the communication coverage area of the roadside device 5 (Yes in ST701), the communication method selector 22 then acquires position information and attribute information included in a message received from an in-vehicle terminal 3 (ST741). Then, the communication method selector 22 determines whether or not an emergency vehicle is located within a predetermined distance from the pedestrian based on the position information and the attribute information transmitted from the in-vehicle terminal 3 (ST742). If any emergency vehicle is not located within the predetermined distance from the pedestrian (No in ST742), the communication method selector 22 selects the direct communication method (ST704).

If an emergency vehicle is located within the predetermined distance from the pedestrian (Yes in ST742), the communication method selector 22 then acquires state information indicating a state of the pedestrian from the state detector 12 or other sources (ST702). Then, the communication method selector 22 determines whether or not the pedestrian is in a risky state based on the pedestrian's state information (ST703).

If the pedestrian is in a risky state (Yes in ST703), the communication method selector 22 selects the direct communication method (ST704). If the pedestrian is not in a risky state (No in ST703), the communication method selector 22 selects the indirect communication method (ST705).

It should be noted that, although FIG. 19 only shows operations performed by the communication method selector 22 of the pedestrian terminal 1, the communication method selector 42 of the in-vehicle terminal 3 performs the same communication method selection operations as those performed by the pedestrian terminal 1.

Also, in the present embodiment, the communication method selector determines whether or not an emergency vehicle is located within a predetermined distance from the pedestrian or in-vehicle terminal based on emergency-vehicle's position information and the pedestrian or in-vehicle terminal's position information. However, the communication method selector may be configured to determine whether or not an emergency vehicle is located within a predetermined distance from a pedestrian or in-vehicle terminal based on whether or not the pedestrian or in-vehicle terminal is able to receive a message transmitted from an in-vehicle terminal 3 in the emergency vehicle.

In the present embodiment, when an emergency vehicle is located within a predetermined distance from the pedestrian or in-vehicle terminal, the communication method selector selects the indirect communication method, and when the specific type vehicle moves out of the predetermined distance from the pedestrian or in-vehicle terminal, the communication method selector changes the communication method used for communication back to the direct communication method. However the pedestrian or in-vehicle terminal may be configured such that, after finding an emergency vehicle, the pedestrian or in-vehicle terminal continues to use the indirect communication method until a predetermined period of time elapses, and then remove restriction on direct communications, thereby changing the communication method used for communication back to the direct communication method.

Also, an in-vehicle terminal 3 in an emergency vehicle may be configured to transmit a message with added communication method instruction information including an instruction for other pedestrian terminals 1 or in-vehicle terminals 3 not to perform direct communication for a predetermined period of time so that the other pedestrian terminals 1 or in-vehicle terminals 3, upon receiving the message with the communication method instruction information, will not perform direct communication for the predetermined period of time.

In other embodiments, the pedestrian or in-vehicle terminal may be configured such that, when an emergency vehicle comes within a predetermined distance from the pedestrian or in-vehicle terminal, the communication method selector selects the indirect communication method, and after the emergency vehicle passed by the pedestrian or vehicle, the communication method selector changes the communication method used for communication back to the direct communication method.

Seventh Embodiment

Next, a seventh embodiment of the present invention will be described. Except for what will be discussed here, this embodiment is the same as the above-described embodiments. FIG. 20 is an explanatory view showing situations where messages are transmitted between a pedestrian terminal 1 and in-vehicle terminals 3 according to the seventh embodiment of the present invention. FIG. 21 is an explanatory diagram showing an example of registered data in a priority table.

In the previous embodiment, the pedestrian or in-vehicle terminal determines whether or not the pedestrian or vehicle is in a risky state, and selects a communication method used for communication (the direct communication method or the indirect communication method) based on a result of the determination. However, in the present embodiment, the pedestrian or in-vehicle terminal not only determines whether or not the pedestrian or vehicle is in a risky state, but also determines what types of moving bodies (such as pedestrians, bicycles, mobility scooters, cars, and motorcycles) are located around the pedestrian or vehicle, and selects a communication method used for communication based on results of the determinations. Specifically, the pedestrian or in-vehicle terminal selects a communication method used for communication based on two conditions; that is, whether or not a pedestrian is present near the pedestrian or in-vehicle terminal and what types of vehicles are present near the pedestrian or in-vehicle terminal.

In this particular embodiment, priorities of types of moving bodies are preset in order to determine an order of priority in which the direct communication method is used, and an in-vehicle terminal 3 compares the priority of the vehicle itself with those of pedestrians and other vehicle present near the vehicle, and selects a communication method used for communication based on the comparison. Specifically, when a terminal with a higher priority than that of the in-vehicle terminal 3 is present, the in-vehicle terminal 3 selects the indirect communication method, and when a terminal with a lower priority than that of the in-vehicle terminal 3 is present, the in-vehicle terminal 3 selects the direct communication method.

In this connection, a vehicle which moves at a high speed has a higher risk. A vehicle moving at a high speed passes through a communication coverage area of a roadside device 5 for a short time, and does not have so many chances to use the indirect communication method, which means that such a high-speed vehicle does not benefit so much from changing the communication method used for communication to the indirect communication method. In this view, in the present embodiment, the higher a vehicle moves, the higher priority is set therefor, whereby an in-vehicle terminal is configured such that an in-vehicle terminal moving at a high speed selects the direct communication method and one moving at a low speed selects the indirect communication method.

Specifically, the communication method selector 42 of the in-vehicle terminal 3 selects a communication method used for communication based on data in the priority table and attribute information on pedestrian terminals 1 and in-vehicle terminals 3. The priority table is stored in the storage 37. In addition, since pedestrian terminals 1 and in-vehicle terminals 3 are configured to transmit messages with added attribute information, the in-vehicle terminal 3 can determine whether or not a pedestrian is located nearby and what types of vehicles are present near the in-vehicle terminal 3.

Items of data registered in the priority table include respective priorities for different terminal attributes (pedestrian, bicycle, mobility scooter, car, and motorcycle), and thus, the in-vehicle terminal 3 acquires a priority of the vehicle itself based on its attribute and also acquires priorities of pedestrian terminals 1 and in-vehicle terminals 3 located nearby based on their attributes. As such, the in-vehicle terminal 3 can compare the priority of the own vehicle with those of other vehicles located nearby to thereby select a communication method used for communication.

As shown, high speed vehicles such as cars and motorcycles have the highest priority. Thus, an in-vehicle terminal 3 in a high speed vehicle always selects the direct communication method.

Low-speed vehicles such as mobility scooters and bicycles have a priority which is higher than that of pedestrians and lower than that of high-speed vehicles. Thus, an in-vehicle terminal 3 in a low-speed vehicle selects the direct communication method when a pedestrian is present nearby. In cases where no pedestrian is present but a high-speed vehicle such as a car or a motorcycle is present nearby, the in-vehicle terminal 3 in a low-speed vehicle selects the indirect communication method, but when the low-speed vehicle is in a risk state, the in-vehicle terminal selects the direct communication method.

Pedestrians have the lowest priority. Thus, when the pedestrian is in a normal state, a pedestrian terminal 1 selects the indirect communication method, and when the pedestrian is in a risky state, the pedestrian terminal 1 selects the direct communication method only.

For example, as shown in FIG. 20A, when a pedestrian is present, a pedestrian terminal 1 carried by the pedestrian selects the indirect communication method and in-vehicle terminals 3 select the direct communication method. As shown in FIG. 20B, when no pedestrian is present, an in-vehicle terminal 3 mounted in a bicycle or a mobility scooter selects the indirect communication method, and an in-vehicle terminal 3 mounted in a motorcycle or a car selects the direct communication method.

In this way, the configuration of the present embodiment can prevent congestion in direct communications and ensure that the presence of a high-speed, risky vehicle is quickly notified to pedestrians and vehicle drivers located near the vehicle by prioritizing direct communications performed by an in-vehicle terminal 3 mounted in the high-speed, risky vehicle so as to restrict direct communications performed by pedestrian terminals 1 and other in-vehicle terminals 3 located nearby.

In cases where a user of a pedestrian terminal 1 raids a bicycle or a mobility scooter, the pedestrian terminal 1 may transmit a message with added attribute information indicating that the pedestrian is on a bicycle or a mobility scooter. In this case, when a different pedestrian is present nearby, the pedestrian terminal 1 selects the direct communication method, and when no pedestrian is present and a high-speed vehicle such as a motorcycle or a car is present nearby, the pedestrian terminal 1 selects the direct communication method.

Next, an operation procedure of communication method selection operations (ST401 in FIG. 7) performed by an in-vehicle terminal 3 according to the seventh embodiment of the present invention will be described. FIG. 22 is a flowchart showing an operation procedure of communication method selection operations performed by the in-vehicle terminal 3.

The communication method selector 42 of the in-vehicle terminal 3 first determines, based on whether or not the wireless LAN communication device 34 receives a beacon signal transmitted by a roadside device 5, whether or not the in-vehicle terminal is located within a communication coverage area of the roadside device 5 (ST801). When the in-vehicle terminal is not located within the communication coverage area of the roadside device 5 (No in ST801), the communication method selector 42 selects the direct communication method (ST804).

If the in-vehicle terminal 3 is located within the communication coverage area of the roadside device 5 (Yes in ST801), the communication method selector 42 then acquires attribute information indicating an attribute of the vehicle itself stored in the storage 37 (ST821). Then, the communication method selector 42 determines whether or not the vehicle is a high-speed vehicle such as a car or a motorcycle (ST822). If the vehicle is a high-speed vehicle (Yes in ST822), the communication method selector 42 selects the direct communication method (ST804).

If the vehicle is not a high-speed vehicle, but is a low-speed vehicle such as a mobility scooter or a bicycle (No in ST822), the communication method selector 42 then acquires attribute information included in messages received from a pedestrian terminal 1 and/or any other in-vehicle terminal 3 (ST823). Then, the communication method selector 42 determines whether or not a pedestrian is present nearby (ST824). If a pedestrian is present near the vehicle (Yes in ST824), the communication method selector 42 selects the direct communication method (ST804).

If no pedestrian is present near the vehicle (No in ST824), the communication method selector 42 then acquires state information indicating a state of the vehicle from the state detector 32 or other sources (ST802). Then, the communication method selector 42 determines whether or not the vehicle is in a risky state based on the vehicle's state information (ST803).

If the vehicle is in a risky state (Yes in ST803), the communication method selector 42 selects the direct communication method (ST804). If the vehicle is not in a risky state (No in ST803), the communication method selector 42 selects the indirect communication method (ST805).

It should be noted that, in a pedestrian terminal 1, the communication method selector 22 selects the direct communication method when the pedestrian is in a risky state, and selects the indirect communication method when the pedestrian is not in a risky state in the same manner as the example shown in FIG. 8A.

Eighth Embodiment

Next, an eighth embodiment of the present invention will be described. Except for what will be discussed here, this embodiment is the same as the above-described embodiments.

In the previous embodiment, a pedestrian terminal 1 or an in-vehicle terminal 3 individually selects a communication method used for communication (the direct communication method or the indirect communication method). However, in the present embodiment, a roadside device 5 manages communication method selection for pedestrian terminals 1 and in-vehicle terminals 3 located nearby. More specifically, the roadside device 5 collects information required for communication method selection from pedestrian terminals 1 and in-vehicle terminals 3 located nearby, and then determines respective communication methods to be used by the pedestrian terminals 1 and the in-vehicle terminals 3 and notifies those terminals 1 and 3 of the respective communication methods so that the terminals 1 and 3 can transmit messages by the respective communication methods determined by the roadside device 5.

Next, a schematic configuration of a roadside device 5 according to the eighth embodiment of the present invention will be described. FIG. 23 is a block diagram showing a schematic configuration of the roadside device 5.

The roadside device 5 includes a wireless LAN communication device 51, a controller 52, and a storage 53 in the same manner as in the first embodiment (See FIG. 5).

The wireless LAN communication device 51 transmits and receives messages to/from pedestrian terminals 1 and/or in-vehicle terminals 3 by wireless LAN communication such as WiFi (Registered Trademark) communication, and broadcasts received messages to pedestrian terminals 1 and/or in-vehicle terminals 3. The pedestrian terminals 1 and/or the in-vehicle terminals 3 transmit messages including their state information required for communication method selection; that is, results of detections provided from their state detectors 12 or 32, their position information, and their attribute information.

The storage 53 stores programs executed by the controller 52, and other information. The storage 53 stores state information included in messages received from pedestrian terminals 1 and/or in-vehicle terminals 3.

The controller 52 includes a message controller 61 and a communication method selector 62.

The communication method selector 62 acquires state information indicating states of nearby pedestrians and vehicles from the storage 53, determines whether or not each of the nearby pedestrians and vehicles is in a risky state based on the pedestrian or vehicle's state information and map information stored in the storage 53, and selects a communication method based on a result of the determination.

When the wireless LAN communication device 51 receives messages from pedestrian terminals 1 and/or in-vehicle terminals 3, the message controller 61 transmits the received messages to the pedestrian terminals 1 and/or the in-vehicle terminals 3. Moreover, the message controller 61 transmits a message with added communication method instruction information to pedestrian terminals 1 and/or in-vehicle terminals 3, where the communication method instruction information includes an instruction for each of the pedestrian terminals 1 and/or in-vehicle terminals 3 to transmit messages by a communication method selected by the communication method selector 62.

Upon receiving a message including communication method instruction information from the roadside device, each of the pedestrian terminals 1 or the in-vehicle terminals 3 transmits a message using a communication method designated by the communication method instruction information. Specifically, when being instructed by the roadside device 5 to use the direct communication method, a pedestrian terminal 1 or an in-vehicle terminal 3 transmits a message from its pedestrian-to-vehicle communication device to nearby pedestrian terminals 1 and nearby in-vehicle terminals 3, and when being instructed by the roadside device 5 to use the indirect communication method, the pedestrian terminal 1 or the in-vehicle terminal 3 transmits a message from its wireless LAN communication device to the roadside device 5.

In the present embodiment, the roadside device 5 is configured to manage communication method selection which is performed by a pedestrian terminal 1 and/or an in-vehicle terminal 3 in the above-described embodiments. However, the above-described embodiments may be modified such that the roadside device 5 can perform communication method selection operations, as substitute for a pedestrian terminal 1 or an in-vehicle terminal 3. This configuration, in which a roadside device 5 performs communication method selection operations, is preferably adopted in such cases where communication method selection is performed for pedestrian terminals 1 and/or in-vehicle terminal 3 located within a specific area (such as an area around a railroad crossing or an area around a bus stop) as in the second, third and fourth embodiments.

In some cases, a pedestrian terminal 1 and/or an in-vehicle terminal 3 may be configured to perform part of communication method selection operations, the other part of which is performed by a roadside device 5. For example, a roadside device performs communication method selection based on position information, while a pedestrian terminal 1 or an in-vehicle terminal 3 performs communication method selection based on a result of detection provided by a state detector 12, 32.

Ninth Embodiment

Next, a ninth embodiment of the present invention will be described. Except for what will be discussed here, this embodiment is the same as the above-described embodiments. FIG. 24 is an explanatory view showing situations where messages are transmitted between a pedestrian terminal 1 and an in-vehicle terminal 3 according to the ninth embodiment of the present invention.

In the above-described embodiments, a pedestrian terminal 1 is configured to determine whether or not the pedestrian is in a risky state, and selects either of the direct communication method or the indirect communication method as a communication method based on a result of the determination, and then transmit messages by using the selected communication method. However, in this case, when message transmission by the direct communication method fails, transmission of a message by the indirect communication method allows the message to reach an in-vehicle terminal 3 earlier than by the direct communication method. In this view, in the present embodiment, when a predetermined condition is met, a pedestrian terminal 1 selects both the direct communication method and the indirect communication method as communication methods used for communication, and transmits messages to nearby in-vehicle terminals 3 by using both of the communication methods.

In this particular embodiment, before determining whether or not a pedestrian carrying a pedestrian terminal 1 is in a risky state, the pedestrian terminal 1 determines whether or not the pedestrian is a specific person. If the pedestrian is a specific person, the pedestrian terminal 1 selects both the direct communication method and the indirect communication method regardless of whether or not the pedestrian is in a risky state.

In this case, since a nearby in-vehicle terminal 3 can receive a message from the pedestrian terminal 1 by both the direct communication method and the indirect communication method, the in-vehicle terminal 3 uses a message received earlier as a reception result, the message being transmitted by either of the communication methods, and then, in response to receipt of the earlier message, determine whether or not the vehicle has a collision risk. IN other cases, the in-vehicle terminal 3 may be configured to combine received messages transmitted by the different communication methods to form a set of message information.

The pedestrian terminal 1 has information as to whether or not the pedestrian carrying the pedestrian terminal 1 is a specific person, where the information is preset and stored in the storage 17 as device information regarding an attribute of the pedestrian. For example, the pedestrian terminal 1 may be configured to accumulate historical information on risky actions a user pedestrian has taken in the storage 17 as a risky action history, and determine, based on the accumulated risky action history, whether or not the user pedestrian has taken too many risky actions. Specifically, the pedestrian terminal 1 may be configured to count the number of risky actions the user pedestrian has taken in a past predetermined period of time and determine whether or not the number of risky actions the user pedestrian has taken is equal to or more than a predetermined number. If the user pedestrian has taken too many risky actions, the pedestrian terminal 1 sets the user pedestrian as a specific person. In some cases, the pedestrian terminal 1 may be configured to, upon being requested by a user pedestrian or a family member of the user pedestrian, set the user pedestrian as a specific person who needs to be supervised because of dementia or other reasons. In this case, the pedestrian terminal 1 may be configured such that the user pedestrian or the family member can manually set the user pedestrian as a specific person in the pedestrian terminal 1.

In other cases, the pedestrian terminal 1 may set a user pedestrian as a specific person when the pedestrian stays in a railroad crossing even when a railroad crossing bar is lowered. In this case, it is presumable that an aged pedestrian is suddenly immobilized as being sick or sudden deterioration while walking in the railroad crossing and stays there even after the railroad crossing bar is lowered. Under such a situation in which the pedestrian is in a highly risky state and it is necessary to urgently notify a train that a person stays in the railroad crossing, use of both the direct communication method and the indirect communication method is desirable. The pedestrian terminal 1 may be configured to acquire information on whether or not a railroad crossing bar is lowered from monitoring means such as a roadside device provided at a railroad crossing gate or a surveillance camera for the railroad crossing gate. In other embodiments, the pedestrian terminal 1 may be configured to acquire train position information received from an in-vehicle terminal provided in a train, and set a user pedestrian as a specific person when the distance between the train and the pedestrian becomes short.

Examples of what can be a "specific person" in a broad sense, for which both the direct communication method and the indirect communication method can be simultaneously used, may include vehicles that can carry persons such as bicycles, wheelchairs, electric wheelchairs, mobility scooters, and farm machines.

Next, a message transmitted from a pedestrian terminal 1 according to the ninth embodiment of the present invention. FIG. 25 is an explanatory view showing contents of a message transmitted from a pedestrian terminal 1.

The message controller 21 of a pedestrian terminal 1 generates a message for pedestrian-to-vehicle communication according to the message format for ITS communication. This message includes a common area used for storing predetermined information and a free area (extended area) in which a user can place any information. The common area includes predetermined information such as a pedestrian ID (terminal ID of a pedestrian terminal 1) and position information (longitude and latitude) of the pedestrian terminal. The free area includes information indicating whether or not a user pedestrian is a specific person (specific person information) as the pedestrian's attribute information. The specific person information includes one bit data where "1" represents that a user terminal is a specific person and "0" represents a user terminal is not a specific person. The free area may include other attribute information such as indication that a user pedestrian is a person who uses a cane.

This message can be used to notify nearby in-vehicle terminals 3 of the presence of a specific person. As a result, the nearby in-vehicle terminals 3 provide alerts to respective drivers, causing the drivers to be careful about the specific person.

Next, communication method selection operations (ST103 in FIG. 6) performed by a pedestrian terminal 1 according to the ninth embodiment of the present invention will be described. FIG. 26 is a flowchart showing an operation procedure of communication method selection operations performed by the pedestrian terminal 1.

The communication method selector 22 of the pedestrian terminal 1, first, determines whether or not the pedestrian terminal 1 is located within a communication coverage area of a roadside device 5 based on whether or not the wireless LAN communication device 14 has received a beacon signal transmitted by the roadside device 5 (ST701). If the pedestrian terminal 1 is not located within the communication coverage area of the roadside device 5 (No in ST701), the communication method selector 22 selects the direct communication method (ST704).

If the pedestrian terminal 1 is located within the communication coverage area of the roadside device 5 (Yes in ST701), the communication method selector 22 then determines whether or not the user pedestrian is a specific person (ST751). If the pedestrian is a specific person (Yes in ST751), the communication method selector 22 selects both the direct communication method and the indirect communication method (ST752).

If the pedestrian is not a specific person (No in ST721), the communication method selector 22 acquires state information indicating a state of the pedestrian from the state detector 12 or other sources (ST702). Then, the communication method selector 22 determines whether or not the pedestrian is in a risky state based on the pedestrian's state information (ST703).

If the pedestrian is in a risky state (Yes in ST703), the communication method selector 22 selects the direct communication method (ST704). If the pedestrian terminal is not in a risky state (No in ST703), the communication method selector 22 selects the indirect communication method (ST705).

Tenth Embodiment

Next, a tenth embodiment of the present invention will be described. Except for what will be discussed here, this embodiment is the same as the above-described embodiments. FIG. 27 is an explanatory view showing situations where messages are transmitted between a pedestrian terminal 1 and in-vehicle terminals 3 according to the tenth embodiment of the present invention.

In the ninth embodiment of the present invention, when a predetermined condition is met at a pedestrian terminal (specifically, when a pedestrian is a specific person), a pedestrian terminal 1 selects both the direct communication method and the indirect communication method, and transmits messages to nearby in-vehicle terminals 3 by using both of the communication methods. However in the present embodiment, when a predetermined condition is met at an in-vehicle terminal 3, the in-vehicle terminal 3 transmits messages to nearby pedestrian terminals 1 and nearby in-vehicle terminals 3 by using both the direct communication method and the indirect communication method. In this particular embodiment, when a vehicle carrying an in-vehicle terminal 3 is an emergency vehicle (such as an ambulance or a fire truck), the in-vehicle terminal 3 transmits messages by using both the direct communication method and the indirect communication method.

In this case, since a nearby pedestrian terminal 1 or in-vehicle terminal 3 can receive a message from the in-vehicle terminal 3 in a specific vehicle by both the direct communication method and the indirect communication method, the pedestrian terminal 1 or in-vehicle terminal 3 uses a message received earlier as a reception result, the message being transmitted by either of the communication methods, and then, in response to receipt of the earlier message, determine whether or not the pedestrian or vehicle has a collision risk. The pedestrian terminal 1 or in-vehicle terminal 3 may be configured to combine received messages transmitted by different communication methods to form a set of message information.

The in-vehicle terminal 3 has information as to whether or not the vehicle is a specific vehicle, where the information is preset and stored in the storage 37 as device information regarding an attribute of the vehicle.

Next, a message transmitted from an in-vehicle terminal 3 according to the tenth embodiment of the present invention. FIG. 28 is an explanatory view showing contents of a message transmitted from an in-vehicle terminal 3.

The message controller 41 of an in-vehicle terminal 3 generates a message for pedestrian-to-vehicle communication according to the message format for ITS communication. This message includes a common area used for storing predetermined information and a free area (extended area) in which a user can place any information. The common area includes predetermined information such as a vehicle ID (terminal ID of an in-vehicle terminal 3) and position information (longitude and latitude) of the in-vehicle terminal. The free area includes information indicating whether or not a vehicle is a specific person such as an emergency vehicle (specific vehicle information) as the vehicle's attribute information. The specific vehicle information includes one bit data where "1" represents that an in-vehicle terminal is a specific vehicle (emergency vehicle) and "0" represents an in-vehicle terminal is not a specific vehicle.

This message can be used to notify nearby pedestrian terminals 1 and nearby in-vehicle terminals 3 that an emergency vehicle is traveling nearby. As a result, the nearby pedestrian terminals 1 provide alerts to respective pedestrians, causing the pedestrians to be careful about the emergency vehicle. Also, the nearby in-vehicle terminals 3 provide alerts to respective drivers, causing the drivers to drive their vehicles so as not to block the emergency vehicle.

Next, communication method selection operations (ST401 in FIG. 7) performed by an in-vehicle terminal 3 according to the tenth embodiment of the present invention will be described. FIG. 29 is a flowchart showing an operation procedure of communication method selection operations performed by the in-vehicle terminal 3.

The communication method selector 42 of the in-vehicle terminal 3, first, determines whether or not the in-vehicle terminal is located within a communication coverage area of a roadside device 5 based on whether or not the wireless LAN communication device 34 receives a beacon signal transmitted by the roadside device 5 (ST801). If the in-vehicle terminal 3 is not located within the communication coverage area of the roadside device 5 (No in ST801), the communication method selector 42 selects the direct communication method (ST804).

If the in-vehicle terminal 3 is located within the communication coverage area of the roadside device 5 (Yes in ST801), the communication method selector 42 then determines whether or not the vehicle is a specific vehicle (ST831). If the vehicle is a specific vehicle (Yes in ST831), the communication method selector 42 selects both the direct communication method and the indirect communication method (ST832).

If the vehicle is not a specific vehicle (No in ST831), the communication method selector 42 then acquires state information indicating a state of the vehicle from the state detector 32 or other sources (ST802). Then, the communication method selector 42 determines whether or not the vehicle is in a risky state based on the vehicle's state information (ST803).

If the vehicle is in a risky state (Yes in ST803), the communication method selector 42 selects the direct communication method (ST804). If the vehicle is not in a risky state (No in ST803), the communication method selector 42 selects the indirect communication method (ST805).

Eleventh Embodiment

Next, an eleventh embodiment of the present invention will be described. Except for what will be discussed here, this embodiment is the same as the above-described embodiments.

In the tenth embodiment of the present invention, when a vehicle carrying an in-vehicle terminal 3 is an emergency vehicle (such as an ambulance or a fire truck), the in-vehicle terminal 3 transmits messages by using both the direct communication method and the indirect communication method. However, in the present embodiment, the in-vehicle terminal 3 transmits messages by using both the direct communication method and the indirect communication method only when a vehicle (an emergency vehicle) carrying an in-vehicle terminal 3 has device information which includes the vehicles attribute information indicating that the vehicle is in a high emergency state.

Examples of high emergency states of an emergency vehicle include a case in which an ambulance is traveling in emergency mode for life-and-death emergency care for a patient, a case in which a fire engine is traveling in emergency mode toward a fire site, and a case in which a police car is pursuing a criminal.

The in-vehicle terminal 3 determines whether or not the vehicle is in a high emergency state based on emergency-related information set for the vehicle. For example, the in-vehicle terminal 3 may be configured such that an emergency staff member, upon being mobilized, can manually input emergency-related information to the in-vehicle terminal. In other embodiments, the in-vehicle terminal 3 may be configured to detect a high emergency state based the detected sound of a siren of the emergency vehicle itself. In this case, the siren is preferably configured to change the sound according to the emergency level. Alternatively, the in-vehicle terminal may be configured to determine whether or not the vehicle is in a high emergency state when responding to a received call for service. In some cases, an emergency vehicle may be provided with a communication device for communicating with the Fire and Ambulance Service System or other fire rescue systems so that the in-vehicle terminal 3 can acquire emergency-related information from the communication device. Furthermore, the in-vehicle terminal 3 may store information on whether or not the in-vehicle terminal is in a high emergency state in the storage 37 as device information regarding an attribute of the vehicle, and transmits messages by using both the direct communication method and the indirect communication method as necessary based on the device information.

Next, a message transmitted from an in-vehicle terminal 3 according to an eleventh embodiment of the present invention. FIG. 30 is an explanatory view showing contents of a message transmitted from the in-vehicle terminal 3.

In the present embodiment, a free area of a message for pedestrian-to-vehicle communication includes information (specific vehicle information) indicating whether or not a vehicle is a specific vehicle (emergency vehicle) as the vehicle's attribute information in the same manner as the tenth embodiment, and in addition, the free area includes information (emergency state information) indicating whether or not an emergency vehicle is in a high emergency state. The emergency state information includes one bit data where "1" represents that an emergency vehicle is a high emergency state and "0" represents an in-vehicle terminal is not in a high emergency state.

This message can be used to notify nearby pedestrian terminals 1 and nearby in-vehicle terminals 3 that an emergency vehicle is coming and, additionally, that the emergency vehicle is in a high emergency state.

Next, communication method selection operations (ST401 in FIG. 7) performed by an in-vehicle terminal 3 according to the eleventh embodiment of the present invention will be described. FIG. 31 is a flowchart showing an operation procedure of communication method selection operations performed by the in-vehicle terminal 3.

The communication method selector 42 of the in-vehicle terminal 3, first, determines whether or not the in-vehicle terminal 3 is located within a communication coverage area of a roadside device 5 based on whether or not the wireless LAN communication device 34 receives a beacon signal transmitted by the roadside device 5 (ST801). If the in-vehicle terminal 3 is not located within the communication coverage area of the roadside device 5 (No in ST801), the communication method selector 42 selects the direct communication method (ST804).

If the in-vehicle terminal 3 is located within the communication coverage area of the roadside device 5 (Yes in ST801), the communication method selector 42 then determines whether or not the vehicle is a specific vehicle (ST831). If the vehicle is a specific vehicle (Yes in ST831), the communication method selector 42 determines whether or not the own vehicle is in a high emergency state (ST841).

If the vehicle is in a high emergency state (Yes in ST841), the communication method selector 42 selects both the direct communication method and the indirect communication method (ST832).

If the vehicle is not in a high emergency state (No in ST841) or the vehicle is not a specific vehicle (No in ST831), the communication method selector 42 then acquires state information indicating a state of the vehicle from the state detector 32 or other sources (ST802). Then, the communication method selector 42 determines whether or not the vehicle is in a risky state based on the vehicle's state information (ST803).

If the vehicle is in a risky state (Yes in ST803), the communication method selector 42 selects the direct communication method (ST804). If the vehicle is not in a risky state (No in ST803), the communication method selector 42 selects the indirect communication method (ST805).

Twelfth Embodiment

Next, a twelfth embodiment of the present invention will be described. Except for what will be discussed here, this embodiment is the same as the above-described embodiments.

In the eleventh embodiment of the present invention, when a vehicle carrying an in-vehicle terminal 3 is an emergency vehicle (such as an ambulance or a fire truck) and is in a high emergency state, the in-vehicle terminal 3 transmits messages by using both the direct communication method and the indirect communication method. However, in the present embodiment, when a vehicle carrying an in-vehicle terminal 3 is a specific vehicle and there are many pedestrians near the vehicle, the in-vehicle terminal 3 transmits messages by using two communication methods; that is, both the direct communication method and the indirect communication method and pedestrians transmit a message by using either of the direct communication method and the indirect communication method.

In a place where many pedestrians are present such as in a downtown area, drivers of vehicles naturally become careful about nearby pedestrians and thus is likely to notice a risky action taken by a pedestrian such as the pedestrian's running into a road, which means that there is a lower necessity of providing alerts to drivers. Furthermore, in such a place, congestion in pedestrian-to-vehicle communications is likely to occur as many pedestrian terminals 1 often transmit messages through pedestrian-to-vehicle communication almost at the same time. Under such circumstances, if an in-vehicle terminal is configured to transmit messages by using both the direct communication method and the indirect communication method only when many pedestrians are present near the vehicle, it is possible to prevent congestion in pedestrian-to-vehicle communications and quickly notify nearby pedestrians and vehicle drivers of the presence of a specific type vehicle such as an emergency vehicle.

In this case, an in-vehicle terminal may be configured to determine whether or not there are many pedestrians near the vehicle carrying the in-vehicle terminal based on the number of nearby pedestrians. Specifically, the in-vehicle terminal may be configured to count the number of pedestrian terminals 1 from which the in-vehicle terminal receives messages, and determine that there are many pedestrians near the vehicle when the number becomes equal to or more than a predetermined value. In other cases, the in-vehicle terminal may be configured to determine, based on map information, that there are many pedestrians near the vehicle when the vehicle is located in a specific area where many pedestrians are present such as a downtown area. Alternatively, the in-vehicle terminal may be configured to store information as to whether or not many pedestrians are present near the vehicle in the storage 37, and determine, based on the stored information, that the in-vehicle terminal transmits messages by using two communication methods; that is, both the direct communication method and the indirect communication method.

Next, communication method selection operations (ST401 in FIG. 7) performed by an in-vehicle terminal 3 according to the twelfth embodiment of the present invention will be described. FIG. 32 is a flowchart showing an operation procedure of communication method selection operations performed by the in-vehicle terminal 3.

The communication method selector 42 of the in-vehicle terminal 3, first, determines whether or not the in-vehicle terminal 3 is located within a communication coverage area of a roadside device 5 based on whether or not the wireless LAN communication device 34 receives a beacon signal transmitted by the roadside device 5 (ST801). If the in-vehicle terminal 3 is not located within the communication coverage area of the roadside device 5 (No in ST801), the communication method selector 42 selects the direct communication method (ST804).

If the in-vehicle terminal 3 is located within the communication coverage area of the roadside device 5 (Yes in ST801), the communication method selector 42 then determines whether or not the vehicle is a specific vehicle (ST831). If the vehicle is a specific vehicle (Yes in ST831), the communication method selector 42 determines whether or not many pedestrians are present near the vehicle (ST851).

If many pedestrians are present near the vehicle (Yes in ST851), the communication method selector 42 selects both the direct communication method and the indirect communication method (ST832).

If many pedestrians are not present near the vehicle (No in ST851) or the vehicle is not a specific vehicle (No in ST831), the communication method selector 42 then acquires state information indicating a state of the vehicle from the state detector 32 or other sources (ST802). Then, the communication method selector 42 determines whether or not the vehicle is in a risky state based on the vehicle's state information (ST803).

If the vehicle is in a risky state (Yes in ST803), the communication method selector 42 selects the direct communication method (ST804). If the vehicle is not in a risky state (No in ST803), the communication method selector 42 selects the indirect communication method (ST805).

In the ninth to twelfth embodiments of the present invention, a pedestrian terminal or in-vehicle terminal is configured to select both the direct communication method and the indirect communication method when a predetermined condition is met such as when a pedestrian is a specific person or when a vehicle is a specific vehicle. However, in other embodiments, a pedestrian terminal and/or in-vehicle terminal may be configured to select both of the communication methods when, in addition to any of the above-described conditions being met, an amount of communication traffic is equal to or lower than a predetermined value. In this case, a roadside device 5 may be configured to monitor the amount of communication traffic and notify pedestrian terminals 1 and/or in-vehicle terminals 3 of the measured amount of communication traffic.

In the ninth to twelfth embodiments of the present invention, if a predetermined condition is met, a pedestrian terminal or in-vehicle terminal selects both the direct communication method and the indirect communication method, and otherwise selects either of the two communication method based on whether or not the pedestrian terminal or in-vehicle terminal is in a risky state. However, in other embodiments, a pedestrian terminal and/or in-vehicle terminal may be configured such that if a predetermined condition is not met, the terminal selects a predetermine one of the two communication methods, e.g. the indirect communication method regardless of whether or not the pedestrian or vehicle is in a risky state.

In the ninth to twelfth embodiments of the present invention, pedestrian terminals 1 and/or in-vehicle terminals 3 independently select either one or both of the direct communication method and the indirect communication method. However, in other cases, a roadside device 5 may be configured to select either one or both of the direct communication method and the indirect communication method in the same manner as the eighth embodiment.

While specific embodiments of the present invention are described herein for illustrative purposes, the present invention is not limited to those specific embodiments. It will be understood that various changes, substitutions, additions, and omissions may be made for elements of the embodiments without departing from the scope of the invention. In addition, elements and features of the different embodiments may be combined with each other as appropriate to yield a new embodiment which is within the scope of the present invention.

For example, in the above-described embodiments, indirect communication via a roadside device is performed by using wireless LAN communications. However, a communication scheme used for indirect communication is not limited to wireless LAN communication, but may be any of communication schemes adopted in 5G systems (Fifth generation mobile communication systems); that is, those using high frequency bands such as high SHF band and EHF band.

Also, in the above-described embodiments except for the eighth embodiment, each terminal device autonomously selects either one or both of the direct communication method and the indirect communication method based on a state of a corresponding pedestrian or vehicle. However, alternatively, a roadside device may be configured to select terminal devices which should use the direct communication method. In this case, each terminal device notifies the roadside device of the terminal device's position information, its state information, or a request for use of the direct communication method, and the roadside device determines which terminal devices can use the direct communication method, and then notifies each terminal device of whether or not the device is allowed to use the direct communication method.

INDUSTRIAL APPLICABILITY

A base station device, a terminal device, a roadside device, a communication system and a communications method according to the present invention, in which either one or both of a direct communication method and an indirect communication method is selected as appropriate to thereby achieve an effect of ensuring that the presence of a pedestrian and/or a vehicle is quickly notified to nearby pedestrians and vehicle drivers while preventing congestion in pedestrian-to-vehicle communications, and are useful as a terminal device for transmitting a message including the terminal device's position information to a different terminal device through pedestrian-to-vehicle communication, a roadside device disposed on or near a road for communicating with terminal devices, a communications system comprising: a terminal device and a roadside device, and a communications method by which a terminal device transmits a message to a different terminal device through pedestrian-to-vehicle communication.

GLOSSARY 1 pedestrian terminal (communication device)
3 in-vehicle terminal (communication device)
5 roadside device (communication device)
7 railroad crossing gate controller
11 positioning system
12 state detector
13 pedestrian-to-vehicle communication device (first communication device)
14 wireless LAN communication device (second communication device)
16 controller
31 positioning system
32 state detector
33 pedestrian-to-vehicle communication device (first communication device)
34 wireless LAN communication device (second communication device)
36 controller
51 communication device
52 controller

The invention claimed is:

1. A terminal device for transmitting a message including position information of the terminal device to a different terminal device through pedestrian-to-vehicle communication, the terminal device comprising:
 a first communication device configured to communicate with the different terminal device by using a first communication method which is a direct communication method, in which direct communication is performed as the pedestrian-to-vehicle communication;
 a second communication device configured to communicate with the different terminal device by using a second communication method which is an indirect communication method, in which indirect communication is performed via a roadside device disposed on or near a road; and
 a controller configured to select either one or both of the direct communication method and the indirect communication method based on device information, the device information including at least one of state information or attribute information, the state information indicating a state of the terminal device, the attribute information indicating an attribute of the terminal device, the controller being further configured to transmit the message to the different terminal device by using the one or both of the direct communication method and the indirect communication method selected by the controller,
 wherein the controller is configured to determine, as a first determination, whether or not the terminal device is located within a specific area based on the position information and map information, and select the one or both of the direct communication method and the indirect communication method based on a result of the first determination, and
 wherein the controller is configured such that, when being located within an area around a railroad crossing as the specific area, the controller determines, as a second determination, whether or not a railroad crossing gate is in a non-passage state based on information on operation of the railroad crossing gate acquired from a railroad crossing gate controller, and select the one or both of the direct communication method and the indirect communication method based on a result of the second determination.

2. A terminal device for transmitting a message including position information of the terminal device to a different terminal device through pedestrian-to-vehicle communication, the terminal device comprising:
 a first communication device configured to communicate with the different terminal device by using a first communication method which is a direct communication method, in which direct communication is performed as the pedestrian-to-vehicle communication;
 a second communication device configured to communicate with the different terminal device by using a second communication method which is an indirect communication method, in which indirect communication is performed via a roadside device disposed on or near a road; and
 a controller configured to select either one or both of the direct communication method and the indirect communication method based on device information, the device information including at least one of state information or attribute information, the state information indicating a state of the terminal device, the attribute information indicating an attribute of the terminal device, the controller being further configured to transmit the message to the different terminal device by using the one or both of the direct communication method and the indirect communication method selected by the controller,
 wherein the controller is configured to determine whether or not a user of the terminal device is a specific person based on the attribute information included in the device information, and wherein the controller is configured such that, when the user is the specific person, the controller selects both of the direct communication method and the indirect communication method.

3. A terminal device for transmitting a message including position information of the terminal device to a different terminal device through pedestrian-to-vehicle communication, the terminal device comprising:
 a first communication device configured to communicate with the different terminal device by using a first communication method which is a direct communication method, in which direct communication is performed as the pedestrian-to-vehicle communication;

a second communication device configured to communicate with the different terminal device by using a second communication method which is an indirect communication method, in which indirect communication is performed via a roadside device disposed on or near a road; and a controller configured to select either one or both of the direct communication method and the indirect communication method based on device information, the device information including at least one of state information or attribute information, the state information indicating a state of the terminal device, the attribute information indicating an attribute of the terminal device, the controller being further configured to transmit the message to the different terminal device by using the one or both of the direct communication method and the indirect communication method selected by the controller, wherein the controller is configured to determine whether or not a vehicle carrying the terminal device is a specific type of vehicle based on the attribute information included in the device information, and wherein the controller is configured such that, when the vehicle carrying the terminal device is the specific type of vehicle, the controller selects both of the direct communication method and the indirect communication method.

4. The terminal device according to claim 3, wherein the controller is configured to determine whether or not the vehicle carrying the terminal device is the specific type of vehicle and is in a state of high urgency based on the attribute information included in the device information, and wherein the controller is configured such that, when the vehicle is the specific type of vehicle and is in the state of high urgency, the controller selects both of the direct communication method and the indirect communication method.

5. The terminal device according to claim 3, wherein the controller is configured to determine whether or not the vehicle carrying the terminal device is the specific type of vehicle and multiple pedestrians are present near the vehicle based on the attribute information included in the device information, and wherein the controller is configured such that, when the vehicle is the specific type of vehicle and the multiple pedestrians are present near the vehicle, the controller selects both of the direct communication method and the indirect communication method.

6. A roadside device disposed on or near a road for communicating with terminal devices, the roadside device comprising:

a communication device configured to relay a message transmitted between the terminal devices, wherein the message includes a position information of a first terminal device of the terminal devices; and a controller configured to collect device information including at least one of state information or attribute information, the state information indicating a state of the first terminal device, the attribute information indicating an attribute of the first terminal device, the controller being further configured to select either one or both of a direct communication method, in which direct communication is performed between the terminal devices, and an indirect communication method, in which indirect communication is performed between the terminal devices via the roadside device, based on the device information, and to transmit a message including information indicating the one or both of the direct communication method and the indirect communication method selected by the controller from the communication device to the terminal devices, wherein the controller is configured to determine whether or not a vehicle carrying the first terminal device is a specific type of vehicle based on the attribute information included in the device information, and wherein the controller is configured such that, when the vehicle carrying the first terminal device is the specific type of vehicle, the controller selects both of the direct communication method and the indirect communication method.

7. A communications system, comprising:

a terminal device configured to transmit a message including position information of the terminal device to a different terminal device through pedestrian-to-vehicle communication; and a roadside device disposed on or near a road and configured to communicate with terminal devices, wherein the terminal device comprises:

a first communication device configured to communicate with the different terminal device by using a first communication method which is a direct communication method, in which direct communication is performed as the pedestrian-to-vehicle communication;

a second communication device configured to communicate with the different terminal device by using a second communication method which is an indirect communication method, in which indirect communication is performed via the roadside device; and a controller configured to select either one or both of the direct communication method and the indirect communication method based on device information, the device information including at least one of state information or attribute information, the state information indicating a state of the terminal device the attribute information indicating an attribute of the terminal device, the controller being further configured to transmit the message to the different terminal device by using the selected one or both of the direct communication method and the indirect communication method, wherein the controller is configured to determine whether or not a vehicle carrying the terminal device is a specific type of vehicle based on the attribute information included in the device information, and wherein the controller is configured such that, when the vehicle carrying the terminal device is the specific type of vehicle, the controller selects both of the direct communication method and the indirect communication method.

8. A communications method by which a terminal device transmits a message to a different terminal device through pedestrian-to-vehicle communication, the message including the position information of the terminal device, the communications method comprising:

selecting either one or both of a first communication method which is a direct communication method, in which direct communication is performed as the pedestrian-to-vehicle communication, and a second communication method which is an indirect communication method, in which indirect communication is performed via a roadside device disposed on or near a road, based on device information, the device information including at least one of state information or attribute information, the state information indicating a state of the terminal device, the attribute information indicating an attribute of the terminal device; and transmitting the message to the different terminal device by using the selected one or both of the direct communication method and the indirect communication method, wherein the communications method further comprises:
determining whether or not a vehicle carrying the terminal device is a specific type of vehicle based on the attribute information included in the device information, and wherein, when the vehicle carrying the terminal device is the specific type of vehicle, both of the direct communication method and the indirect communication method are selected.

9. A communications method by which a roadside device disposed on or near a road communicates with terminal devices, the communications method comprising:

relaying a message transmitted between the terminal devices, wherein the message includes position information of a first terminal device of the terminal devices;

selecting either one or both of a direct communication method, in which direct communication is performed between the terminal devices, and an indirect communication method, in which indirect communication is performed between the terminal devices via the roadside device, based on device information including at least one of state information or attribute information, the state information indicating a state of the first terminal device, the attribute information indicating an attribute of the first terminal device; and transmitting a message including information indicating the selected one or both of the direct communication method and the indirect communication method, wherein the communications method further comprises:
determining whether or not a vehicle carrying the first terminal device is a specific type of vehicle based on the attribute information included in the device information, and wherein, when the vehicle carrying the first terminal device is the specific type of vehicle, both of the direct communication method and the indirect communication method are selected.

* * * * *